US012453416B2

(12) United States Patent
Pinnock

(10) Patent No.: US 12,453,416 B2
(45) **Date of Patent: *Oct. 28, 2025**

(54) LATERAL FOLDING UNITS

(71) Applicant: HIDEAWAY SOLUTIONS LLC, Little Compton, RI (US)

(72) Inventor: Lancelot Jerome Pinnock, Little Compton, RI (US)

(73) Assignee: HIDEAWAY SOLUTIONS LLC, Little Compton, RI (US)

( * ) Notice: Subject to any disclaimer, the term of this patent is extended or adjusted under 35 U.S.C. 154(b) by 1071 days.

This patent is subject to a terminal disclaimer.

(21) Appl. No.: 17/483,453

(22) Filed: Sep. 23, 2021

(65) Prior Publication Data

US 2022/0104626 A1 Apr. 7, 2022

Related U.S. Application Data

(63) Continuation-in-part of application No. 16/085,584, filed as application No. PCT/US2017/022954 on Mar. 17, 2017, now Pat. No. 11,131,141.

(60) Provisional application No. 62/310,755, filed on Mar. 20, 2016.

(51) Int. Cl.

| | |
|---|---|
| ***A47B 83/00*** | (2006.01) |
| ***A47C 9/06*** | (2006.01) |
| ***A47C 12/00*** | (2006.01) |
| ***E06C 1/00*** | (2006.01) |

(52) U.S. Cl.

CPC .............. *A47B 83/001* (2013.01); *A47C 9/06* (2013.01); *A47C 12/00* (2013.01); *E06C 1/005* (2013.01)

(58) Field of Classification Search

CPC . A47B 46/005; A47B 2220/05; A47B 83/001; A47B 5/06; A47B 17/48; A47B 17/62; E06C 1/005; A47C 9/06; E06B 3/7009

See application file for complete search history.

(56) References Cited

U.S. PATENT DOCUMENTS

| | | | | | |
|---|---|---|---|---|---|
| 1,347,271 | A * | 7/1920 | Hartman | A47B 23/02 | 5/507.1 |
| 2,760,836 | A * | 8/1956 | Fangman | A47B 5/04 | 108/38 |
| 3,030,166 | A * | 4/1962 | Baker | A47B 77/10 | 312/235.1 |
| 5,358,067 | A * | 10/1994 | Ford | E06C 1/005 | 182/35 |
| 5,775,034 | A * | 7/1998 | Logue | A47B 21/06 | 108/37 |
| 5,819,670 | A * | 10/1998 | O'Connor | A47B 5/06 | 182/95 |

(Continued)

*Primary Examiner* — Colleen M Chavchavadze

(74) *Attorney, Agent, or Firm* — Douglas Denninger

(57) ABSTRACT

A lateral folding step unit and/or desk unit including a vertical frame and a plurality of linkages pivotally attached at different heights to the vertical frame by one end of each of the linkages, to provide lateral rotation to the linkages. A leg frame, with at least one leg, is pivotally attached to the opposite end of each linkage whereby laterally translating the leg frame simultaneously pivots the linkages from a first, vertical position to at least one second, horizontal position. At least one of the linkages has a receiving surface to serve as a step, a shelf and/or as a work surface.

21 Claims, 37 Drawing Sheets

(56) References Cited

U.S. PATENT DOCUMENTS

| | | | | |
|---|---|---|---|---|
| 7,735,428 | B2 * | 6/2010 | Petty | A47B 5/006 108/38 |
| 9,682,780 | B2 * | 6/2017 | Boenning | B64D 11/04 |
| 10,470,578 | B2 * | 11/2019 | Ehlinger | A47C 7/543 |
| 10,807,696 | B2 * | 10/2020 | Singleton | B64D 11/04 |
| 10,842,261 | B1 * | 11/2020 | Gonzalez | A47B 83/04 |
| 2011/0203490 | A1 * | 8/2011 | Carter | B25H 1/02 108/118 |

* cited by examiner

LATERAL FOLDING UNITS

CROSS-REFERENCE TO RELATED APPLICATIONS

This application is a Continuation-In-Part of U.S. patent application Ser. No. 16/085,584, which is a National Phase filing of PCT/US2017/022954 and is to be issued as U.S. Pat. No. 11,131,141 on 28 Sep. 2021 and claims priority to U.S. Provisional Application No. 62/310,755 filed 20 Mar. 2016. The entire contents of each of the above-mentioned applications are incorporated herein by reference.

FIELD OF THE INVENTION

This invention relates to a unit having one or more collapsible horizontal receiving surfaces such as steps and/or desktops, and more particularly to a lateral folding step unit and/or desk unit.

BACKGROUND OF THE INVENTION

Step units such as step stools are essential for people of all heights to help in accessing areas that are vertically out of their reach. Step units can help children reach standard height work surfaces and sinks. However, step stools can be a nuisance to handle, to store, and to retrieve from storage. Faced with the time it often takes someone to find and access a step stool, wherever it is kept, they are often tempted to use something else. It may be more convenient to find a substitute without the proper step-up height, stability or weight support, such as a chair, making the task less safe with more strain on the user.

There are two major types of step stools: portable step stools and fixed step stools. Portable step stools that are not collapsible take up usable space while collapsible designs can be awkward to use and often difficult to collapse when ready to be stored again. They often are not designed with a hand rail which would allow a level of stability especially with types of step stools having more than one step. Also, these step stools potentially do not offer the stability or slip resistance of a fixed step stool.

Fixed step stools such as those accessed within a storage cabinet, under a sink or in the kick plate area of a cabinet are more convenient than portable ones but only have the ability to access the one area above where they are installed. Some are mounted very low, near or on the floor, making it necessary for the user to use their foot to operate them or bend over in order to use them. Those mounted within the cabinets can take up valuable space or limit access within the cabinet.

Taking into account these short-comings of the prior art, it would be desirable to have a useful step stool with a designated integrated location, where one would use a step stool the most. It would be beneficial to enable a more usable working area than just the one position a fixed step stool provides. A slim profile would take up minimum space. A step stool that would provide a convenient deploying and operating height would aid and quicken usability. One that would be able to be deploy in front of an appliance would increase its usability. Also, one with the added safety of an integrated hand rail would improve on step stool prior art.

Desks and horizontal work surfaces are essential for people to have convenient locations to place items, be creative and in getting work done. However, desks can be a nuisance for the amount of fixed space they occupy. Typical folding desks or pull-out work surfaces only have one usable work surface. Those mounted within the cabinets can take up valuable space or limit access within the cabinet in their vertical positions. Folding wall mount desks extrude off the wall in multiple layers to allow for their folding mechanisms, creating a non-flush vertical surface, an undesirable function when space is at a premium.

Taking into account these short-comings of the prior art, especially in small or multi-use places it may be more convenient to have a horizontal receiving surface, such as a lateral folding desk that can easily fold out of the way when not in use. It would be beneficial to have a folding work surface that enabled a more usable working area than just the one position a fixed desk provides. Having two deployment options increases the flexibility of mounting and/or using the desk. When folded, a slim profile where all mechanical pivot points would be on a same singular plane to take up minimum space. A Desk Unit that would provide a convenient deploying would aid and quicken usability. One that would be able to be deploy in front of a cabinet pantry would add to horizontal working space.

SUMMARY OF THE INVENTION

An object of the present invention is to provide an improved collapsible step unit and/or desk unit having a slim storage profile yet easy deployment to present at least one receiving surface to a user.

A further object of the invention is to provide such a step unit and/or desk unit having suitable step-up height and/or working height, stability and weight support when deployed.

Another object of the present invention is to provide collapsible step units and/or desk units capable of having an integrated hand rail and/or storage rack/shelf and at least one or two usable positions from the step/desk unit's integrated location.

A still further object of the present invention is to provide collapsible desk units capable of having at least one or two usable working positions from the desk unit's integrated location.

This invention features a lateral folding unit such as a step unit and/or a desk unit, and method of using same, including a vertical frame and a plurality of linkages pivotally attached at different heights to the vertical frame by one end of each of the linkages, to provide bilateral rotation to the linkages. At least one linkage is substantially deep to serve as a receiving surface such as a step, a shelf, a bench seat and/or as a work surface. A leg frame, with at least one leg, is pivotally attached to the opposite end of each linkage whereby laterally translating the leg frame simultaneously pivots the linkages from a first, collapsed "up" or "folded" vertical position to at least one second, "down" or "unfolded" horizontal position that is laterally "sideways" to the first position. In other words, the leg frame is capable of being translated from the first, vertical position (1) in a first lateral direction to the second, horizontal position to expose the first receiving surface to the user and (2) in a second lateral direction, that is opposite to the first lateral direction, to a third, horizontal position to expose the second receiving surface to the user.

The term "receiving surface" is utilized herein in to include any surface that can serve as a substrate to support a foot or hand of a user, to hold objects such as documents, tools or utensils, or otherwise to perform work including storage of objects which are placed on the receiving surface. The term "capable of being translated" is utilized herein to mean that components of the lateral folding unit could be moved in first and second lateral directions if not impeded by other structure (such as being attached to a wall which blocks movement in one lateral direction). In other words, lateral folding units according to the present invention are still to be considered as "capable of translating" laterally even if they cannot actually do so after installation.

In some embodiments, at least one linkage is substantially deep to be used as a step. In certain embodiments, each vertical frame, leg frame and linkages of the step unit are capable of being positioned on the same geometric plane in the first, vertical position; in one embodiment, the frames and linkages are cut out of a single sheet of material, such as a sheet of plywood. In some embodiments, lateral movement of the vertical frame is restricted. In one embodiment, the vertical frame is moveable in a first direction into a structure and in a second direction out from within the structure. In certain embodiments, the vertical frame is movable on at least one wheel.

In one embodiment, the structure defines a space between two base cabinets. In some embodiments, a hand rail is integrated into the top of the vertical frame, above the leg frame. In one embodiment, an operating handle is an integral cut-out in the leg frame. In another embodiment, a latch secures the leg frame in its unfolded position. In one embodiment, a mounting guide attached to a structure is to be used to guide the vertical frame in and out of the opening. In another embodiment, a guide stop is integrated into the mounting guide. In yet another embodiment, a bumper stop is integrated into the top rear corner of the vertical frame, and the bumper stop is adjustable. In one embodiment, the bumper stop comes into contact with the guide stop when the vertical frame is in its extended position. In certain embodiments, the step unit is capable of being utilized as a staircase.

In certain embodiments, at least two linkages are substantially deep to be used as a step by a user, each of the at least two linkages has a first step surface and a second step surface opposite to the first step surface, and the leg frame is capable of being translated to (1) the second, horizontal position to expose the first step surfaces to the user and (2) a third, horizontal position to expose the second step surfaces to the user.

This invention further features a step unit and/or desk unit, and methods of using same, including a vertical frame having at least a lower portion. The unit further includes a plurality of linkages pivotally attached at different heights to the vertical frame by one end of each of the linkages, to provide bilateral rotation to the linkages relative to the vertical frame. A leg frame, with at least one leg, is pivotally attached to the opposite end of each of the linkages whereby laterally translating the leg frame simultaneously pivots the linkages from a first, vertical position to at least one second, horizontal position. A mounting guide is attachable to a structure to guide the vertical frame in and out of an opening defined by the structure, the vertical frame capable of achieving an extended position when pulled out of the opening. The vertical frame, the leg frame and the linkages of the step unit and/or desk unit are capable of being positioned on the same geometric plane in the first, vertical position. At least one of the linkages is substantially deep to be used as a step or desk by a user, the at least one linkage having a first step or desk surface and a second step or desk surface opposite to the first step or desk surface, and the leg frame is capable of being translated from the first, vertical position (1) in a first lateral direction to the second, horizontal position to expose the first step or desk surfaces to the user and (2) in a second lateral direction, that is opposite to the first lateral direction, to a third, horizontal position to expose the second step or desk surfaces to the user. In other words, at least one of the linkages has a receiving surface to serve as a step, a shelf, a bench, and/or as a work surface.

In some embodiments, at least one linkage is substantially deep to be used as a desk. In certain embodiments, each vertical frame, leg frame and linkages of the desk unit are capable of being positioned on the same geometric plane in the first, vertical position. In some embodiments, lateral movement of the vertical frame is restricted. In one embodiment, the vertical frame is moveable in a first direction into a structure and in a second direction out from within the structure. In certain embodiments, the vertical frame is movable on at least one wheel.

In one embodiment, the structure defines a space between two base cabinets. In one embodiment, an operating handle is an integral cut-out in the leg frame. In another embodiment, a latch secures the leg frame in its unfolded position. In one embodiment, a mounting guide attached to a structure is to be used to guide the vertical frame in and out of the opening. In another embodiment, a guide stop is integrated into the mounting guide. In yet another embodiment, a bumper stop is integrated into the top rear corner of the vertical frame, and the bumper stop is adjustable. In one embodiment, the bumper stop comes into contact with the guide stop when the vertical frame is in its extended position. In certain embodiments, the desk unit is capable of being utilized as a bench and desk.

In certain embodiments, at least two linkages are substantially deep to be used as a bench and desk by a user, each of the at least two linkages has a first bench and desk surface and a second bench and desk surface opposite to the first step surface, and the leg frame is capable of being translated to (1) the second, horizontal position to expose the first bench and desk surfaces to the user and (2) a third, horizontal position to expose the second bench and desk surfaces to the user.

In certain embodiments, at least two linkages are substantially deep to be used as a shelf and desk by a user, each of the at least two linkages has a first shelf and desk surface and a second shelf and desk surface opposite to the first step surface, and the leg frame is capable of being translated to (1) the second, horizontal position to expose the first shelf and desk surfaces to the user and (2) a third, horizontal position to expose the second shelf and desk surfaces to the user.

BRIEF DESCRIPTION OF THE DRAWINGS

In what follows, preferred embodiments of the invention are explained in more detail with reference to the drawings, in which:

FIG. 18C is an enlarged detail of an anchoring screw in FIG. 18B;

DETAILED DESCRIPTION OF THE PRESENTLY PREFERRED EMBODIMENTS

Figure 1:
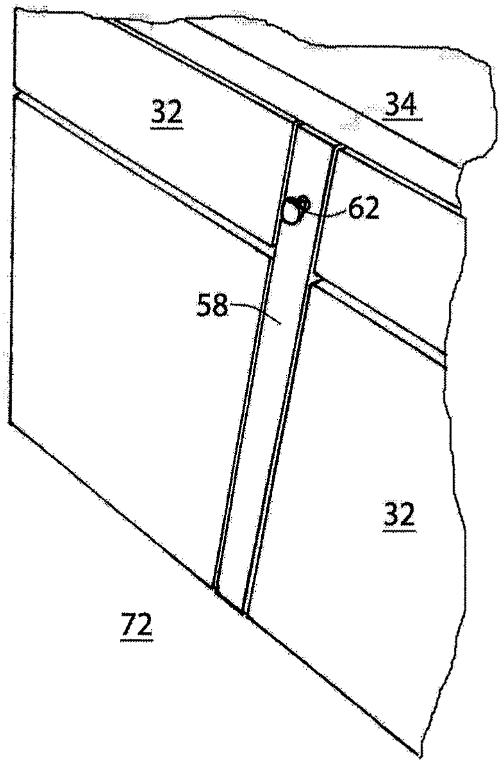
FIG. 1 is a schematic perspective view of a lateral folding step unit according to the present invention in its collapsed, retracted stored position between two cabinets.

This invention may be accomplished by a step unit and/or desk unit including a vertical frame and a plurality of linkages pivotally attached at different heights to the vertical frame by one end of each of the linkages, to provide lateral rotation to the linkages. A leg frame, with at least one leg, is pivotally attached to the opposite end of each linkage whereby laterally translating the leg frame simultaneously pivots the linkages from a first, vertical position to at least one second, horizontal position. At least one of the linkages has a receiving surface to serve as a step, a shelf, a seat such as a bench, and/or as a work surface.

Various constructions of step units according to the present invention are illustrated in FIGS. 1-37. A number of lateral folding desk units according to the present invention are shown in FIGS. 38-57.

A lateral folding step unit 20 according to the present invention, FIGS. 1-6B and 26-29B, is suitable for integration within a slim vertical space defined between two base cabinets 32. The step unit's 20 main components include a vertical frame 22, a hand-operated leg frame 24, and two step linkages 26, 28 shown in FIGS. 1-6B, or alternatively a step linkage 26 and linkage 28*a*, shown in FIGS. 26-29B. All of these components lay on the same geometric flat plane in this construction when step unit 20 is stored in the vertical position illustrated in FIG. 2. All of the components of step unit 20 can be made out of a single sheet of rigid material such as wood; however metal, plastic, or a combination of these and/or other suitably rigid materials would be acceptable.

Figure 2:
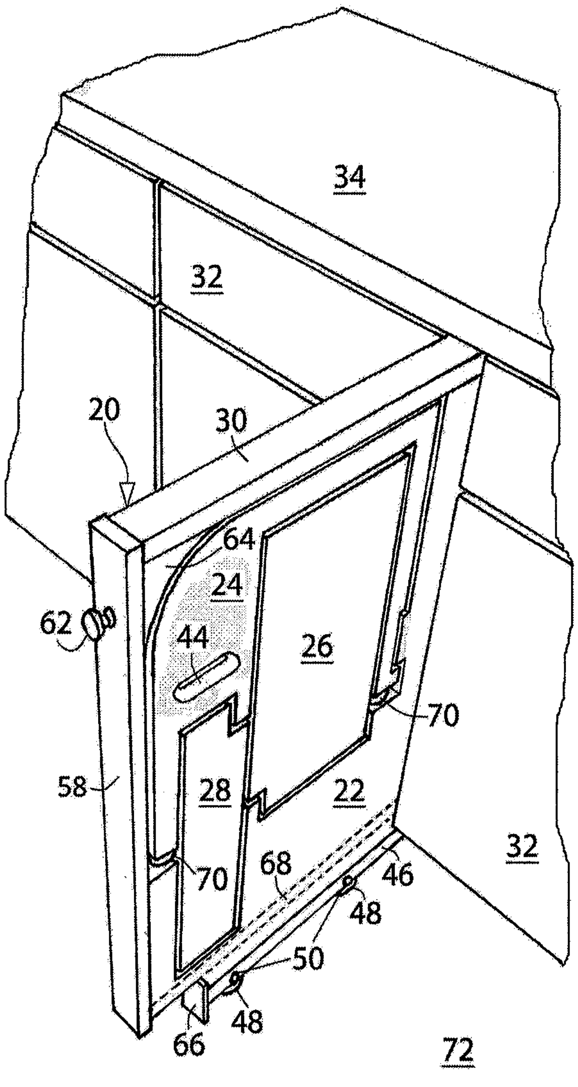
FIG. 2 is a perspective view similar to FIG. 1 with the lateral folding step unit in an extended position while still collapsed or "up"
Figure 27:
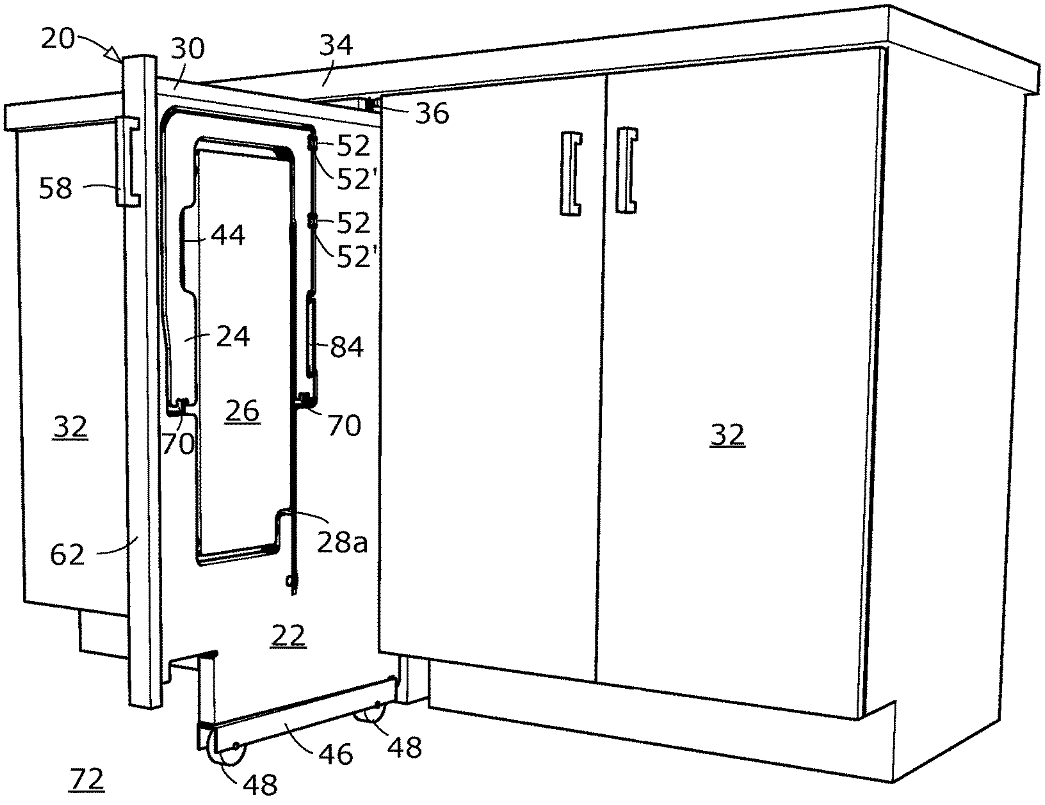
FIG. 27 is a perspective view similar to FIG. 1 with the lateral folding step unit of FIG. 26, single step, in an extended position while still collapsed or "up"

The step unit 20 can be extended out from between the base cabinets 32, as shown in FIG. 2 or 27, and deployed laterally left as shown in FIGS. 3A and 4A, or 28A and 29A, or deployed laterally right as shown in FIGS. 3B and 4B, or 28B and 29B based on the user's elevated access needs. In other words, certain preferred constructions of step units according to the present invention enable a user to position the step unit in at least two different usable positions after the step unit is extended from its storage location. For ease of illustration, all figure views are shown on the right side, or right perspective side, of the step stool unit and, because of the symmetry of the step stool's design in this construction, the left views would be the same as mirror images thereof.

Figure 5:
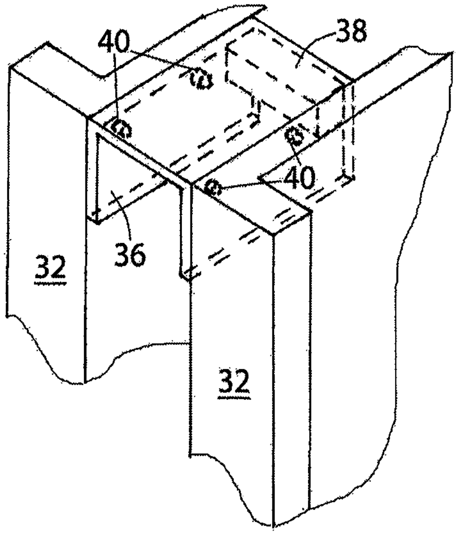
FIG. 5 is a perspective enlarged view of the mounting guide for the lateral folding step unit.
Figure 6A:
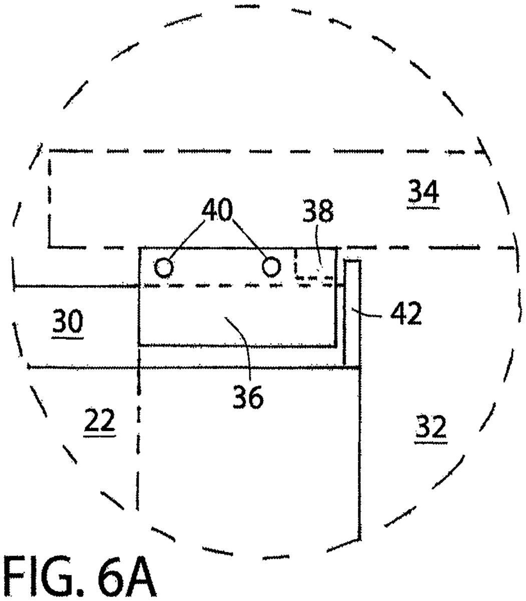
FIG. 6A is a side view close up of the mounting guide for the lateral folding step unit or lateral folding desk unit as shown more completely in FIG. 6B as a right side view of the lateral folding step unit in its extended position.
Figure 6B:
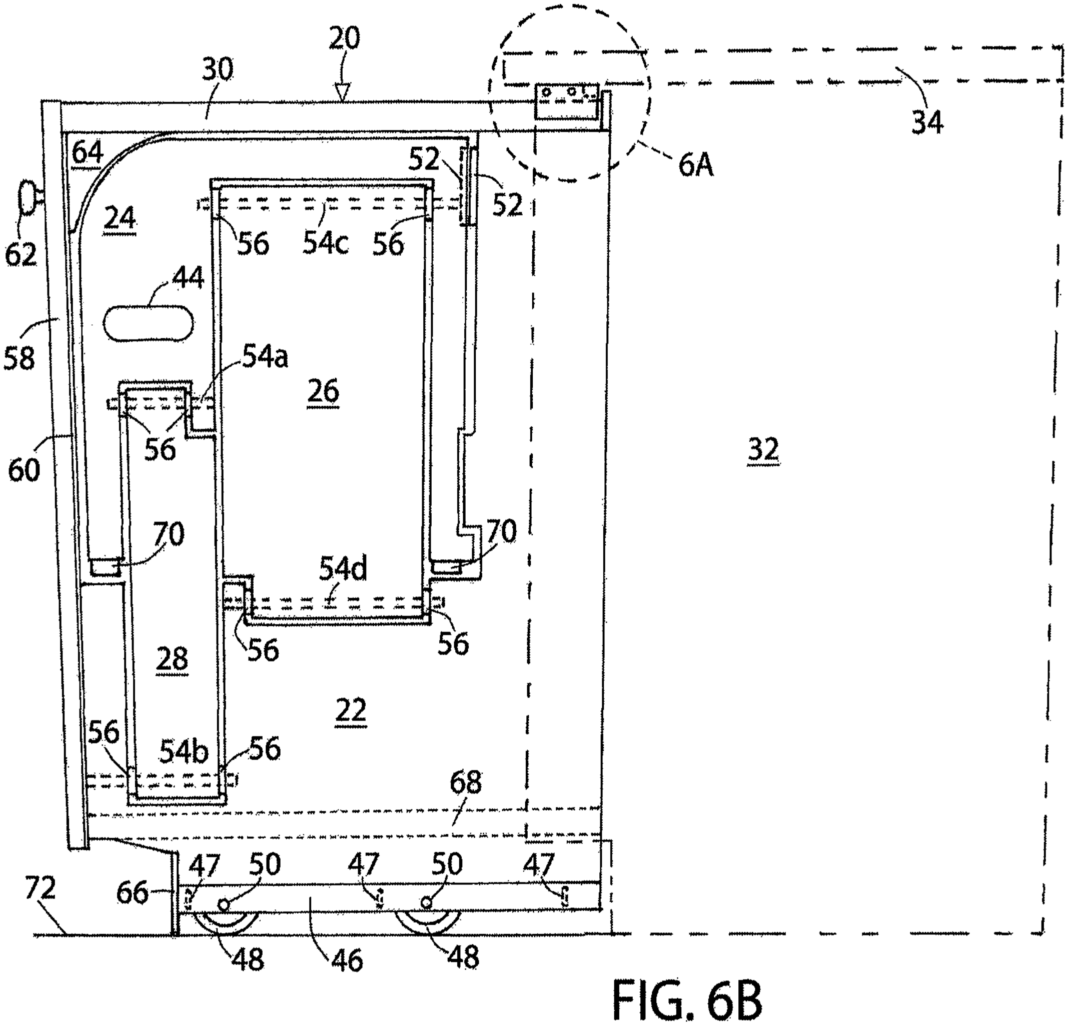

In this embodiment of FIGS. 1-6B and 26-29B, the step unit 20 is mounted in the vertical space between two parallel spaced base cabinets 32 that have been laterally separated to accommodate the step unit 20. This space could be between any fixed structure, for example, one cabinet and one cabinet end panel, or two fixed cabinet end panels or other vertical structure. As shown in FIGS. 5, 6A and 6B, a mounting guide 36 is installed in this space between the width of the two cabinets 32.

The term "width" is utilized herein to represent the horizontal distance between two edges of a component such as step linkages 26 or 28 or linkage 28*a*, or edges of adjoining components such as cabinets 32, as best appreciated when the component is deployed horizontally, that is, parallel to a floor. The term "depth" or "deep" is utilized herein to represent a horizontal distance perpendicular to the width of a component.

In this construction, mounting guide 36 is installed to be positioned flush to the front, top corner of the base cabinets 32 just underneath the counter top 34. Mounting holes 40 through the sides of the mounting guide 36 are provided to attach the guide to the cabinets with the appropriate fastener hardware such as screws, bolts, etc. The step unit 20 has a vertical frame 22 which moves in and out of the space between the two cabinets and is guided by the guide channel 36. The guide channel 36 prevents lateral movement of the vertical frame 22. A guide stop 38 prevents the vertical frame 22 from traveling past its maximum extended position.

Figure 3A:
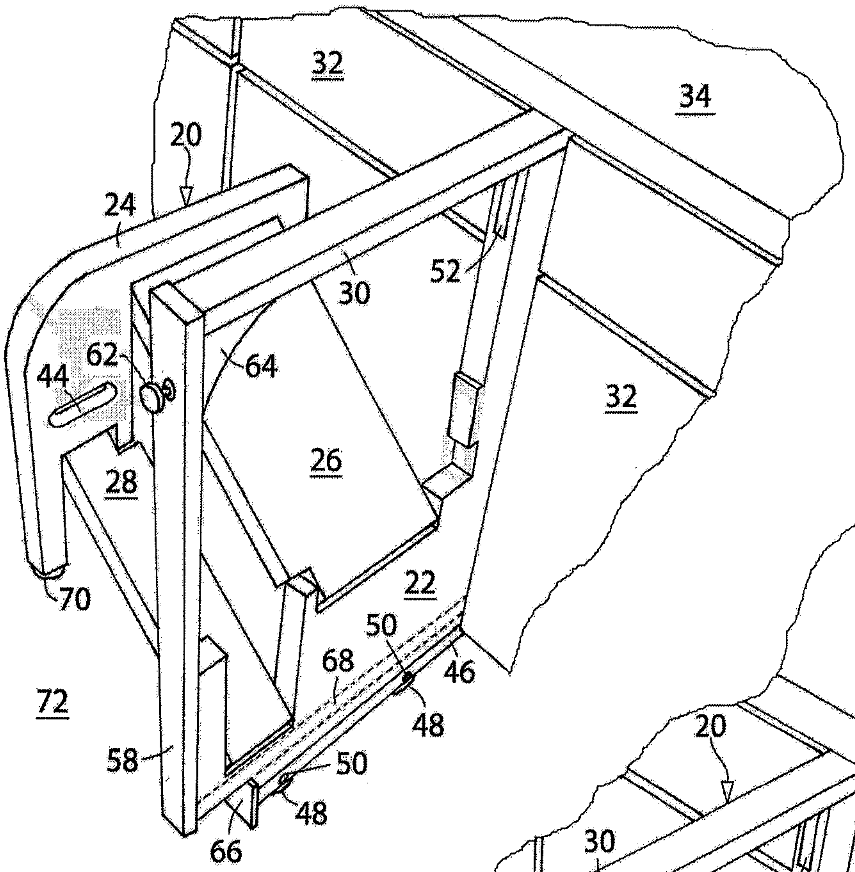
FIG. 3A is a perspective view of the lateral folding step unit in its extended and deploying 45 degree left position.
Figure 3B:
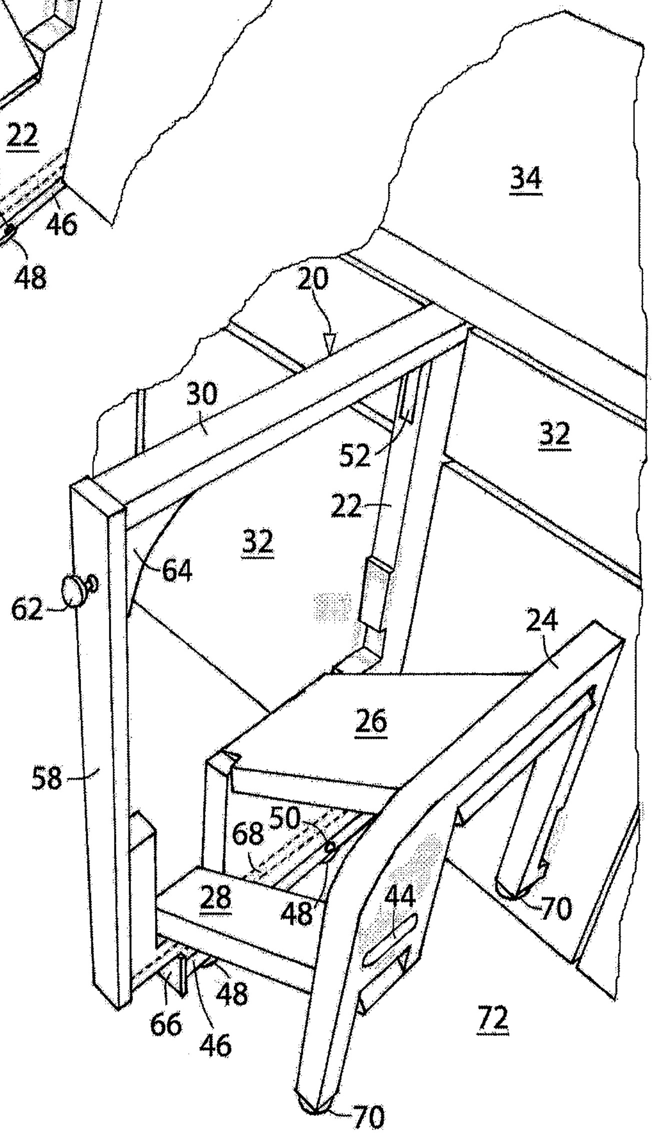
FIG. 3B is a perspective view of the lateral folding step unit in its extended and deploying 45-degree right position.
Figure 4A:
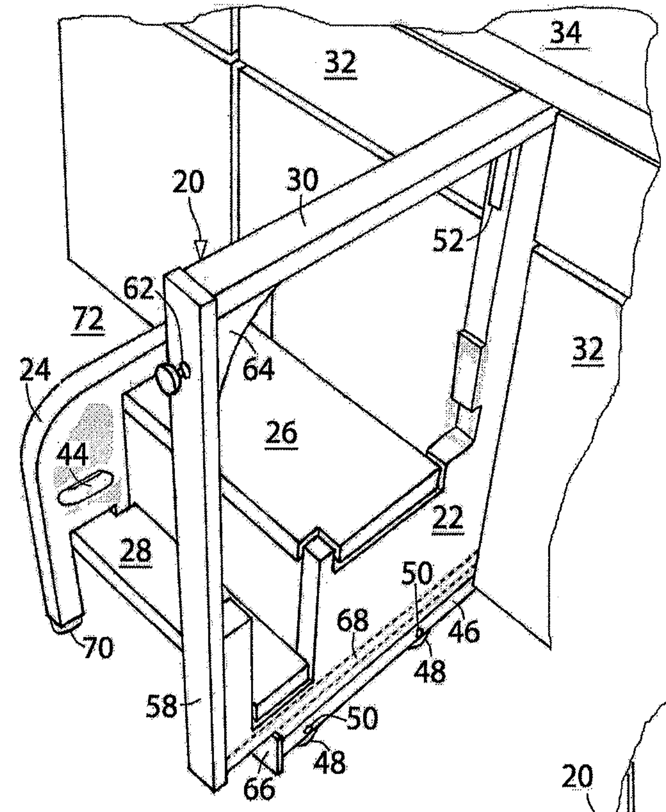
FIG. 4A is a perspective view of the lateral folding step unit in its extended and deployed left usable position.
Figure 4B:
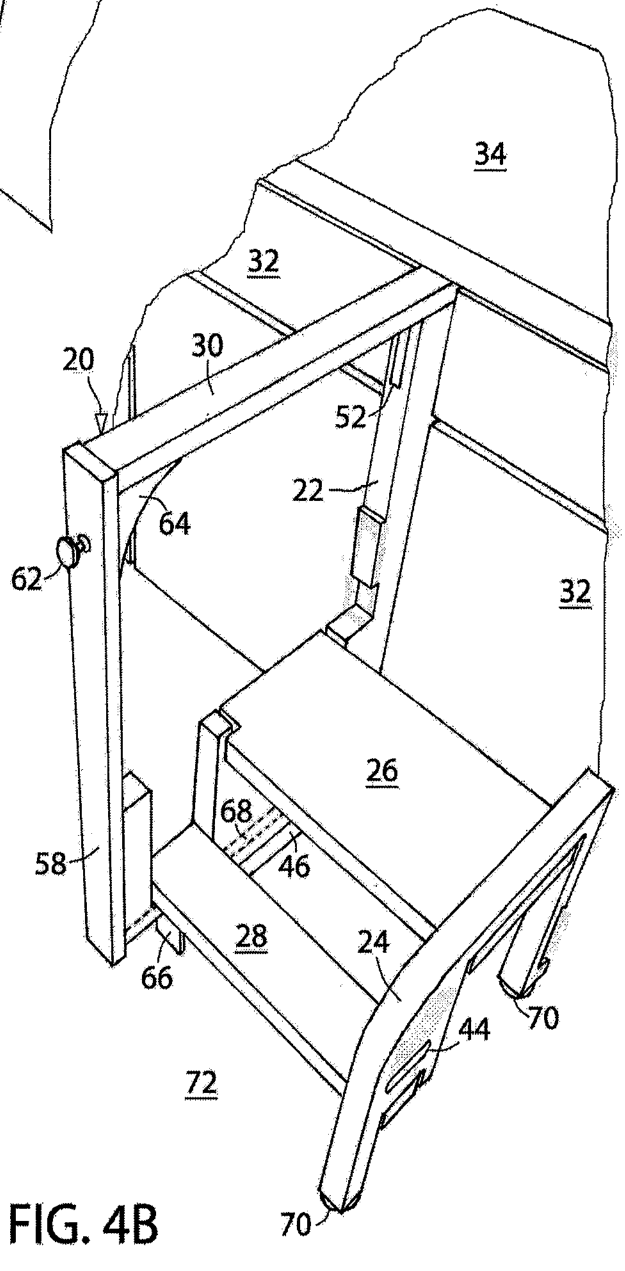
FIG. 4B is a perspective view of the lateral folding step unit in its extended and deployed right usable position.

As best shown in FIGS. 3A and 3B, an upper step linkage 26 and a lower step linkage 28 are pivotally attached to the vertical frame 22. Both step linkages 26 and 28 are substantially deep enough to be used as a step. When both step linkages 26, 28 are orientated in the stored position, shown in FIGS. 2 and 6B, they are in the same geometric plane as the vertical frame 22. The lower step linkage 28 is oriented in front of the upper step linkage 26. The lower step linkage 28 also is mounted lower than the upper step linkage 26. In this embodiment, the upper step linkage 26 is deeper then the lower step linkage 28 to provide a larger working platform. Both steps linkages 26 and 28 have the same width, best shown in FIGS. 4A and 4B.

The leg frame 24, best shown in FIGS. 2-4B and 6B, in this construction is formed of two legs and is pivotally connected to both the upper ends of the upper and lower step linkages 26 and 28, respectively. The leg frame 24 lays in the same geometric plane as the upper step linkage 26, lower step linkage 28, and vertical frame 22, when in the stored position. The leg frame 24 frames the top of both the upper and lower step linkages 26 and 28 with the back leg extending down toward the bottom of the back side of the upper step linkage 26. The front leg extends almost midway down the front side of the lower step 28. The bottom of both legs of the leg frame 24 are generally parallel to the floor. Attached to the bottom each leg is an anti-slip foot 70, made preferably out of rubber. An oval shaped opening, substantially sized for an intended user's hand, created in the leg frame 24 is used as a operating handle 44. The operating handle 44 is cut out in the space directly above the lower step linkage 28 and directly in front of the upper step linkage 26 in this construction. An optional magnet latch 52' is located on the rear top portion of leg frame 24. The magnet 52' is installed so it is flush with the surface, best seen in FIG. 6B.

The following explains how the step linkages 26, 28 are pivotally attached to both the vertical frame 22 and leg frame 24 during assembly of this construction. FIG. 6B or FIG. 27 best shows where the holes of the step unit 20 are located the following: When orientated in the stored position and looking at the step unit 20 from the side view, four holes are drilled, end to end, horizontally through the depth of the upper and lower linkage steps 26 and 28. These four holes include, one hole at the bottom of each step linkage 26, 28 and one hole for the top of each step linkage 26, 28. The distance between the two parallelly drilled holes in the upper step linkage 26 is the same as the distance between the two parallelly drilled holes in the lower step linkage 28. Both the upper step linkage's 26 holes are on the same geometric plane and have a higher vertical offset, to both the lower step linkage's 28 holes. This offset would be generally the same as the distance between the lower step linkage's bottom drilled hole and the floor 72. Four holes are then drilled horizontally through the corresponding adjacent position, on either side of the bottom of each step linkage 26, 28 into the vertical frame 22. Four holes are then drilled horizontally through the corresponding adjacent position, on either side of the top of each step linkage 26, 28 into the leg frame 24.

Figure 28A:
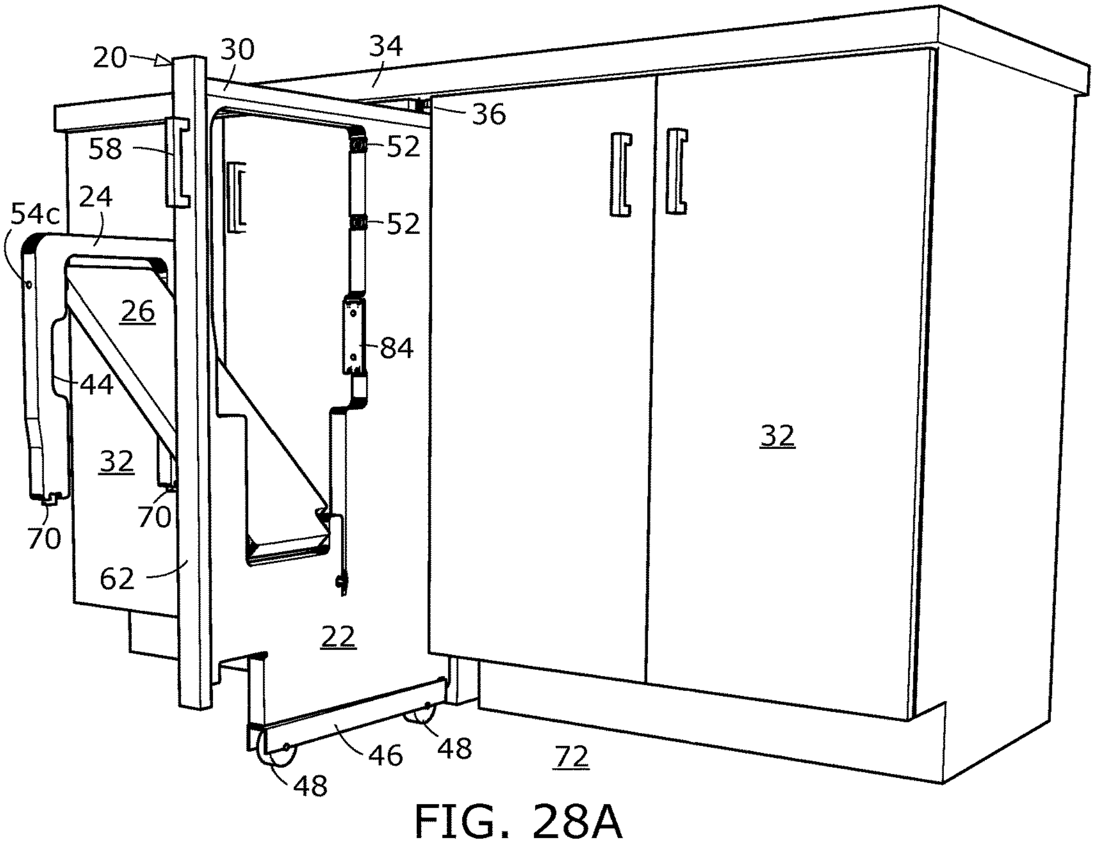
FIG. 28A is a perspective view of the lateral folding step unit, single step, in its extended and deploying 45 degree left position.
Figure 28B:
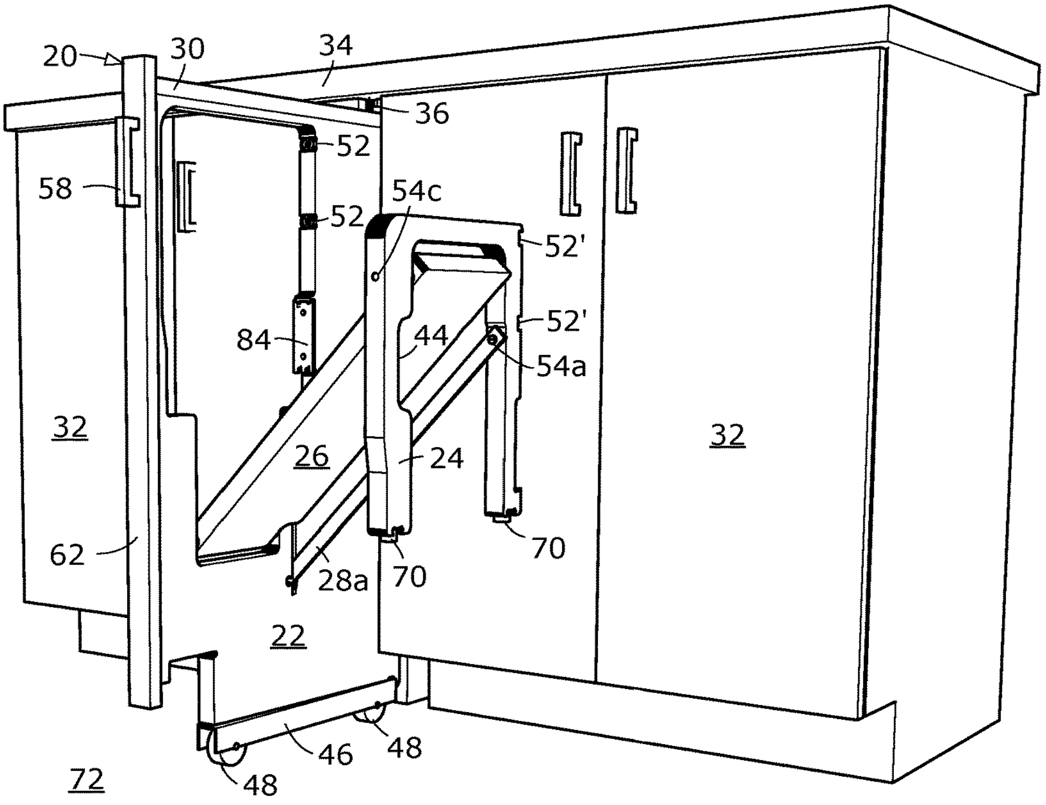
FIG. 28B is a perspective view of the lateral folding step unit, single step, in its extended and deploying 45-degree right position.
Figure 29A:
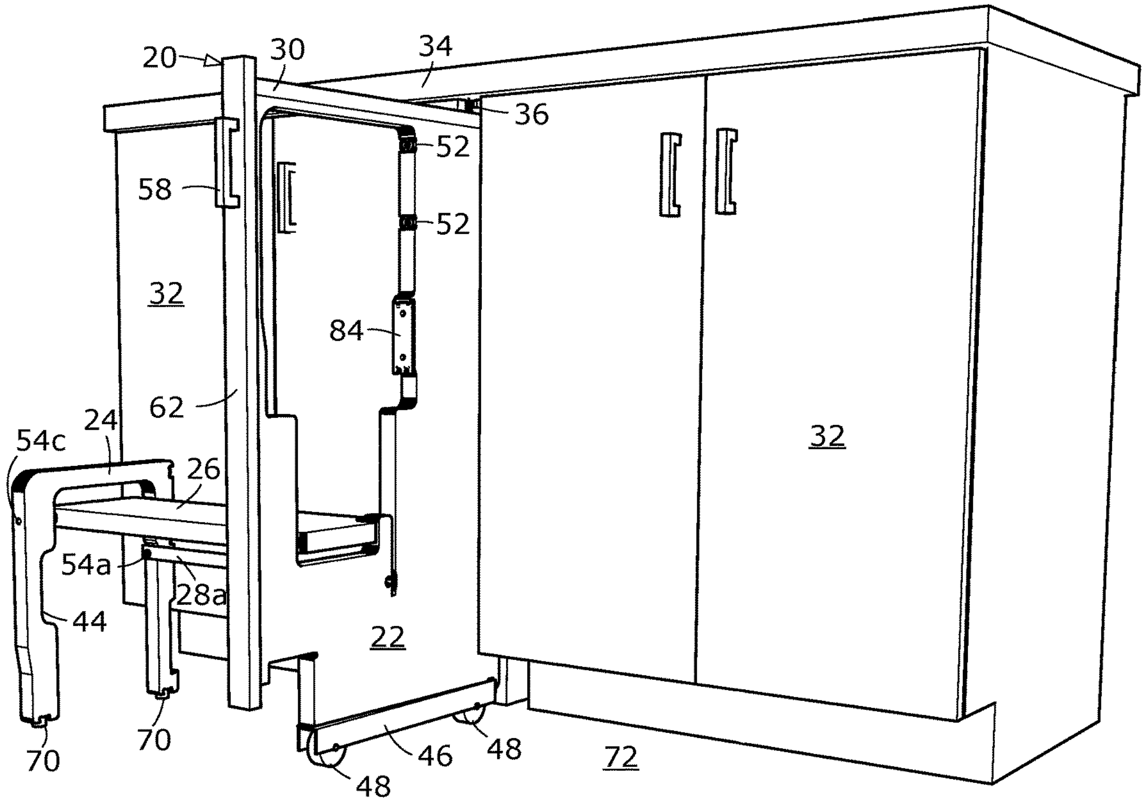
FIG. 29A is a perspective view of the lateral folding step unit, single step, in its extended and deployed left usable position.
Figure 29B:
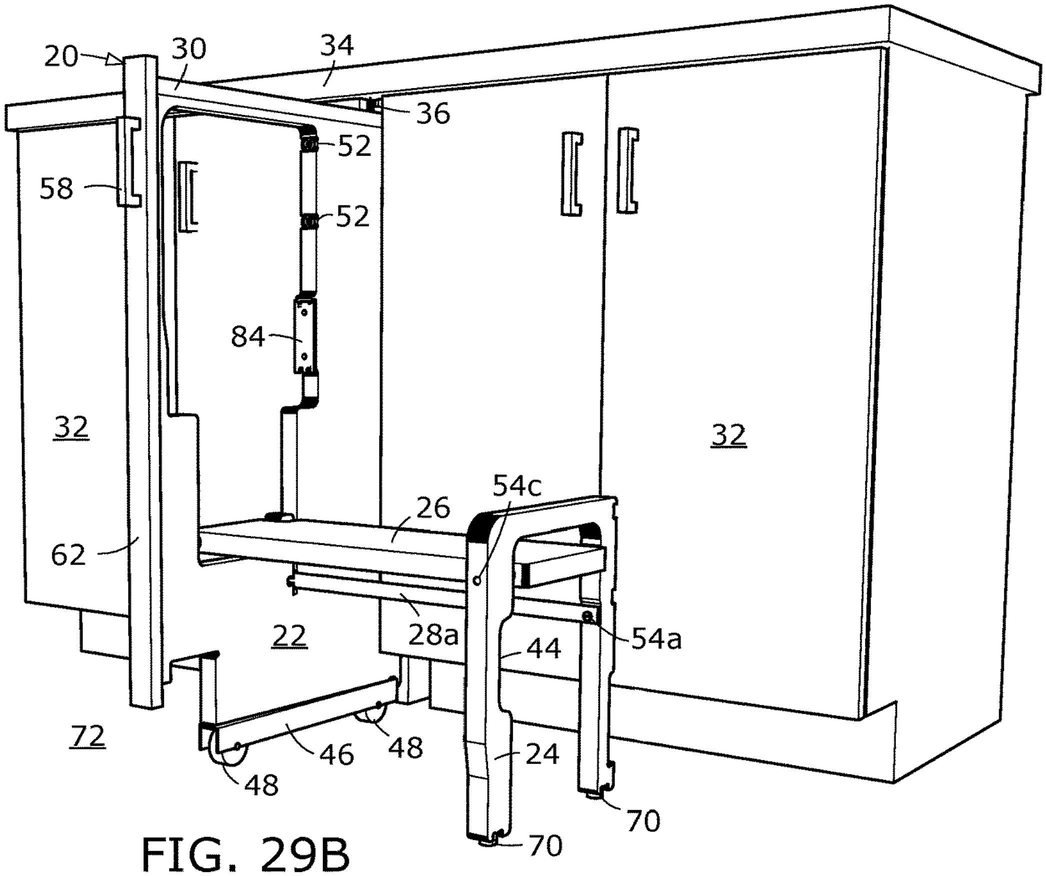
FIG. 29B is a perspective view of the lateral folding step unit, single step, in its extended and deployed right usable position.
Figure 30A:
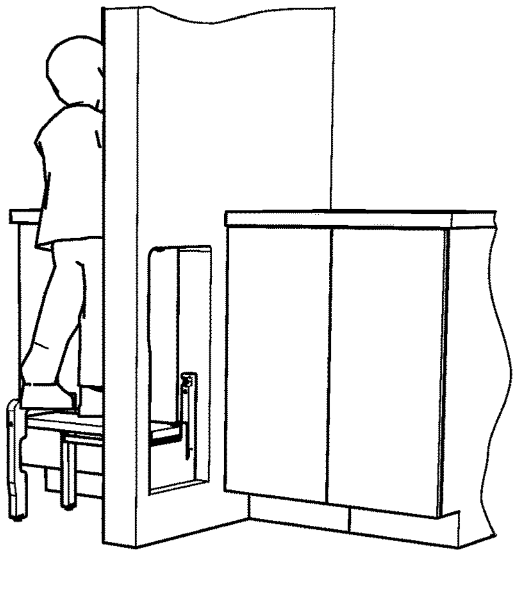
FIG. 30A is a perspective "in use" view, of a lateral folding step unit, single step, in its deployed left position, mounted in the wall.
Figure 30B:
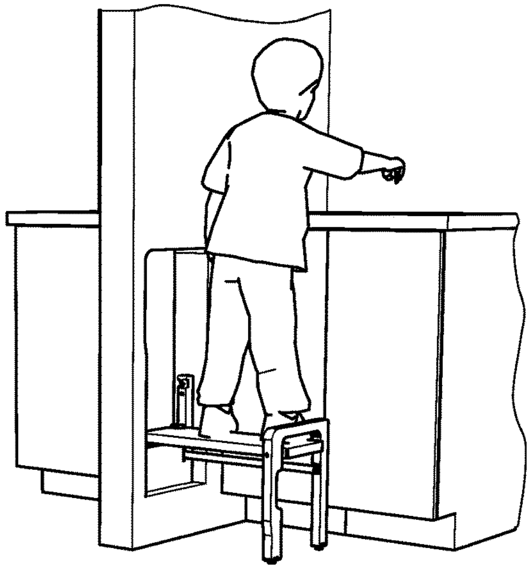
FIG. 30B is a perspective "in use" view, of the lateral folding step unit of FIG. 30A, single step, in its deployed left position, mounted in the wall.
Figure 31:
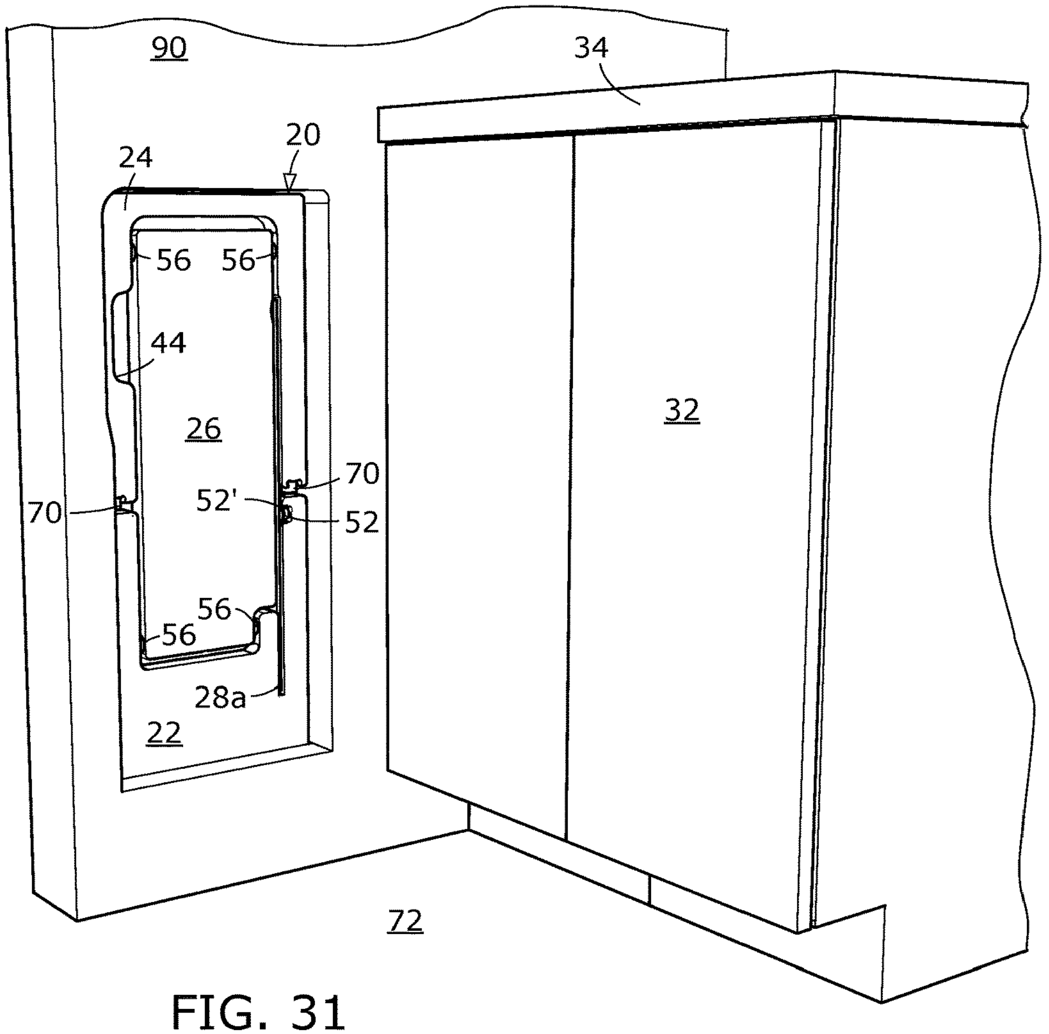
FIG. 31 is a perspective view, of the lateral folding step unit, single step, in its collapsed or "up" position, mounted in the wall.

In a different construction of the step stool unit 20, one with only one step, either the upper step linkage 26 or lower step linkage 28 could be substantially shallow to become merely a linkage so as to no longer be used as a step, FIGS. 29A and 29B best shows an example of this configuration. As best shown in FIGS. 28A and 28B, an upper step linkage 26 and a linkage **28*a* are pivotally attached to the vertical frame 22. Step linkage 26 is substantially deep enough to be used as a step. When step linkage 26, and linkage 28*a* are orientated in the stored position, shown in FIG. 27, they are in the same geometric plane as the vertical frame 22. In this construction, the linkage 28*a* is oriented behind the upper step linkage 26. The linkage 28*a* also is mounted lower than the upper step linkage 26. An optional magnet latch 52' is located on the rear middle portion of linkage 28*a*. Both step linkage 26 and linkage 28*a* have the same width, best shown in FIGS. 29A and 29B. The leg frame 24, best shown in FIGS. 27-29B, in this construction is formed of two legs and is pivotally connected to both the upper ends of the step linkages 26 and linkage 28*a*, respectively. The leg frame 24 lays in the same geometric plane as the step linkage 26, linkage 28*a*, and vertical frame 22, when in the stored position. The leg frame 24 frames the top of both the step linkage and linkage 26 and 28*a* with the front leg extending down toward the bottom of the front side of the step linkage 26. The back leg extends midway down the back side of the linkage 28*a*. The bottom of both legs of the leg frame 24 are generally parallel to the floor. Attached to the bottom each leg is an anti-slip foot 70, made preferably out of rubber. A rectangular shaped opening, substantially sized for an intended user's hand, created in the leg frame 24 is used as a operating handle 44. The operating handle 44 is cut out in the space in front the step linkage 26 towards the top of the of the backside of the front leg, in the leg frame 24. The following explains how a step linkage 26 and linkage 28*a* are pivotally attached to both the vertical frame 22 and leg frame 24 during assembly of this construction. FIG. 27 best shows where the holes of the step unit 20 are located: When orientated in the stored position and looking at the desk unit 21 from the side view, four holes are drilled, end to end, horizontally through the depth of the step linkage 26 and linkage 28*a*. These four holes include, one hole at the bottom of the step linkage 26 and linkage 28*a* and one hole for the top of the step linkage 26 and linkage 28*a*. The distance between the two parallelly drilled holes in the step linkage 26 is the same as the distance between the two parallelly drilled holes in the linkage 28*a*. Both the step linkage's 26 holes are on the same geometric plane and have a vertical offset, to both the linkage's 28*a* holes. Four holes are then drilled horizontally through the corresponding adjacent position, on either side of the bottom of the step linkage 26 and linkage 28*a*, into the vertical frame 22. Four holes are then drilled horizontally through the corresponding adjacent position, on either side of the top of the step linkage 26 and linkage 28*a* into the leg frame 24**.

Connective elements such as shafts or shoulder bolts **54*a*, 54*b*, 54*c*, 54*d*, also shown in FIG. 6B, are then inserted through holes in the lower and upper ends of both the steps linkages and through the corresponding adjacent position in the vertical frame 22 and leg frame 24 to allow pivotal rotation. Spacers 56** are also installed surrounding the shafts

54*a*, 54*b*, 54*c*, 54*d* between the spaces between the steps linkages 26, 28, the vertical frame 22 and the leg frame 24 to produce a clearance for the steps linkages 26, 28, vertical frame 22, and leg frame 24 to operate without touching. Alternatively, for step units 20, with only one step, spacers 56 are also installed surrounding the shafts 54*c* and 54*d* between the spaces between the step linkage 26, the vertical frame 22 and the leg frame 24 to produce a clearance for the step linkage 26, vertical frame 22, and leg frame 24 to operate without touching, best represented in FIG. 35

As shown in FIGS. 2-4B, 6B and 27-29B, one way to provide the vertical frame 22 with smooth egress from within the cabinet 32 and along the floor 72, is with the use of wheels 48. However, any appropriate mechanism for the step stool to slide would be acceptable, for example, low friction pads, drawer slides, etc. This embodiment uses a wheel mount bracket 46, two wheels 48, and two axle connections 50. The bracket 46 is attached to bottom of the vertical frame 22 and would preferably be made out of metal. Optional wheel bracket mounting holes 47 on either side of the bracket are elongated to allow height and level adjustments to the step unit 20. Appropriate hardware such as screws or bolts, etc are used to attach the bracket 46 to the vertical frame 22. On the bottom of the wheel mounted bracket 46 are two cut outs, front and back, to allow mounting of two wheels 48. The preferred material choice for the wheels 48 would be rubber but other materials would work, such as plastic, wood, metal etc. These wheels 48 are attached with axle connections 50 through each hole on either side of the wheel mounting bracket 46. A cut out (not shown in drawings) slightly larger than the diameter of the wheels 48 is also made in the bottom of the vertical frame 22 to allow the vertical frame 22 to accept the bracket 46 and wheels 48.

A hand rail 30 is incorporated at the top of the step unit 20 and the back end connects the upper back portion of the vertical frame 22. The other end of the hand rail 30, connects to the top of the hand rail bracket 64 with the appropriate hardware. The handrail 30 can be made out of metal, wood, plastic, etc. A cabinet face mount 60 is a thin piece of material, preferable metal, that the step stool cabinet face 58 attaches to. The mount 60 is long enough to attach from the top, front face of the hand rail bracket 64 to bottom of the front face of the vertical frame 22, just above the kick plate cutout, shown in FIG. 6B. On the front face of the kick plate cutout a kick plate 66 is installed to match the adjacent kick plates of the base cabinets 32 as seen in FIGS. 2-4B and 6B. A cabinet face pull handle 62 is attached to the front upper portion of the step stool cabinet face 58 as shown in FIGS. 1-4B, 6B and 26-29B to match the appearance of the cabinets 32 as desired.

Figure 15:
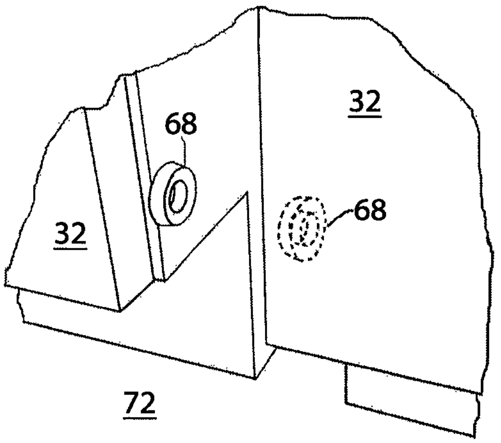
FIG. 15 is a perspective enlarged view of the cabinet mounted bumper guide for the lateral folding step unit or lateral folding desk unit.

An optional bumper guide 68 attaches at the lower portion of the vertical frame just above the kick plate. The guide 68 runs generally parallel to the floor 72 and runs the depth of the step stool, from the front edge to the back edge of the vertical frame 22. The guide 68 is attached using adhesives or screws and runs on both sides of the vertical frame 22. The guide 68 can be used to guide and protect the step stool as it moves in and out of the cabinets 32 and can be best seen in FIGS. 2-4B and 6B. Alternatively, as shown in FIG. 15, the bumper guide 68' could be two spacers/washers that are mounted in the front, lower area space between the two cabinet 32. Attaching the guides 68' to the outside side of each cabinet so the guides 68' are facing one another with the appropriate fastener or glue. Each guide 68' enables the vertical frame 22 to glide from the cabinets 32 without rubbing them.

Lastly, a magnetic latch or latches 52' are attached to the leg frame 24. A corresponding magnetic latch or latches 52 are attached on the opposite adjacent side to the vertical frame 22, such that magnets in latches 52, 52' only engage each other when the step stool 20 is oriented in the stored position, as shown in FIGS. 2, and 6B and 27-29B. The magnet latches 52, 52' are used to hold the step linkages and leg frame in the stored position. In other constructions, a ball latch, roller latch or any other type of magnetic or mechanical latch could be used as a holding device to encourage step unit 20 to remain in a "vertical" storage position. The magnetic latches 52, 52' can be seen in FIGS. 3A-4B, and 6B and 27-29B.

In this construction, one technique for deploying the lateral folding step unit 20 is as follows. A user typically begins by using the face panel pull handle 62 to pull the vertical frame 22, containing two steps linkages 26, 28, or alternatively a step linkage 26 and linkage 28*a*, and a leg frame 24, out from the stored location between two cabinets 32, as shown in FIGS. 1 and 2 or 26-29B. A guide channel 36 and a bumper guide 68 guide the step unit 20 out of the opening as the step unit 20 is pulled out. When pulled out to the maximum extended position, the bumper stop 42 on the step unit 20, comes into contact with the guide stop 38 as seen in FIGS. 6A, 6B.

The user then has the choice of deploying the step unit 20 laterally to the left or to the right as shown in FIGS. 3A, 4A and FIG. 3B, 4B respectively or FIGS. 28A, 29A and FIG. 28B, 29B respectively. This can be done by pulling the operating handle 44 that is integrated into leg frame 24. By pulling laterally in the chosen direction, the leg frame 24 will release from the magnetic latch 52 between the vertical frame 22 and the leg frame 24. In an parallel arced motion, the leg frame 24 will transition away from the vertical frame 22. As the leg frame 24 moves so do the step linkages 26, 28, or alternatively a step linkage 26 and linkage 28*a*, rotating until the leg frame 24 contacts the floor 72. Through this stage, the step linkages 26, 28, or alternatively a step linkage 26 and linkage 28*a*, move parallel in relation to each other from the initial vertical "stored" position to the horizontal "in use" position. In the "in use" position the linkage steps 26, 28, are deployed in a staircase fashion making them safe and easy to use. In this embodiment, the upper step linkage 26 is substantially deeper to provide a stable platform as the user performs their task. As the user climbs up the step linkages 26, 28, or alternatively a step linkage 26 and linkage 28*a*, they can stabilize themselves with the built-in hand rail 30. The hand rail 30 can also be used as a leg brace to aid stability for a taller user, see FIGS. 4A, 4B and 29A and 29B.

To move back to the extended stored position shown in FIG. 2, the user would step down off the lateral folding step unit 20, grab the operating handle 44, and with one arched motion reposition the leg frame 24, with the pivotally attached step linkages 26, 28, or alternatively a step linkage 26 and linkage 28*a*, back within the vertical frame 22. The magnetic latch or latches 52 will automatically engage, as seen in FIG. 6B. Then the user has the choice to return the lateral folding step unit 20 back in its stored position, between the cabinets 32 or to access additional counter top 34 or upper cabinet space. This is done by deploying the leg frame 22 and steps linkages 26 and 28 to the adjacent lateral side, see FIGS. 4A, 4B. Or by deploying the leg frame 22 and steps linkages 26 and 28*a* to the adjacent lateral side, see FIGS. 29A, 29B The step unit 20 can be remove if needed by pulling the step unit 20 out into the extended position, from between the base cabinets 32, shown in FIG. 6B, and pivoting the whole unit so that the front wheel comes of the floor 72, see FIG. 9A. This allows the bumper stop 42 at the back of the unit to clear the guide stop 38. Once the step stool 20 has cleared the guide stop 38, it can be pivoted back down and pulled all the way out, shown in FIG. 9B. The reverse procedure goes for the initial or re-installation of the step unit 20, If used incorrectly, or not by the handle, it is possible for the step unit 20 to unfold the wrong way. This can happen if the top half of the leg frame 24 moves laterally, in the intended use direction, before the bottom half does. This causes the leg frame 24 to rotate down instead of transition down parallel to the vertical frame 22. To stop this rotation from going too far, in one construction the leg frame 24 has a built-in leg frame catch 82 at the back of the lower side of the rear leg, seen in FIG. 14A and FIG. 14B. A corresponding vertical frame catch 84 is added or built into the vertical frame 22. The vertical frame 22 catch stops the leg frame 24 when it comes into contact with the leg frame catch 82 also shown in FIG. 14A and FIG. 14B. The user can then easily return the step unit 20 to its stored position.

Figure 7:
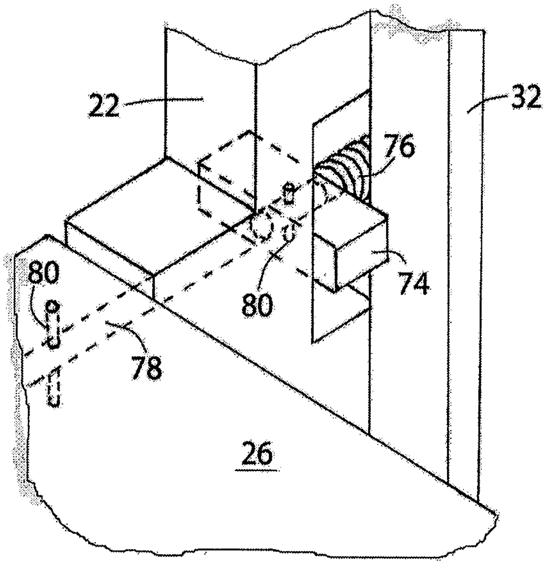
FIG. 7 is a perspective enlarged view of an optional spring assist and locking mechanism for the lateral folding step unit in its extended deployed position.
Figure 10A:
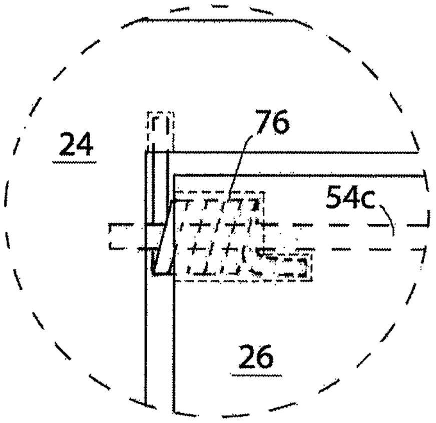
FIG. 10A is a right side view close up of an alternative spring assist location for the lateral folding step unit of FIG. 10B in its up position, also showing an alternative adjustable stop bumper in FIG. 10B.
Figure 10B:
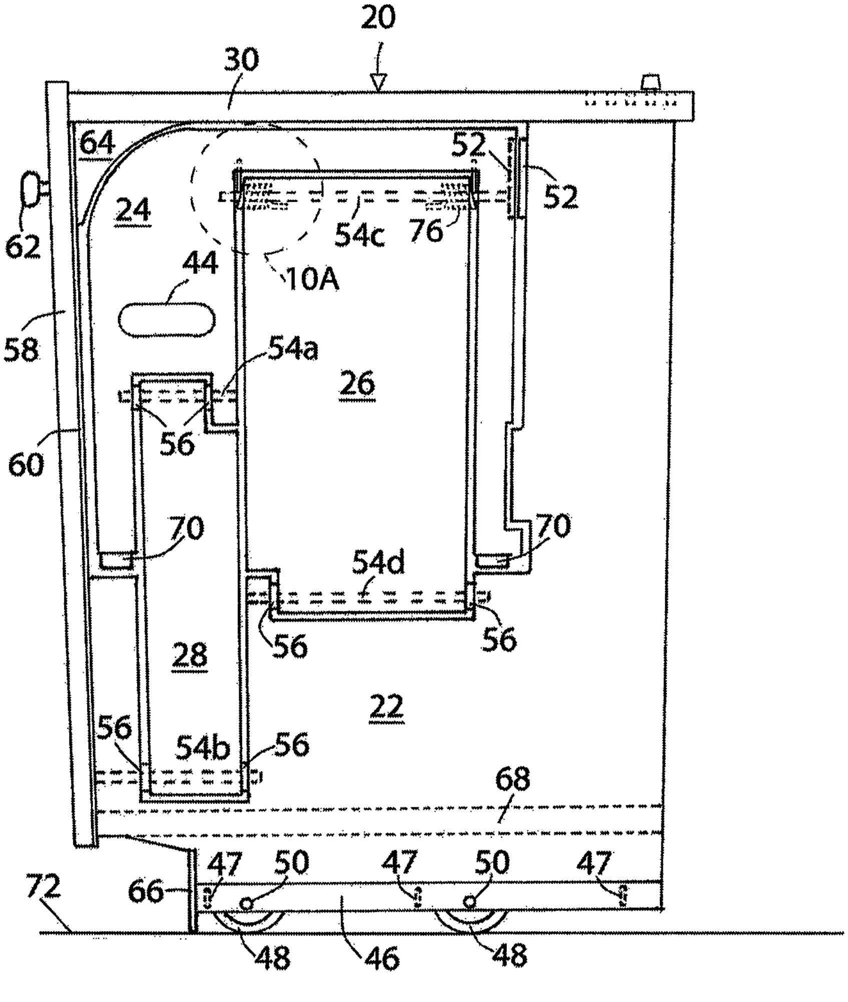

One or more of the following components can be used independently or in conjunction with one another when building a step unit according to the present invention, such as the step unit 20. In one construction, a lock 74, FIGS. 7-8B, can be added to prevent to step unit 20 from inadvertently moving back into the base cabinet 32 when the step unit 20 is in use, such as seen in FIG. 7. Other alternative components are the incorporation of one or more springs 76', 76" that can be used to assist the lifting motion of the step stool 20, such as shown in FIGS. 10A and 10B positioned around shaft 54*c* to bias step link 26 relative to the leg frame 24. Other constructions include the addition of a bumper stop 42, FIGS. 10B-11, that is adjustable and/or repositionable to allow a user to fine-tune how far outward the step unit 20 travels in its extended position. Additional optional components and configurations include different number of legs on the leg frame 24, as respectively seen in FIGS. 12 and 13 for one- and three-leg configurations, for example.

Figure 8A:
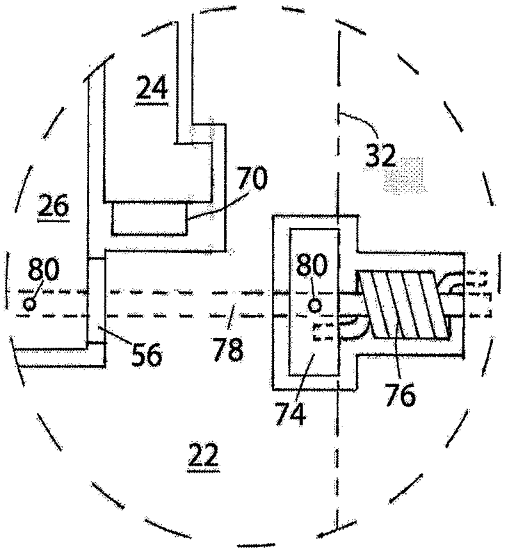
FIG. 8A is a right side view close up of the optional spring assist and locking mechanism of FIG. 8B for the lateral folding step unit in its extended collapsed position.
Figure 8B:
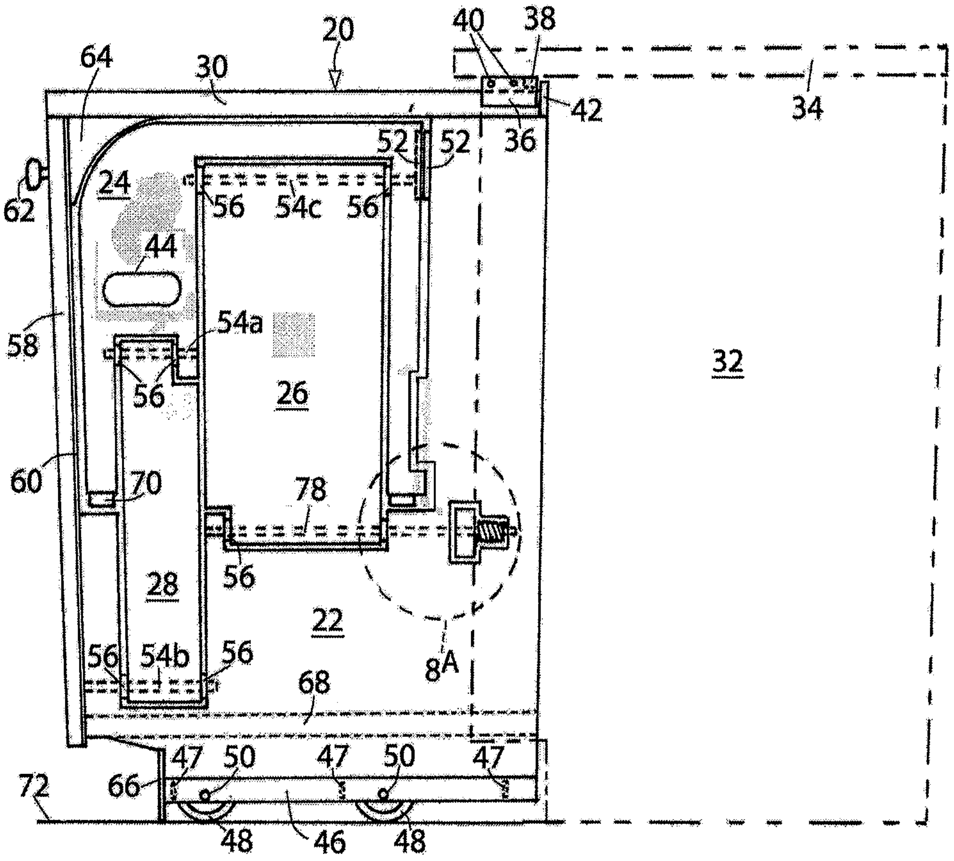
FIG. 8B is a side view of the lateral folding step unit in its extended collapsed position with the spring assist and locking mechanism not yet deployed.
Figure 9A:
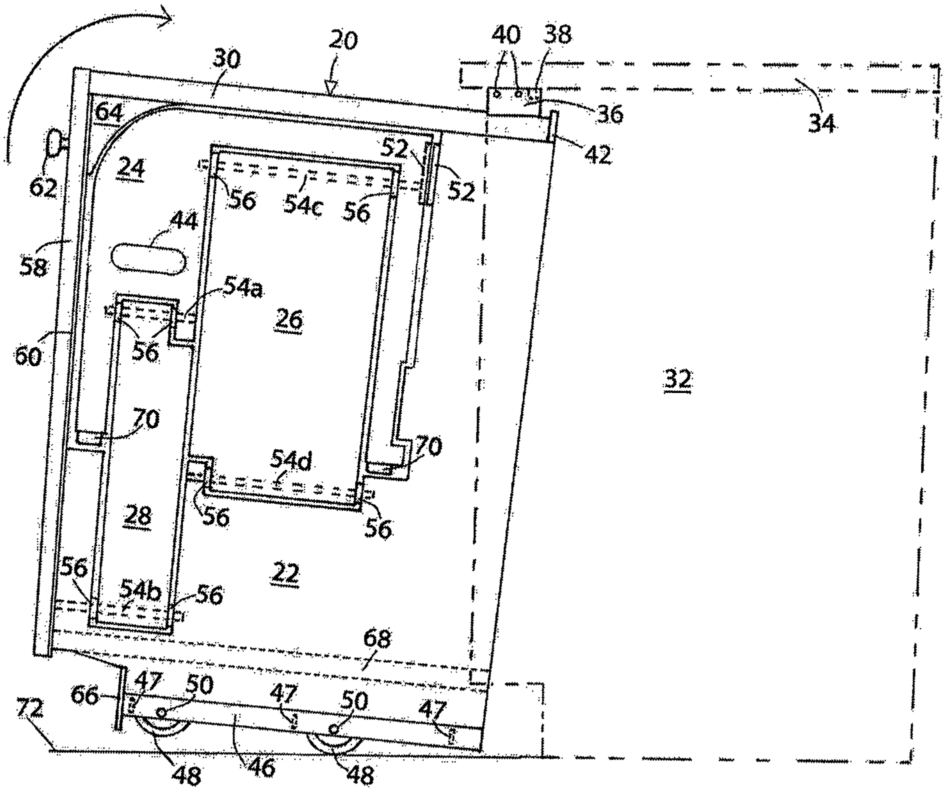
FIG. 9A is a side view of the lateral folding step unit in its up extended, install/removal tilt position.
Figure 9B:
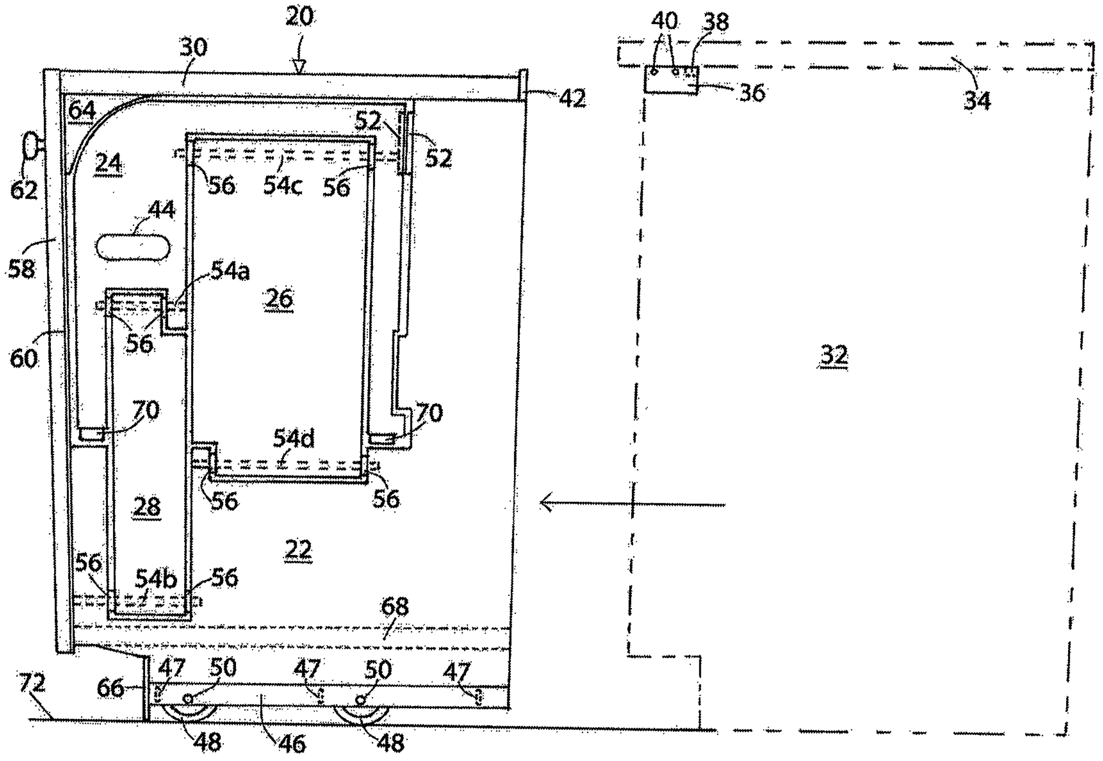
FIG. 9B is a side view of the lateral folding step unit in its up extended, removed from cabinet position.

In one construction, the optional lock 74, FIGS. 7-8B, is installed by replacing the upper step linkage bottom shaft 54*d* with an activating shaft 78. The activating shaft is the same diameter and in the same position as the upper step linkage bottom shaft 54*d* but extends back further into the rear portion of the vertical frame 22 as seen in FIG. 8B. When the step unit 20 is in its extended position, the lock 74 is positioned along the shaft 78 just in front of the base cabinet 32, shown in FIG. 7. A vertical rectangular cut out slightly larger than the lock 74 is cut out of the vertical frame 22. The lock 74 is rectangular shaped in this embodiment but any elongated shape would work so as to act as a locking cam. The lock 74 can be made out of wood metal, plastic etc.

When the step unit 20 is in the extended or stored position the lock 74 is in a vertical position stored within the vertical frame 22, such as illustrated in FIGS. 8A-8B. When the step unit 20 is in the extended and then deployed laterally, the lock rotates to a horizontal position or orientation. In this position the lock 74 overhangs the front face of the base cabinets 32 engaging the lock feature an shown in FIG. 7. Shaft lock pins 80 are used to transfer the rotational movement in the shaft 78 from the upper step linkage 26 to the lock 74 itself. The shaft lock pins 80 are installed through one hole drilled perpendicular through both the center axis of the shaft 78 and the thickness of the corresponding upper step linkage 26. The placement of the pin 80 can be generally anywhere along where the shaft 78 goes through the upper step linkage 26. Another shaft lock pins 80 is installed through one hole drilled perpendicular through both the center axis of the shaft 78 and through the thickness of the center of the corresponding lock 74, seen in FIGS. 7 and 8A. The shaft lock pin 80 could be substituted any other fastening mean such as a bolt, rivet, etc.

The lock 74 is activated when the user deploys the step unit 20 in its extended and deployed right, FIG. 7, or to left usable position (not shown). The lock 74 is deactivated when the user returns the step stool to its extended position, shown FIGS. 8A and 8B, allowing the step unit 20 to move freely into and out of the cabinet 32.

In one construction, the torsion spring 76 uses the rotational movement of the lock 74 to resist and store rotational energy of the step linkages 26, 28 and leg frame 24. The spring 76, in this embodiment, is installed behind the lock 74 in a rectangular opening in the vertical frame 22, see FIGS. 8A, 8B. The activating shaft 78 goes through the center of the spring's coils. The spring 76 is anchored to the lock 74 and to the vertical frame 22. In this embodiment a hole is drilled into the back side of the lock 74 where one end of the spring's leg can go into to be restrained. Another hole is drilled into the back of the spring's rectangular opening in the vertical frame 22 where the other end of the spring's leg can go into to be restrained, best shown in FIG. 8A.

In another construction, torsion springs 76', 76", FIGS. 10A-10B, uses the rotational movement between the upper step linkage 26 and leg frame 24 to resist and store rotational energy of the weight of the step linkages 26, 28 and leg frame 24. This embodiment uses two torsion springs 76', 76" on either top side of the upper step linkage 26, when looking at the step unit 20 orientated in the up position as seen in FIG. 10B. A larger hole is drilled horizontally centered around the hole for the shaft 54*c* and deep enough from either end of the upper step linkage 26 to insert each of the torsion springs 76', 76". Holes or notches are further needed to restrain the torsion spring's legs in both the upper step linkage 26 and the leg frame 24 shown in FIG. 10A. The torsion springs 76', 76" will also act and take up the same space as the spacers 56 allowing the spacers 56 to be omitted at these two points. This same method for the torsion springs 76', 76" placement can be used at either end of the upper or lower step linkages 26, 28 around the upper and lower step linkage shafts 54*a*, 54*b*, 54*d*. If the lower step linkage shafts 54*b* and/or 54*d* are used, the torsion spring leg holes would be drilled into the vertical frame 22 instead of the leg frame 24.

When utilizing the torsion springs 76', 76" in one or more of these locations, the weight of the leg frame 24, upper and lower step linkages 26, 28 is nearly cancelled out, thereby allowing the step unit 20 operation to feel near weightless for the user when lifting the handle 44. The torsion spring 76, is activated when the user deploys the step unit 20 in its extended and deployed right (FIG. 7) or left usable position. The one or more torsion springs 76, 76' and/or 76" are deactivated when the user returns the step stool to its up position, shown FIGS. 8A, 8B and 10A, 10B, for example.

Figure 11:
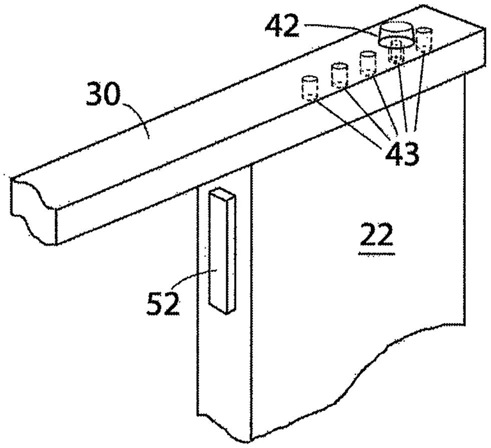
FIG. 11 is a perspective view close up of the adjustable bumper stop for the lateral folding desk unit or lateral folding step unit of FIG. 10B.

For constructions including a bumper stop 42 that is adjustable, such as shown in FIGS. 10B, 11, bumper stop mounting holes 43 are drilled into the top of the rear end of the handrail 30. The bumper stop mounting holes 43 are aligned linearly down the middle of the handrail 30. The bottom of the bumper stop 42 has a pin shaped end made preferably out of metal, for inserting into the bumper stop mounting holes 43. Both the bumper stop 42 and the bumper stop mounting holes 43 could be threaded so the bumper stop 42 would be screwed into place. The top of the bumper stop 42 should be made out of or coated with rubber to soften the contact with the guide stop 38, but other rigid material such as metal, plastic etc. Would be acceptable.

This construction of the bumper stop 42 allows the user to place or screw the bumper stop 42 into one of the front holes to keep the step unit 20 as close the cabinet as possible in the extended deployed position. Alternatively, the user can place or screw the bumper stop 42 into one of the rear holes to have the step unit 20 clear obstacles, such as cabinet handles, pulls or appliances (fridges, dishwashers, etc.) when in the extended deployed position.

Figure 12:
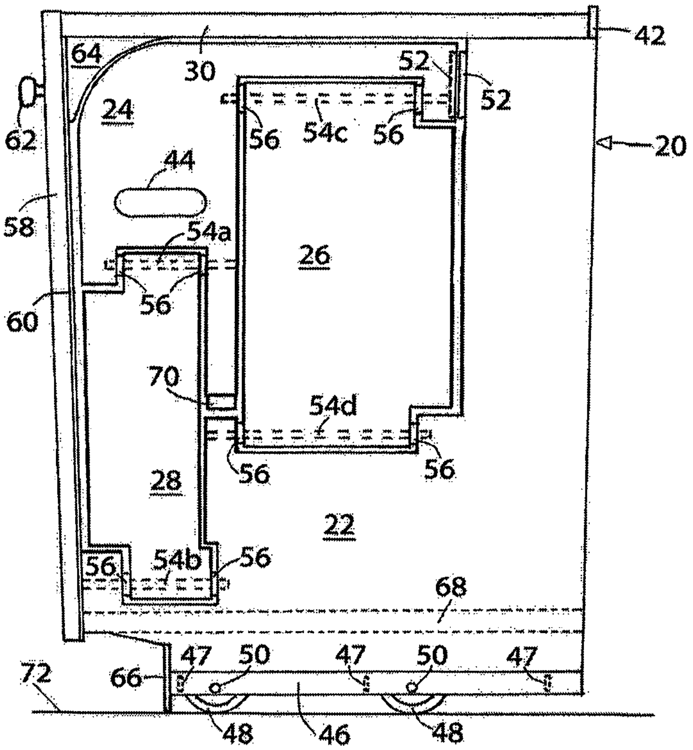
FIG. 12 is a side view of the lateral folding step unit showing a one-leg alternative embodiment in its up position.
Figure 13:
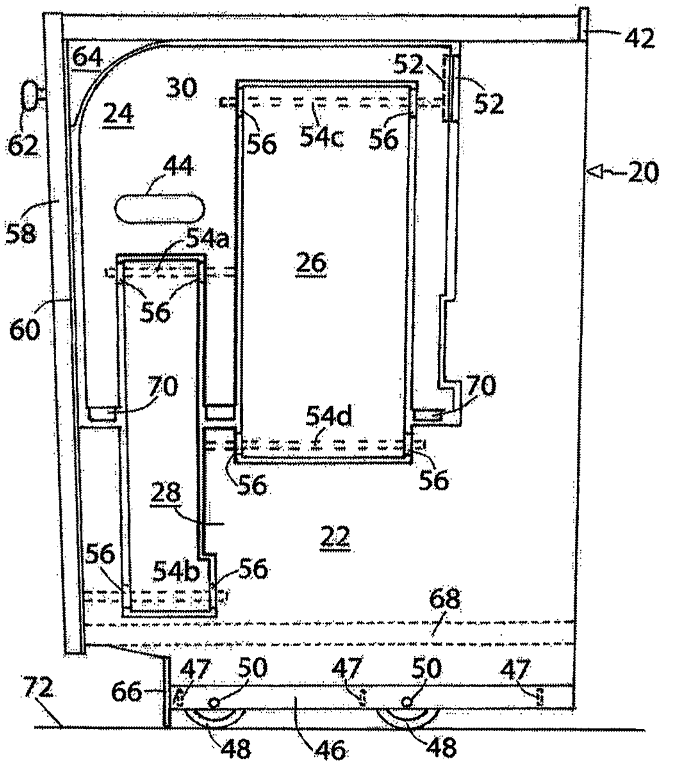
FIG. 13 is a side view of the lateral folding step unit showing a three-leg alternative embodiment in its up position.
Figure 14A:
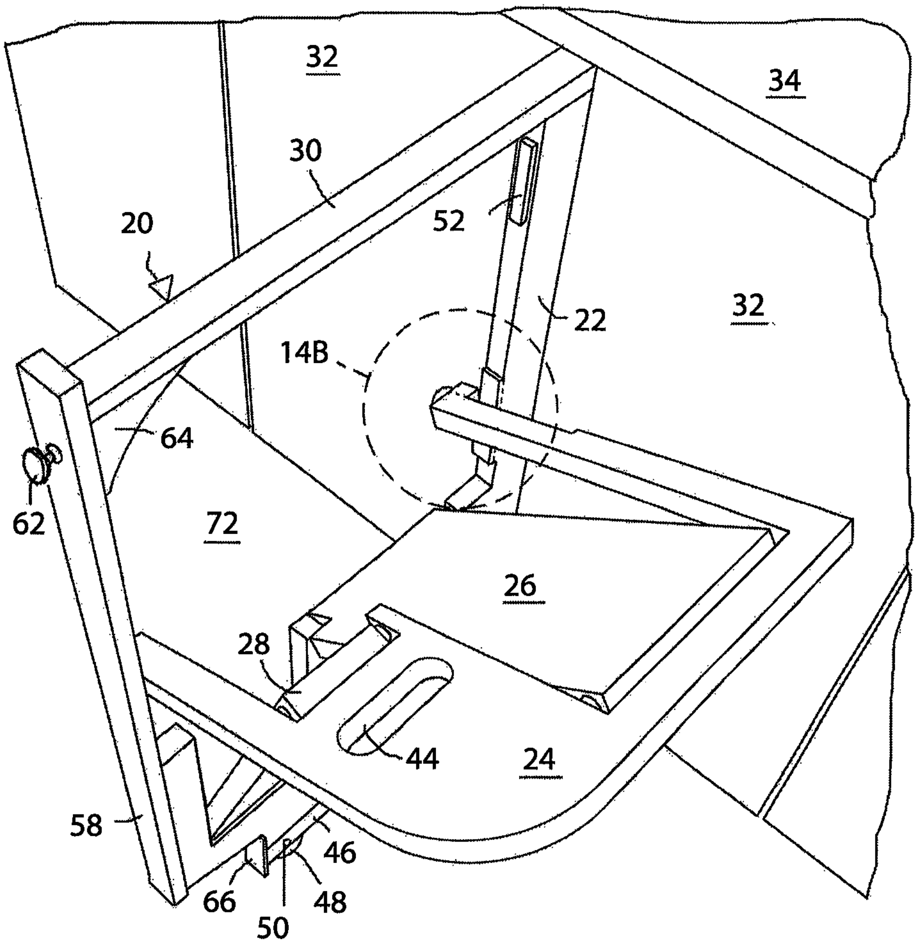
FIG. 14A is a perspective view of an anti-flip position for the lateral folding step unit.
Figure 14B:
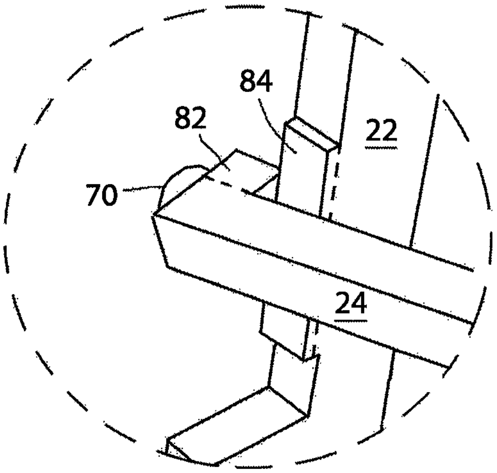
FIG. 14B is a perspective view close up of an anti-flip leg catch position for the lateral folding desk unit or lateral folding step unit of FIG. 14A.

Other constructions include the step unit 20 being built with a different number of legs on the leg frame 24. FIG. 12 shows the step unit 20 with a leg frame 24 containing one leg. This embodiment could be used if a deeper upper or lower step linkages 26, 28 were required. FIG. 13 shows the step unit 20 with a leg frame 24 containing three legs. This embodiment could be used if more support was required between the upper or lower step linkages 26, 28.

An alternative situation for use of at step unit according to the present invention is as a staircase between floor levels, such as illustrated beginning with FIG. 16A through 21. This type of staircase could be particularly useful in tight living areas, such as an apartment, a tiny house, a house boat or yacht with multiple levels, any multipurpose room, bunk beds, or wherever a staircase can take up valuable space. The bilateral motion of the staircase allows flexible mounting on either side of the area to be accessed. Alternatively, if there are two rooms with a dividing wall between the two and each room had a separate upper level, the folding staircase could be mounted within the wall between two spaces. A single step unit 20' staircase with one or more "middle" or intermediate step linkages 27 could then be utilized for both spaces depending on the way it was deployed, as described in more detail below.

Figures 17A, 17B:
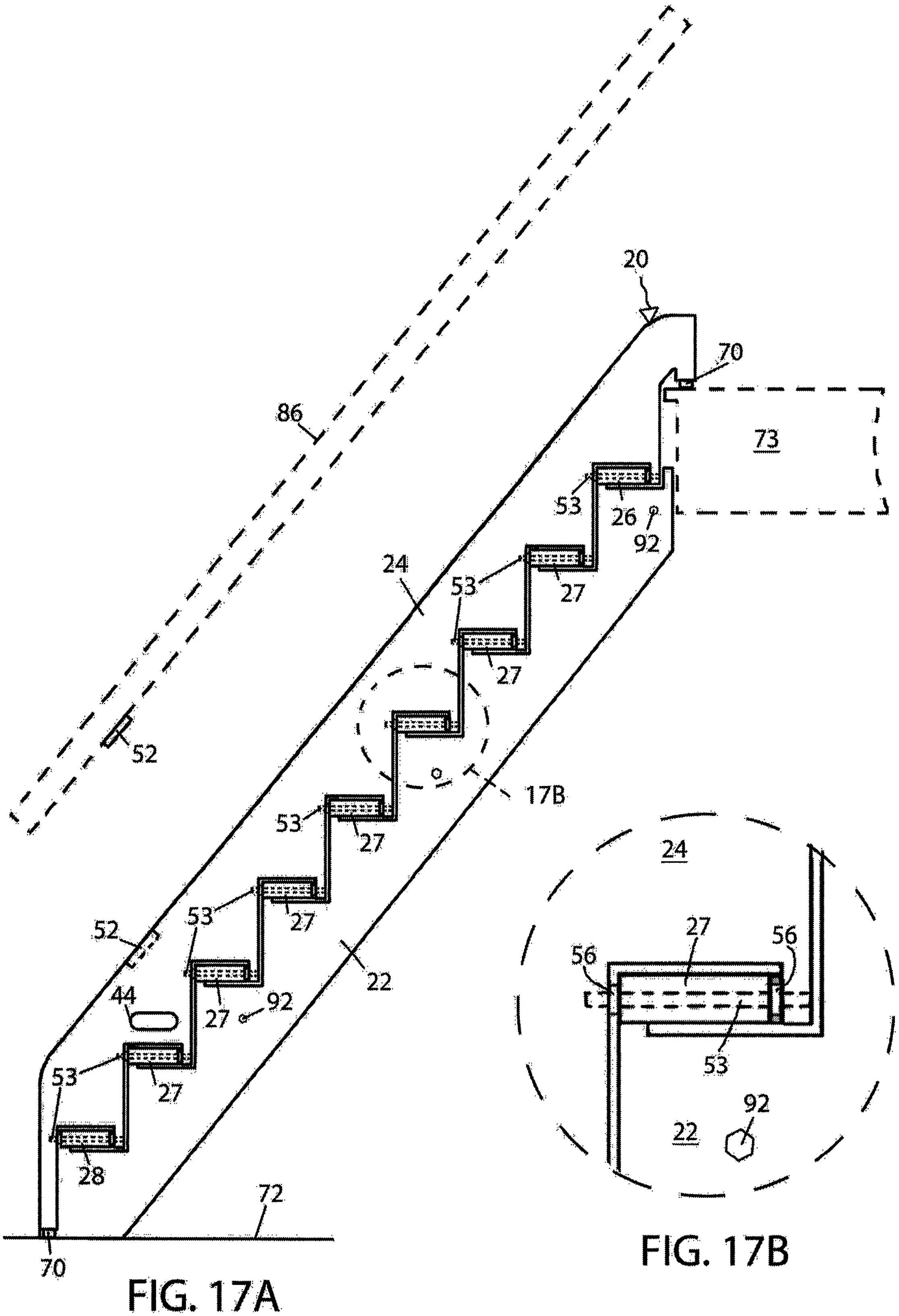
FIG. 17A is a right side view of the lateral folding step unit staircase in its extended, deployed position.
FIG. 17B is a right side view close up of the pivot area of the lateral folding step unit staircase of FIG. 17A.

Some additional parameters should be taken into account for the step unit 20' staircase embodiment: a) all the step linkages 26, 27, 28 preferably have the same depth; b) the height difference between each step linkage 26, 27, 28 preferably is the same; c) in the deployed position, such as shown in FIG. 17A, the lower end of the leg frame 24 should have the front leg on the floor 70; d) the upper end of the leg frame 24 should have the rear leg on the second floor 73 (FIG. 17A); e) the leg frame 24 would have substantial load bearing strength, to take into account the span from one level to the next, similar to a normal staircase; f) the vertical frame 22 would be attached to each of the floor 72, 73 or to the wall 90 with appropriate hardware. Also, if the vertical frame 22 is to be attached only at its ends at each floor 72, 73, then it would also have substantial load bearing strength to take into account the span from one level to the next.

With one or more additional intermediate step linkages 27 between the upper and lower step linkages 26, 28, the step unit 20' becomes a staircase for access between one floor 72 and a second floor 73. The following drawings FIGS. 16A-21 illustrate the step unit 20' staircase main components, which include a vertical frame 22, a hand operated leg frame 24, and multiple step linkages 26, 27, 28. All of these components lay on the same geometric flat plane when stored in the vertical position, see FIGS. 16A, 18A, 18B. All of these components can be made out of a sheet of rigid material such as wood but metal, plastic, or a combination of these and or other rigid materials would be acceptable. The step unit 20' staircase can be deploy laterally right shown in (FIGS. 19A and 20A) when mounted to a wall 90 on the left of a room or laterally left shown in (FIGS. 19B and 20B) when mounted to a wall 90 on the right of a room. Additionally, the step unit 20' staircase can be deploy laterally right or left shown in (FIG. 21) when mounted within a wall 90 between two rooms.

Figure 19A:
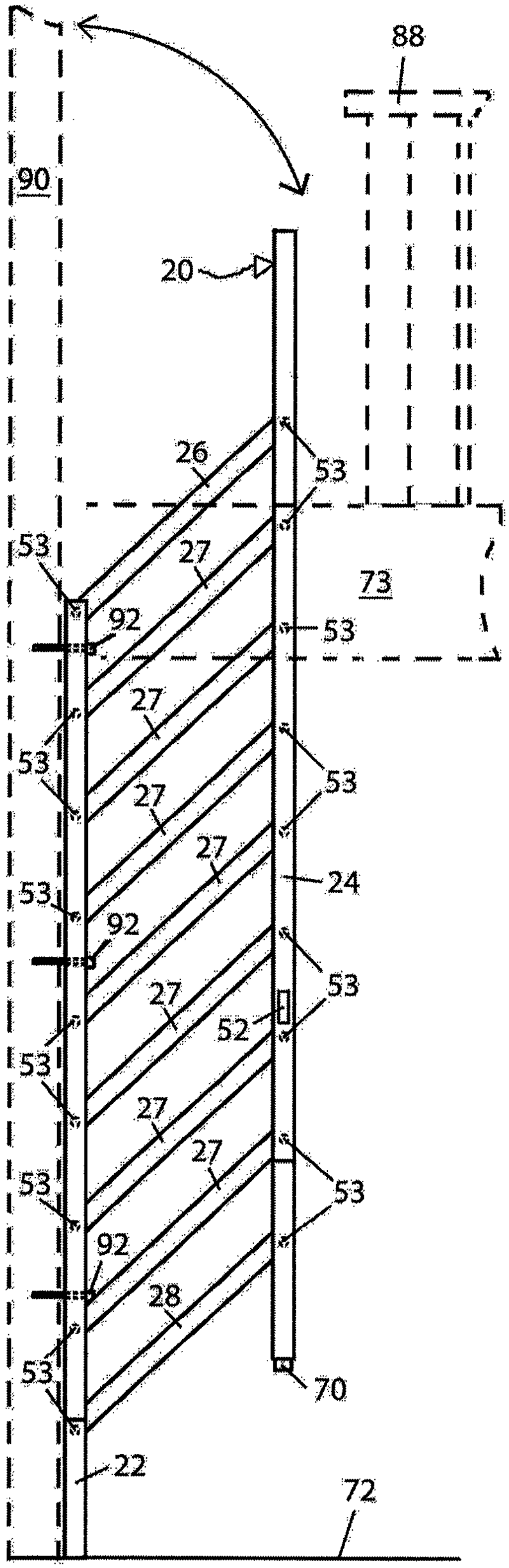
FIG. 19A is a front view of the lateral folding step unit staircase in its extended and deploying 45 degree right position mounted to a left sided wall.
Figure 19B:
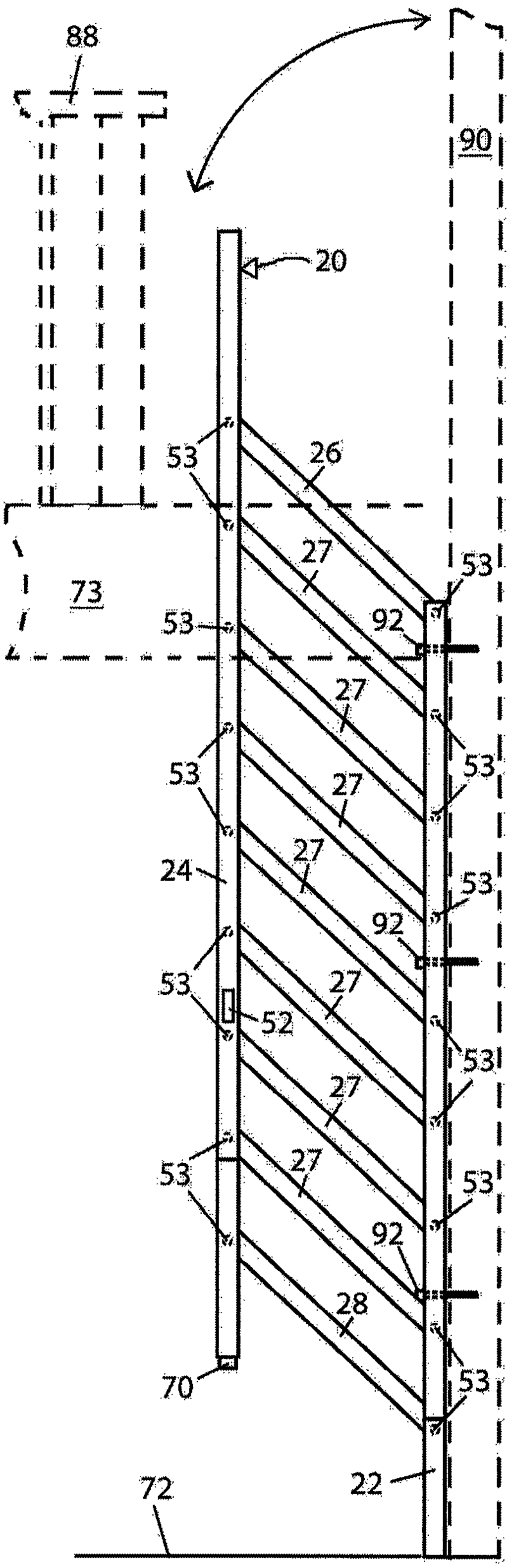
FIG. 19B is a front view of the lateral folding step unit staircase in its extended and deploying 45 degree left position mounted to a right sided wall.

Best seen in FIGS. 19A and 19B, an upper step linkage 26, intermediate step linkages 27, and lower step linkage 28 are pivotally attached to the vertical frame 22. All step linkages 26, 27, 28 are substantially deep enough to be used as a step. The lower step, linkage 28 is oriented in front of the intermediate step linkages 27 and each sequential intermediate step linkage 27 is oriented in front of the upper step linkage 26. The lower step linkage 28 also is mounted lower than the lowest intermediate step linkage 27 and each sequential intermediate step linkages 27 is mounted lower than the upper step linkage 26 shown in FIGS. 16A and 17A. All steps linkages 26, 27, 28 have the same width best shown in FIGS. 20A and 20B.

Figure 16A:
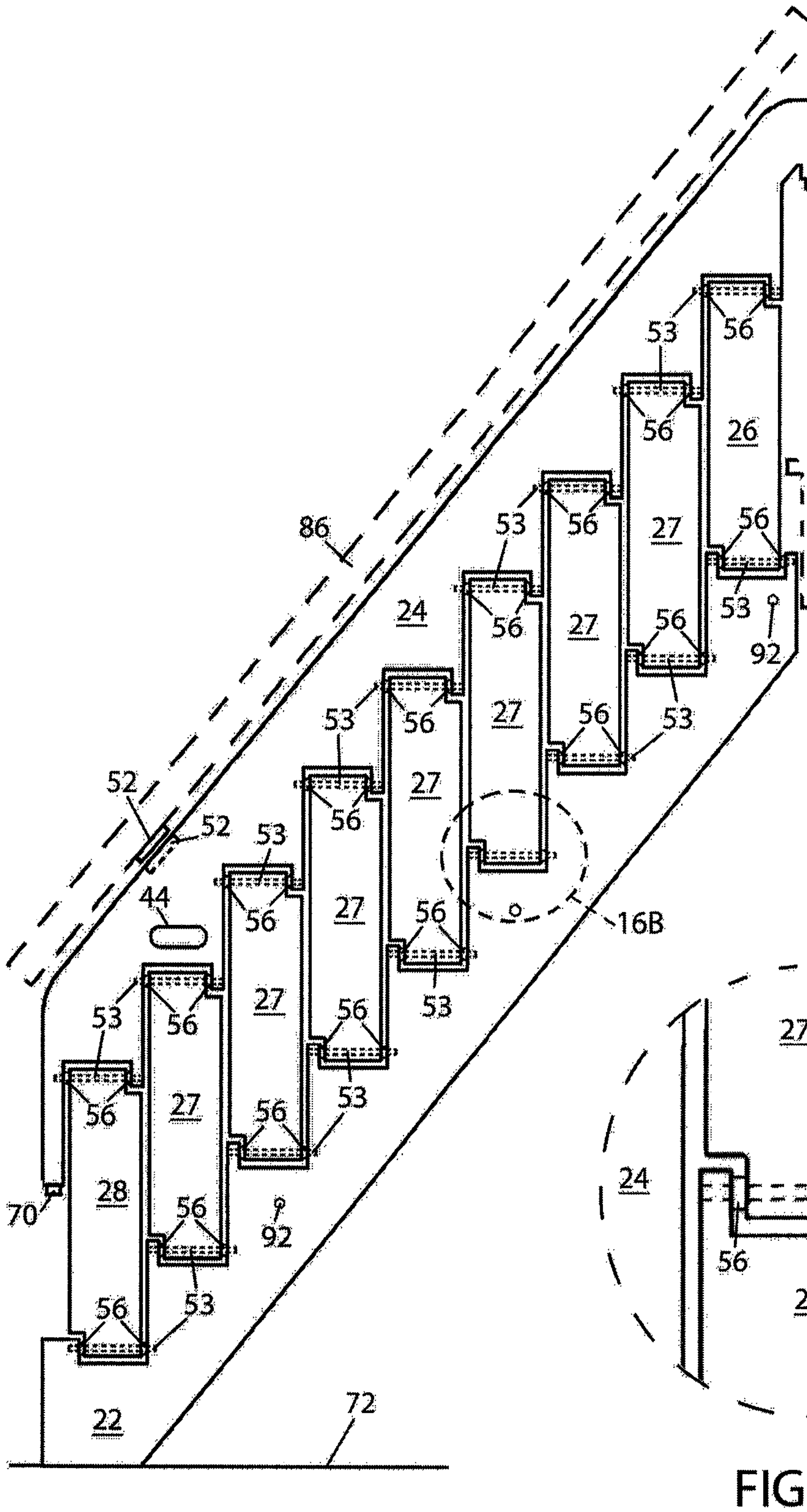
FIG. 16A is a right side view of a lateral folding step unit staircase according to the present invention in its collapsed, stored position.

In this construction, leg frame 24, FIG. 16A, has two legs and is pivotally connected to all step linkages 26, 27, 28 respectively. The leg frame 24 lays in the same geometric plane as the upper step linkage 26, intermediate step linkages 27, lower step linkage 28, and vertical frame 22, when in the stored position. The leg frame 24, frames the top of all the step linkages 26, 27, 28 and move up diagonally to the second floor. The back leg raises above the upper step linkage 26 by the height of another step. The front leg extends almost midway down the front side of the lower step linkage 28. Attached to the bottom each leg is an anti-slip foot 70, made preferably out of rubber.

An oval shaped opening, substantially sized for one's hand, in the leg frame 24 is used as an operating handle 44. At least one operating handle 44 is cut out in the space directly above one or more of the lower intermediate step linkage 27 and directly in front of the next higher intermediate step linkage 27, seen in FIGS. 16A, 17A. A mechanical or magnet latch 52 can be located anywhere on the top diagonal portion of leg frame 24, preferable near the handle 44. The magnet latch 52 is installed so it is flush with the surface, best seen in FIGS. 16A and 17A. The magnet latch 52 could be substituted with any form of mechanical latch.

In this staircase embodiment, the following will explain how the step linkages 26, 27, 28 are pivotally attached to both the vertical frame 22 and leg frame 24. The FIG. 16A best shows the following: When orientated in the stored position, two holes are drilled, end to end, horizontally through the depth of the each linkage steps 26, 27 and 28. These two holes include, one hole at the bottom of each step linkage 26, 27, 28 and one hole for the top of each step linkage 26, 27, 28. Holes are then drilled horizontally through the corresponding adjacent position, on either side of the bottom of each step linkage 26, 27, 28, into the vertical frame 22. (FIG. 16B) Holes are then drilled horizontally through the corresponding adjacent position, on either side of the top of each step linkage 26, 27, 28, into the leg frame 24 (FIG. 17B).

Figure 16B:
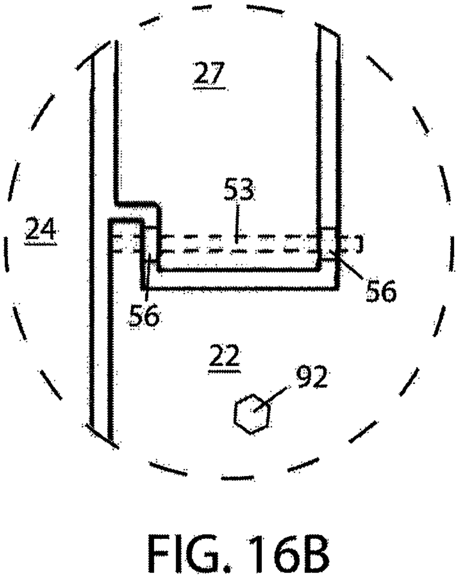
FIG. 16B is a right side view close up of the pivot area of the lateral folding step unit staircase of FIG. 16A.

A connective component such as a shaft 54 best shown in FIGS. 16A, 16B, 17B, is then inserted through holes in the lower and upper ends of all the steps linkages 26, 27, 28 and through the corresponding adjacent position in the vertical frame 22 and leg frame 24 to allow pivotal rotation. Spacers 56 are also installed surrounding the shafts 54 between the spaces between the steps linkages 26, 27, 28, the vertical frame 22, and leg frame 24 to produce a clearance for the steps linkages 26, 27, 28, vertical frame 22, and leg frame 24 to operate without touching.

In this embodiment of the step unit 20' staircase in its up position, a corresponding magnetic latch 52 is attached onto the stair rail 86. It is attached on the opposite adjacent side to the leg frames, magnetic latch 52 position, as shown in FIG. 16A. The magnet latches 52 are used to hold the step linkages 26, 27, 28 and leg frame 24 in the up position. Any other type of magnetic or mechanical latch could be used as a holding device.

Lastly, the vertical frame 22, can be connected to the wall 90 with bolts 92 or other appropriate hardware, screws, etc. best seen in FIGS. 18A-20B. If installed within the wall 90, the vertical frame 22 can be sandwiched or built directly into the framing of the wall. The wall 90 can then be built around the step unit 20' staircase.

Figures 18A, 18B:
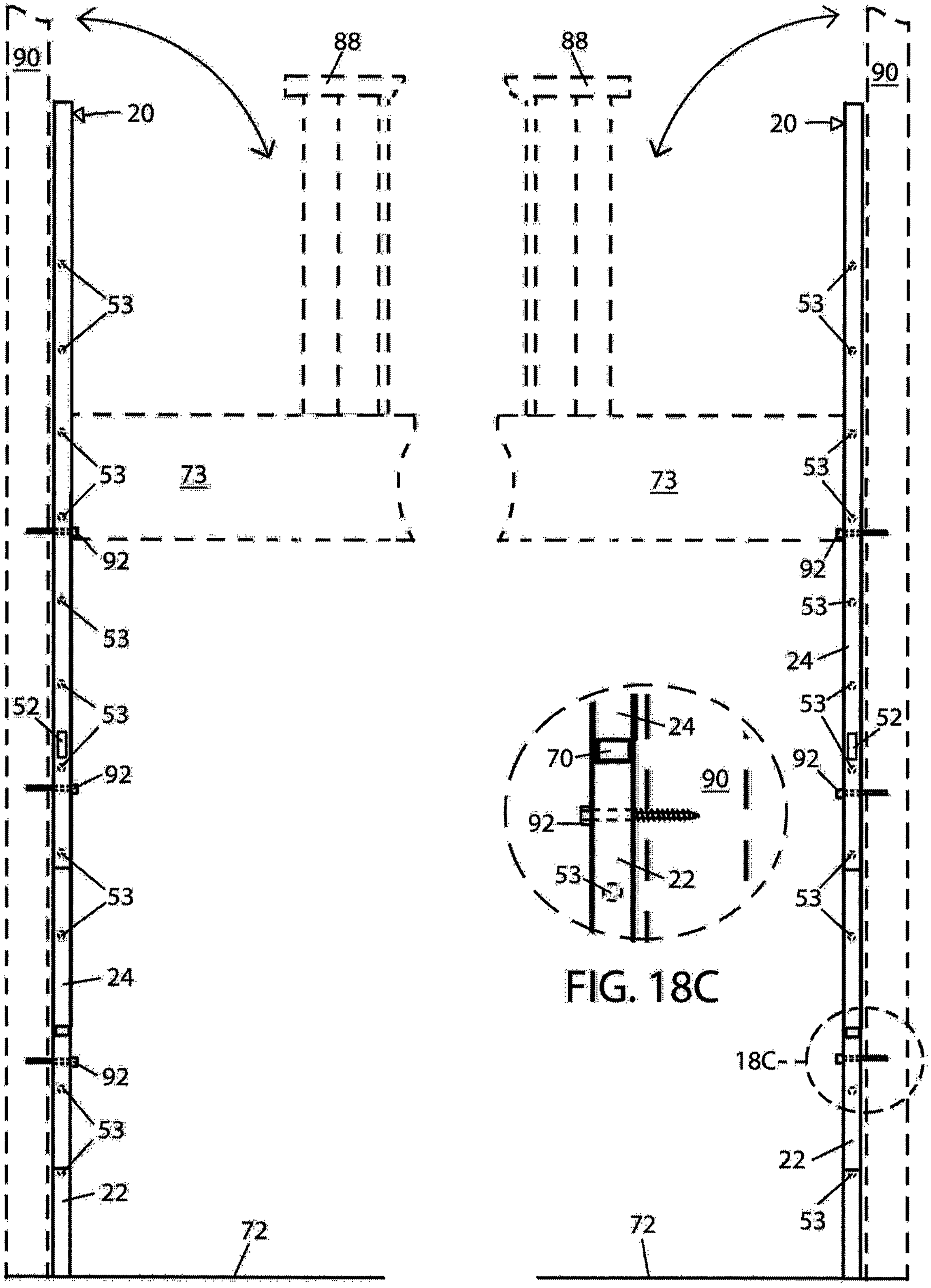
FIG. 18A is a front view of the lateral folding step unit staircase in its stored position mounted to a left sided wall.
FIG. 18B is a front view of the lateral folding step unit staircase in its stored position mounted to a right sided wall.
Figure 20A:
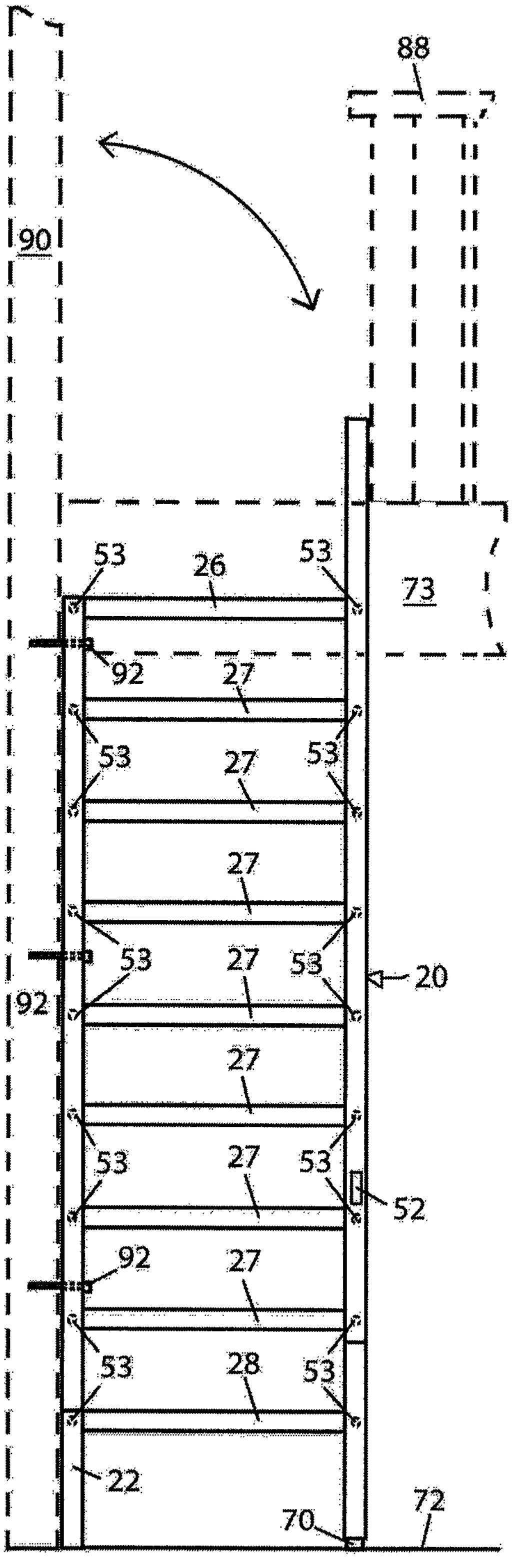
FIG. 20A is a front view of the lateral folding step unit staircase in its extended position mounted to a left sided wall.
Figure 20B:
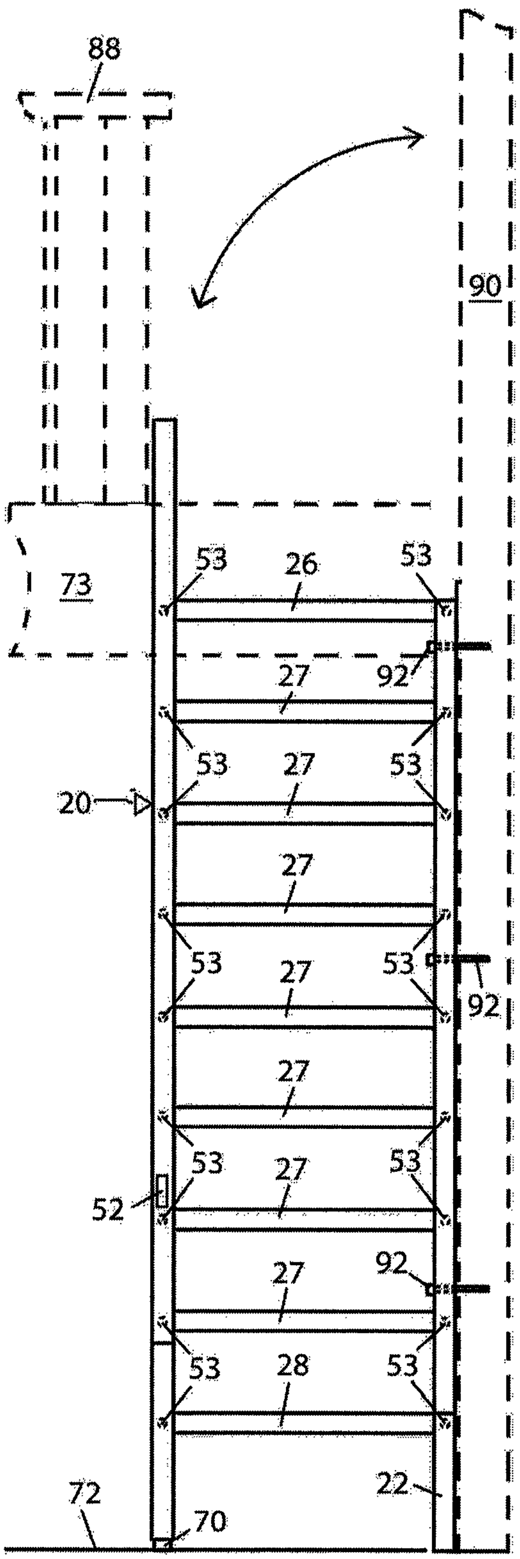
FIG. 20B is a front view of the lateral folding step unit staircase in its extended position mounted to a right sided wall.
Figure 21:
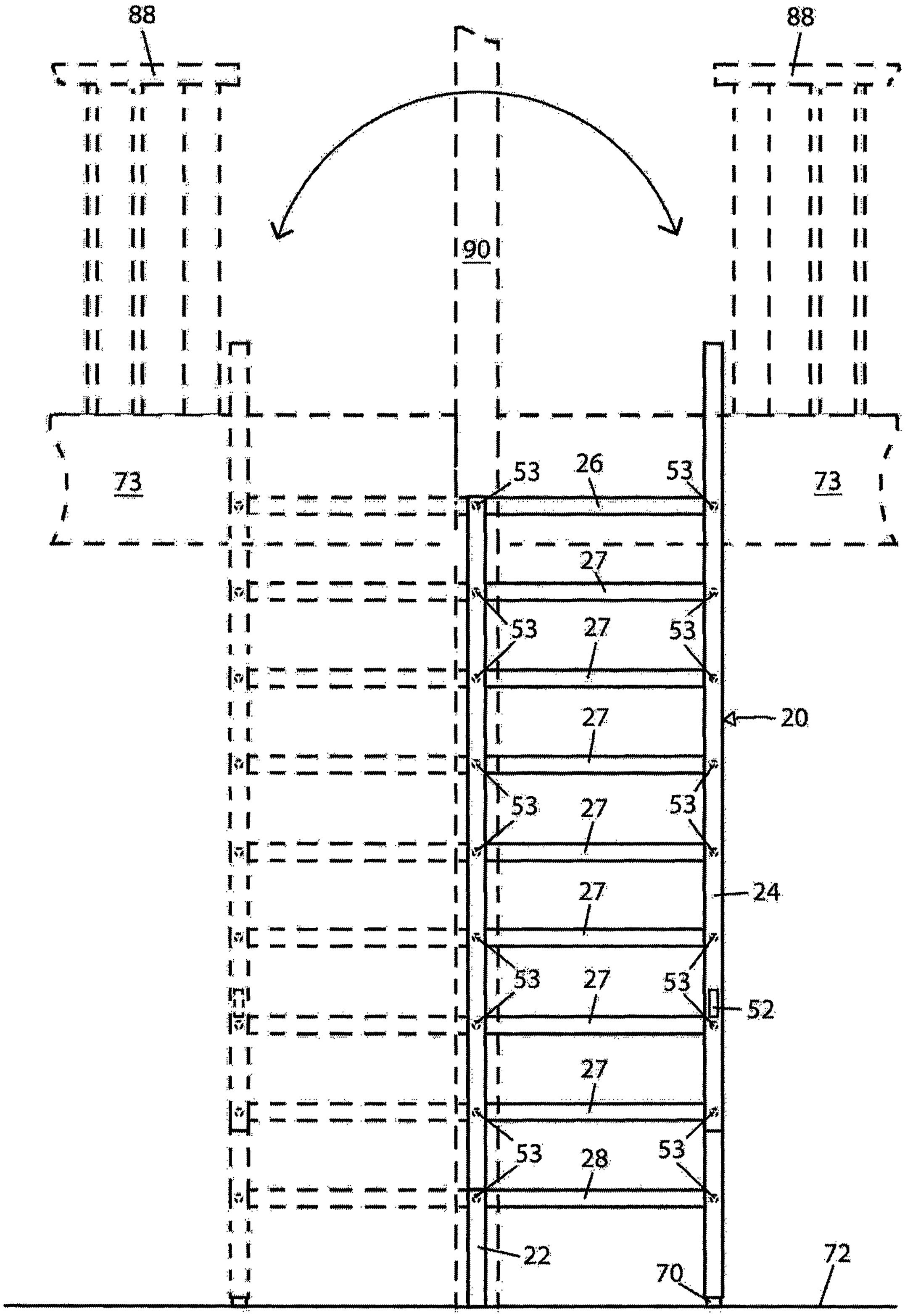
FIG. 21 is a front view of the lateral folding step unit staircase in its extended both right and left position mounted inside the middle of a wall.

During use, the step unit 20' staircase would be folded against a left or right sided wall 90 when not in use shown in FIGS. 16A, 18A, 18B. When access is needed in areas such as a second floor 73 living area or loft, one can pull the operating handle or handles 44 that is integrated into leg frame 24. By pulling laterally, the leg frame 24 will release from the magnetic latch 52 between the vertical frame 22 and the leg frame 24. In an parallel arced motion, the leg frame 24 will transition away from the vertical frame 22. As the leg frame 24 moves so do the step linkages 26, 27, 28, rotating until the leg frame 24 contacts the lower floor 72 and upper floor 73. Through this stage, the step linkages 26, 27, 28 move parallel in relation to each other from the initial vertical "stored" position to the horizontal "in use" position, seen in FIGS. 17A and 19A-20B. The top section of the leg frame 24 should come tight against a baluster 88 or wall in the down position as shown in FIGS. 20A-21 for safety. Then the step unit 20' staircase can then be used as a conventional staircase. After use, or if more floor space is needed, the step unit 20' staircase can then be returned to its vertical stored position by grabbing the operating handle 44, and with one arched motion reposition the leg frame 24, with the pivotally attached step linkages 26, 27, 28, back within the vertical frame 22. The magnetic latch 52 will automatically engage, as seen in FIGS. 16A, 18A, 18B.

The same action is used for a step unit 20' staircase that is folded within a wall 90, but the user then has the choice of deploying the step unit 20' laterally to the left or to the right as shown in FIG. 21. This would allow access to two lofts or second floor 73 living spaces and the ability to easily store the step unit 20' staircase out of the way for both ground floor rooms.

Another alternative situation for use of the step unit according to the present invention is as a wall mounted step unit 20, such as illustrated in FIG. 22A-25, 34A-37. This type of step unit 20 could be particularly useful in tight living areas, such as an apartment, a tiny house, boat, bathroom, closets, or wherever a typical step stool can take up valuable space. The bilateral motion of the step unit 20 allows flexible mounting, easily attaching to the left side or right side of a wall. Alternatively, if there are two rooms with a dividing wall between the two areas and each area needed a step unit 20 to function for additional height access, the wall mounted step unit 20 could be mounted within the wall between two spaces. A individual step unit 20 could then be utilized for both spaces depending on the way it was deployed, as shown FIG. 30A-33B.

Figure 24:
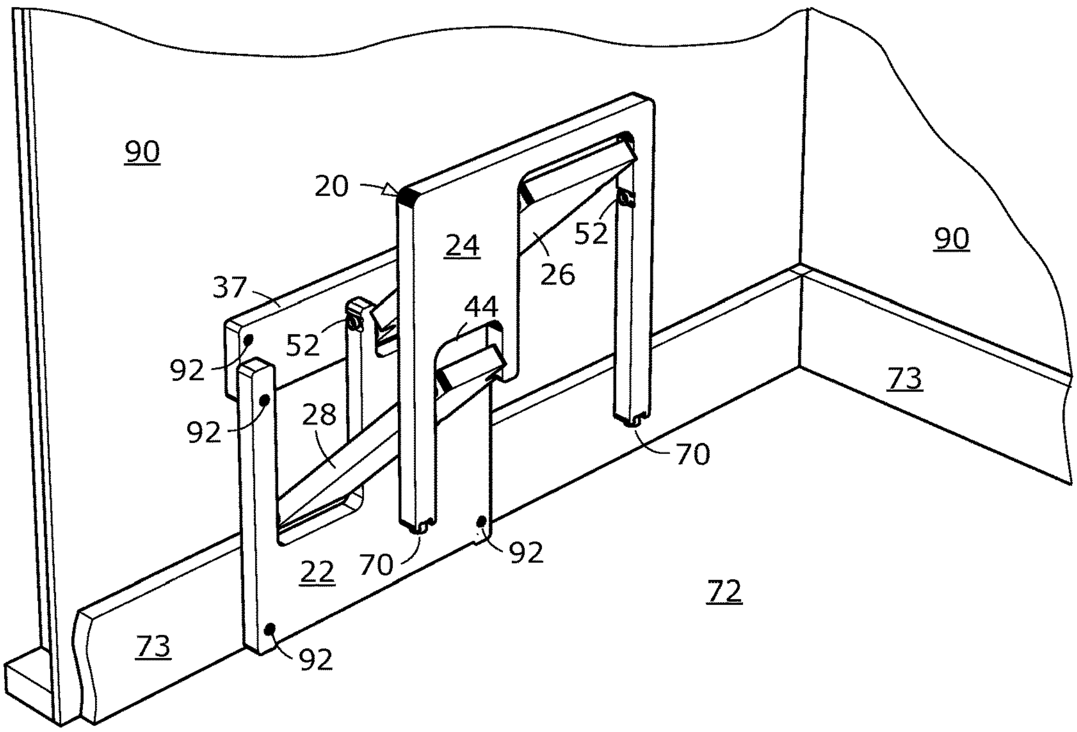
FIG. 24 is a perspective view of the lateral folding step unit, wall mounted, in its deploying 45-degree right position.
Figure 25:
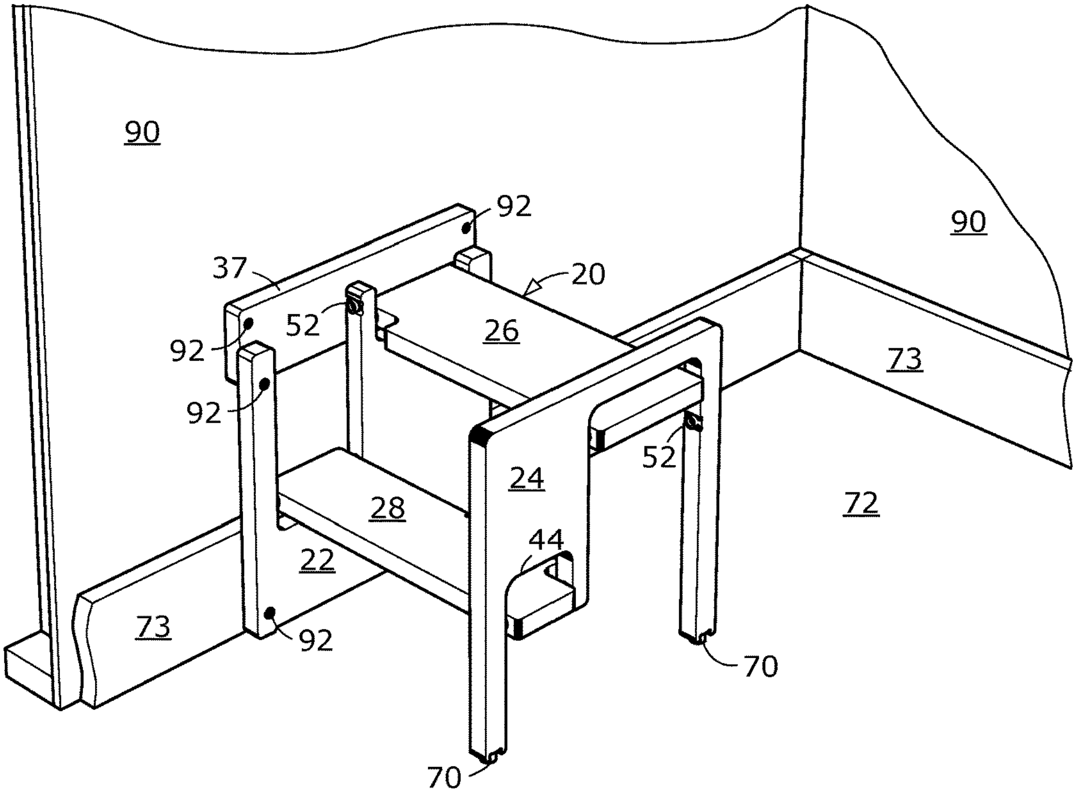
FIG. 25 is a perspective view of the lateral folding step unit, wall mounted, in its deployed right position.
Figure 26:
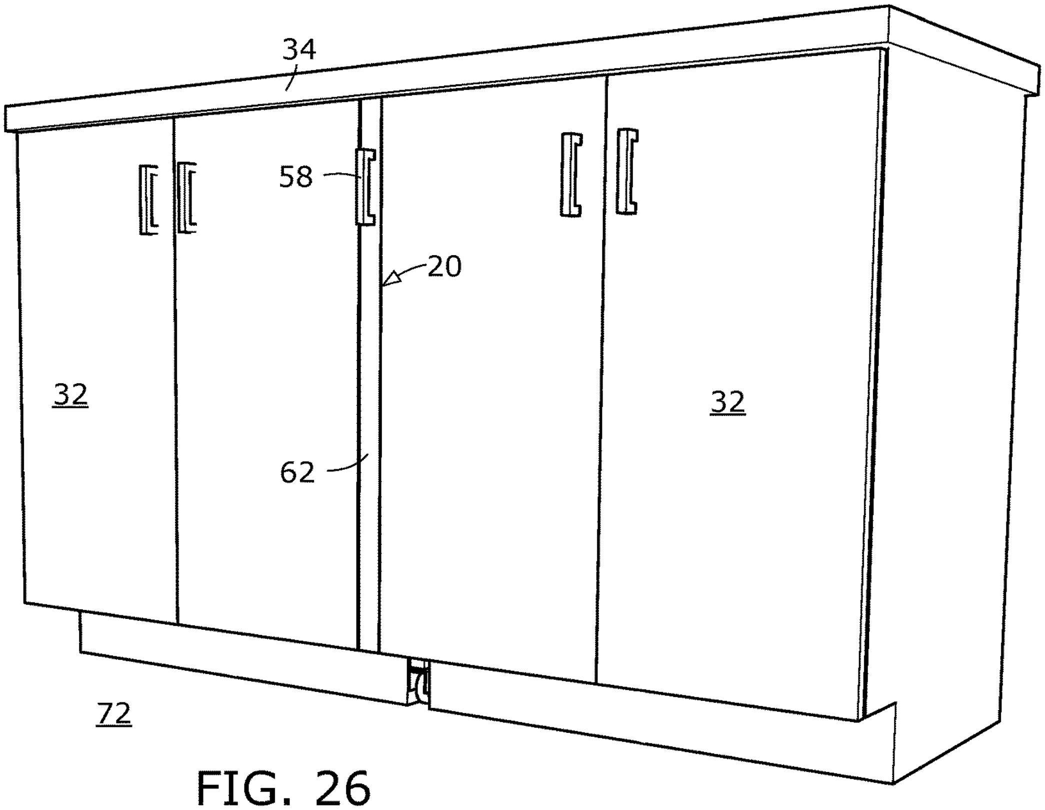
FIG. 26 is a perspective view of a lateral folding step unit, single step, in its collapsed, retracted stored position between two cabinets.

Some additional parameters should be taken into account for the step unit 20 wall mounted embodiment: the vertical frame 22 would be attached to a mounting plate 37 with appropriate hardware 92 and the mounting plate 37 would be attached to the wall 90, at a specific height above the floor 90 or baseboard trim 73, with appropriate hardware 92, shown in FIGS. 24 and 25. If mounting within a dividing wall 90, the vertical frame 22 will be attached directly to the wall 90, with appropriate hardware 92, best shown in FIGS. 32A, 33A and 33B.

Figure 22A:
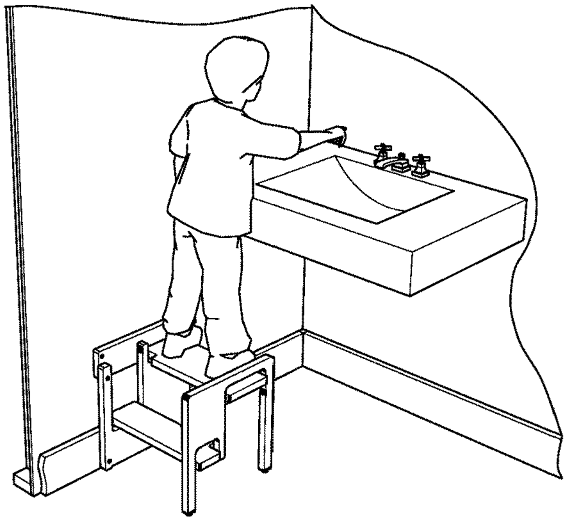
FIG. 22A is a perspective "in use" view of a lateral folding step unit, left side wall mounted, in its deployed right position.
Figure 22B:
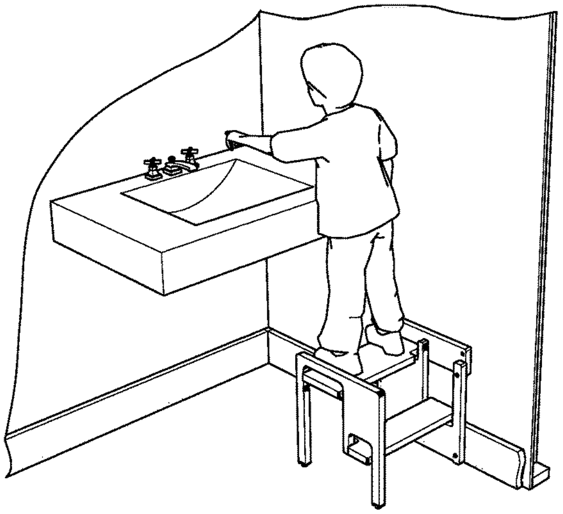
FIG. 22B is a perspective "in use" view of the lateral folding step unit of FIG. 22A, left side wall mounted, in its deployed left position.
Figure 23:
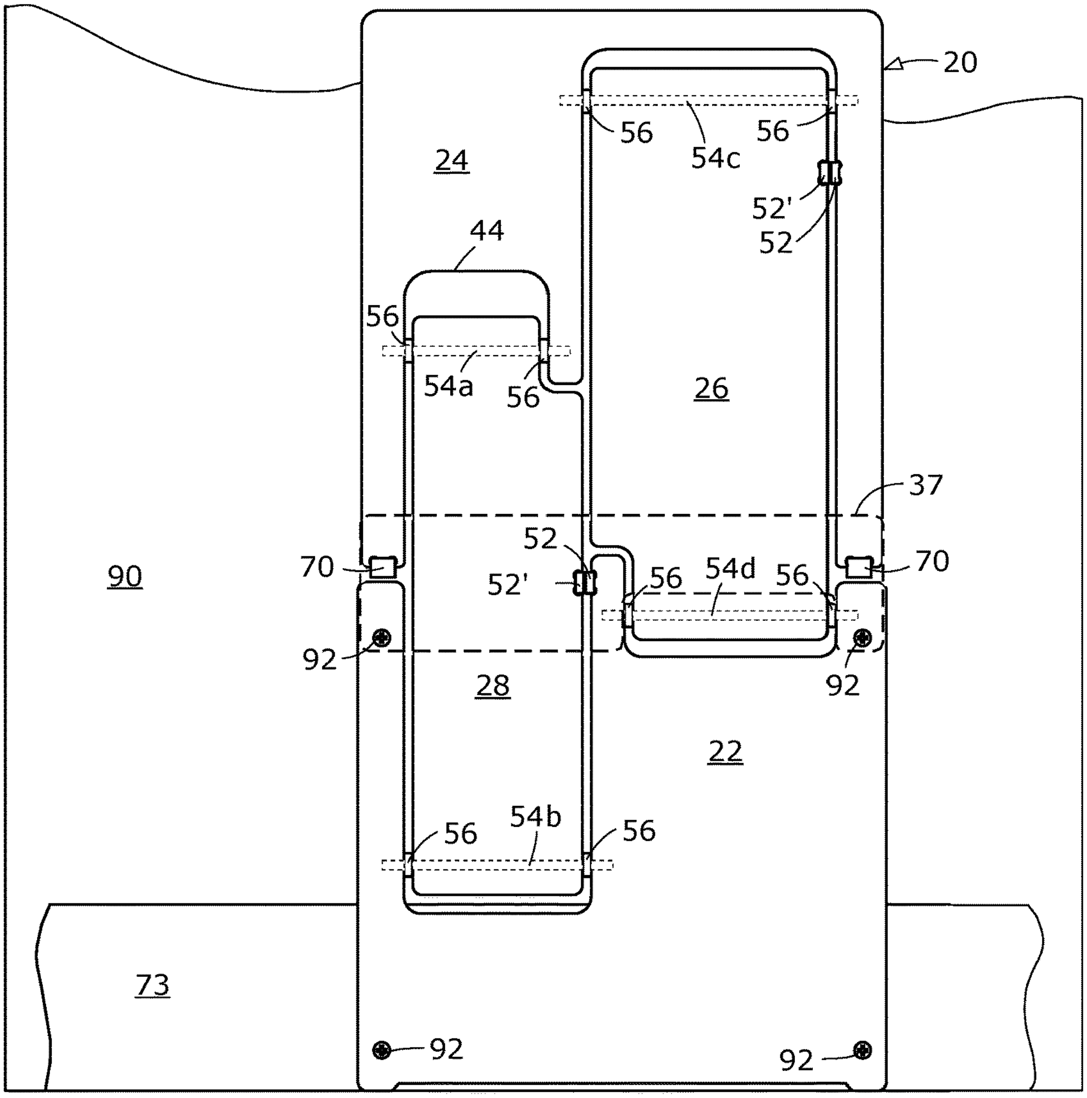
FIG. 23 as a right side view of the lateral folding step unit, wall mounted, in its retracted stored position.
Figure 34A:
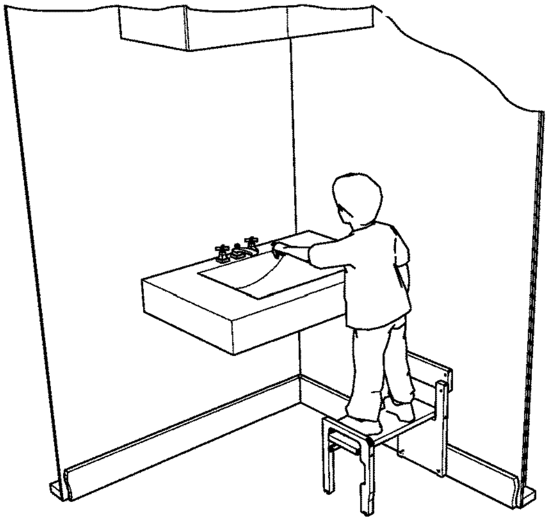
FIG. 34A is a perspective "in use" view of a lateral folding step unit, left side wall mounted, single step, in its deployed right position.
Figure 34B:
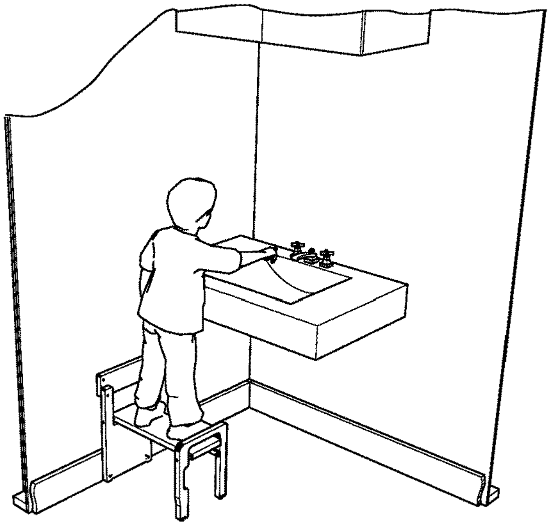
FIG. 34B is a perspective "in use" view of the lateral folding step unit of FIG. 34A, left side wall mounted, single step, in its deployed left position.
Figure 35:
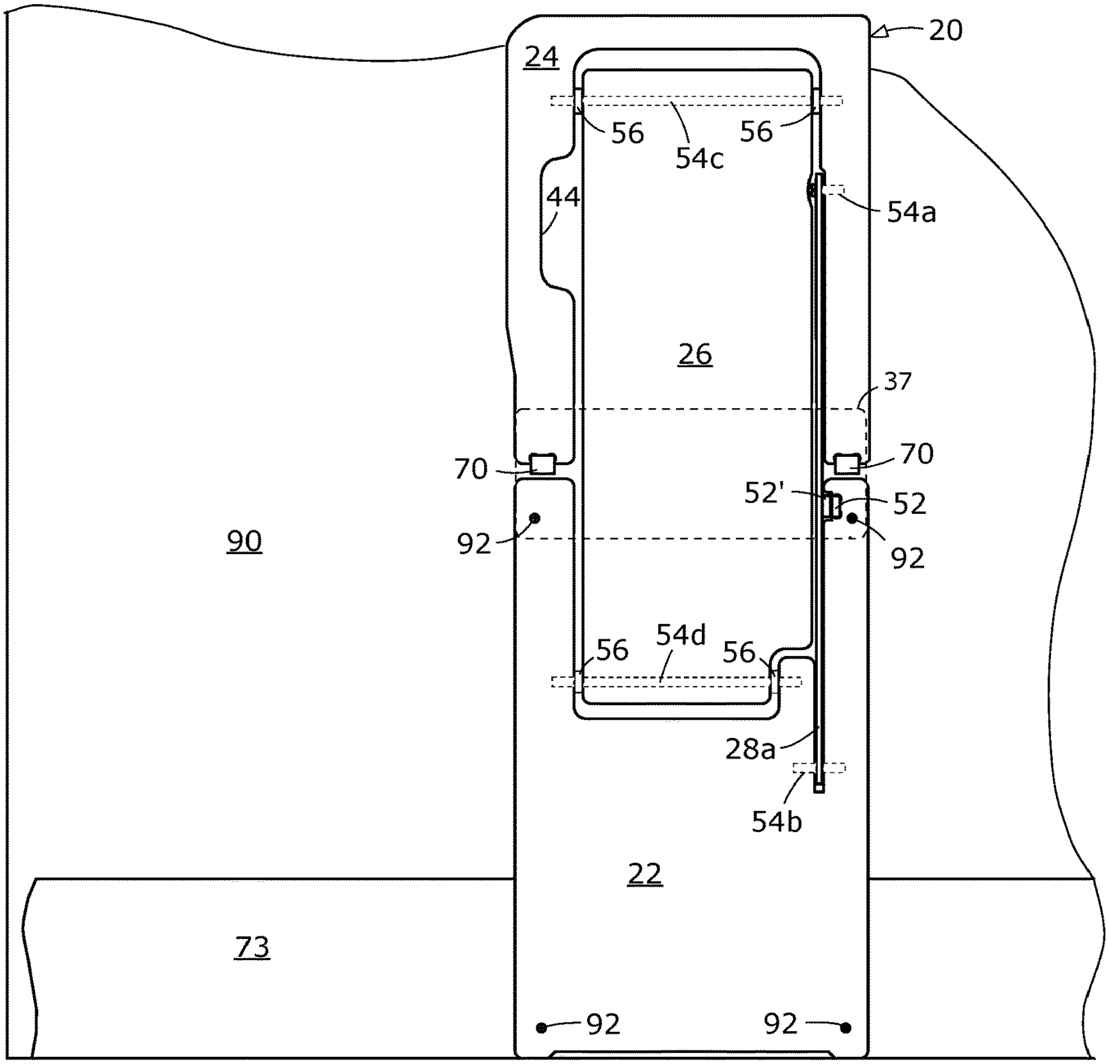
FIG. 35 as a right side view of the lateral folding step unit, wall mounted, single step, in its retracted stored position.

The following drawing FIGS. 23 and 35, illustrate the step unit 20 main components, which include a vertical frame 22, a hand operated leg frame 24, and step linkages 26, 28 shown in FIGS. 22A-25, or alternatively a step linkage 26 and linkage 28*a*, shown in FIGS. 30A-37. All of these components lay on the same geometric flat plane when stored in the vertical position, All of these component can be made out of a sheet of rigid material such as wood but metal, plastic, or a combination of these and or other rigid materials would be acceptable. The step unit 20 can be deploy laterally right shown in (FIGS. 22A and 34B) when mounted to a wall 90 on the left of a room or laterally left shown in (FIGS. 22B and 34A) when mounted to a wall 90 on the right of a room. Additionally, the step unit 20 can be deploy laterally right or left shown in (FIG. 30A-33B) when mounted within a wall 90 between two rooms.

As best shown in FIGS. 22A-25, an upper step linkage 26 and a lower step linkage 28 are pivotally attached to the vertical frame 22. Both step linkages 26 and 28 are substantially deep enough to be used as a step. When both step linkages 26, 28 are orientated in the stored position, shown in FIG. 23, they are in the same geometric plane as the vertical frame 22. The lower step linkage 28 is oriented in front of the upper step linkage 26. The lower step linkage 28 also is mounted lower than the upper step linkage 26. In this embodiment, the upper step linkage 26 is deeper than the lower step linkage 28 to provide a larger working platform. Both steps linkages 26 and 28 have the same width, best shown in FIG. 25.

The leg frame 24, best shown in FIGS. 23-25, in this construction is formed of two legs and is pivotally connected to both the upper ends of the upper and lower step linkages 26 and 28, respectively. The leg frame 24 lays in the same geometric plane as the upper step linkage 26, lower step linkage 28, and vertical frame 22, when in the stored position. The leg frame 24 frames the top of both the upper and lower step linkages 26 and 28 with the back leg extending down toward the bottom of the back side of the upper step linkage 26. The front leg extends almost midway down the front side of the lower step 28. The bottom of both legs of the leg frame 24 are generally parallel to the floor. Attached to the bottom each leg is an anti-slip foot 70, made preferably out of rubber. An oval shaped opening, substantially sized for an intended user's hand, created in the leg frame 24 is used as a operating handle 44. The operating handle 44 is cut out in the space directly above the lower step linkage 28 and directly in front of the upper step linkage 26 in this construction. An optional magnet latches 52 is located on the front top portion of the rear leg on the leg frame 24. The magnets 52 are installed so it is flush with the surface, best seen in FIG. 23.

Figure 32A:
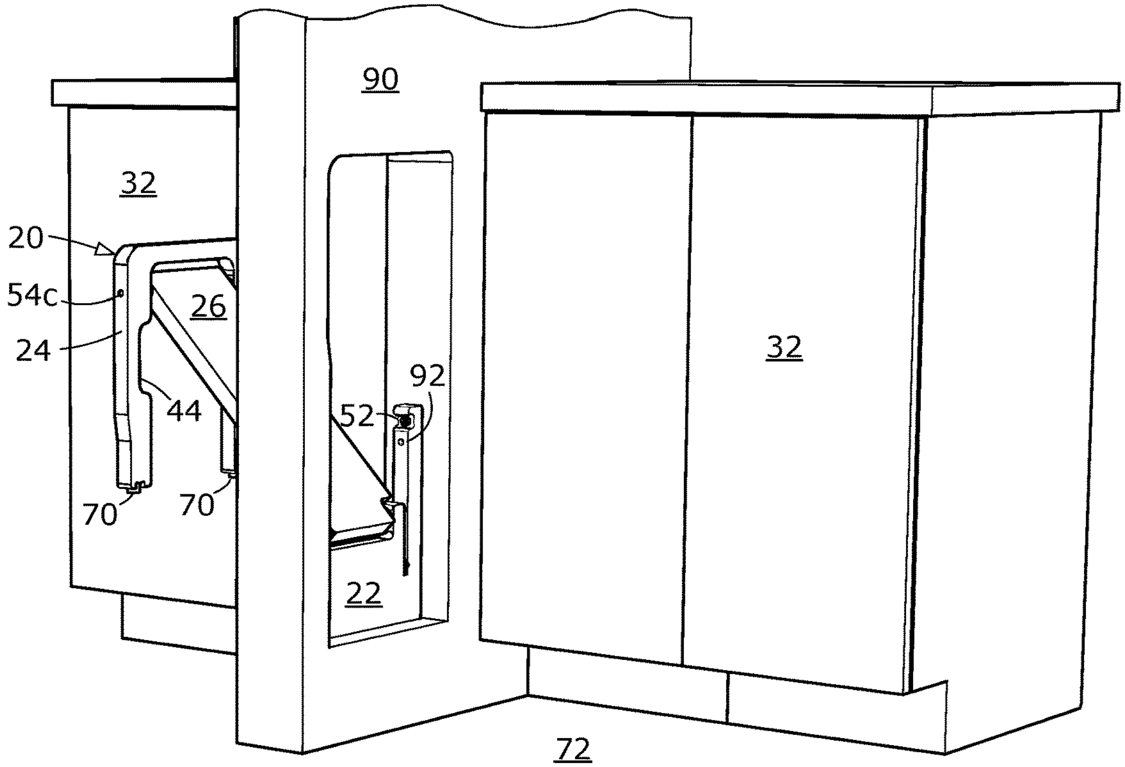
FIG. 32A is a perspective view of the lateral folding step unit, single step, in its deploying 45 degree left position, mounted in the wall.
Figure 32B:
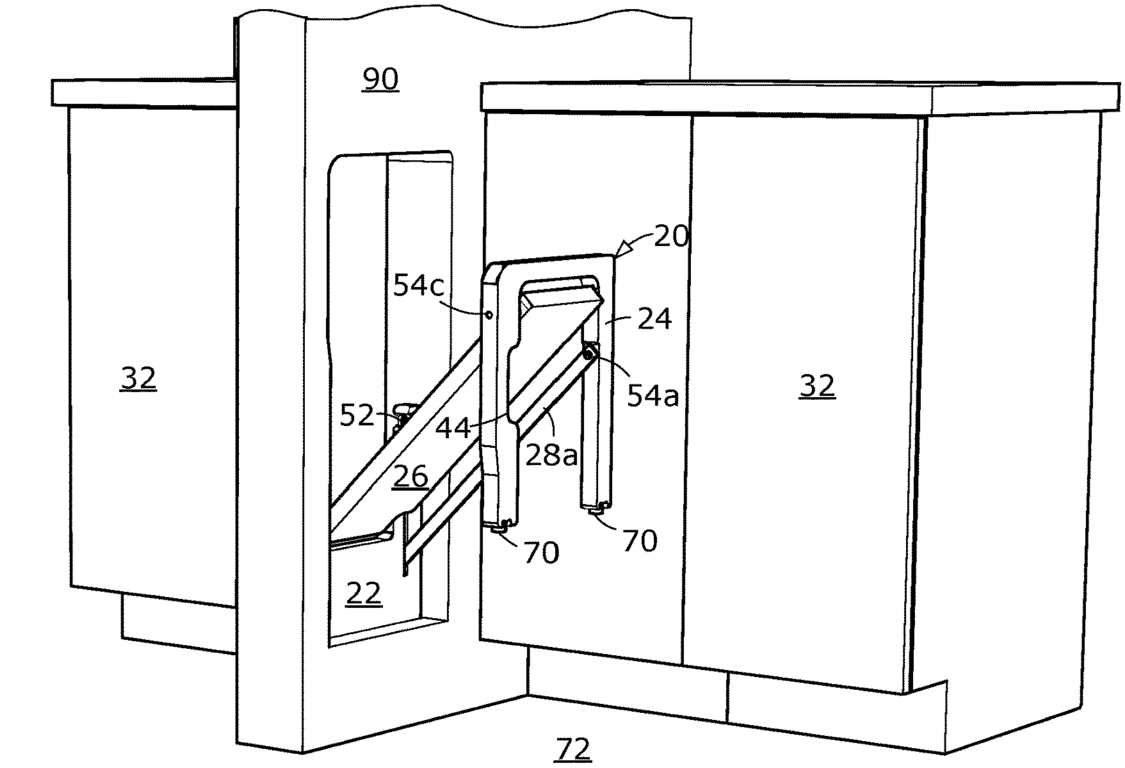
FIG. 32B is a perspective view of the lateral folding step unit, single step, in its deploying 45 degree right position, mounted in the wall.
Figure 33A:
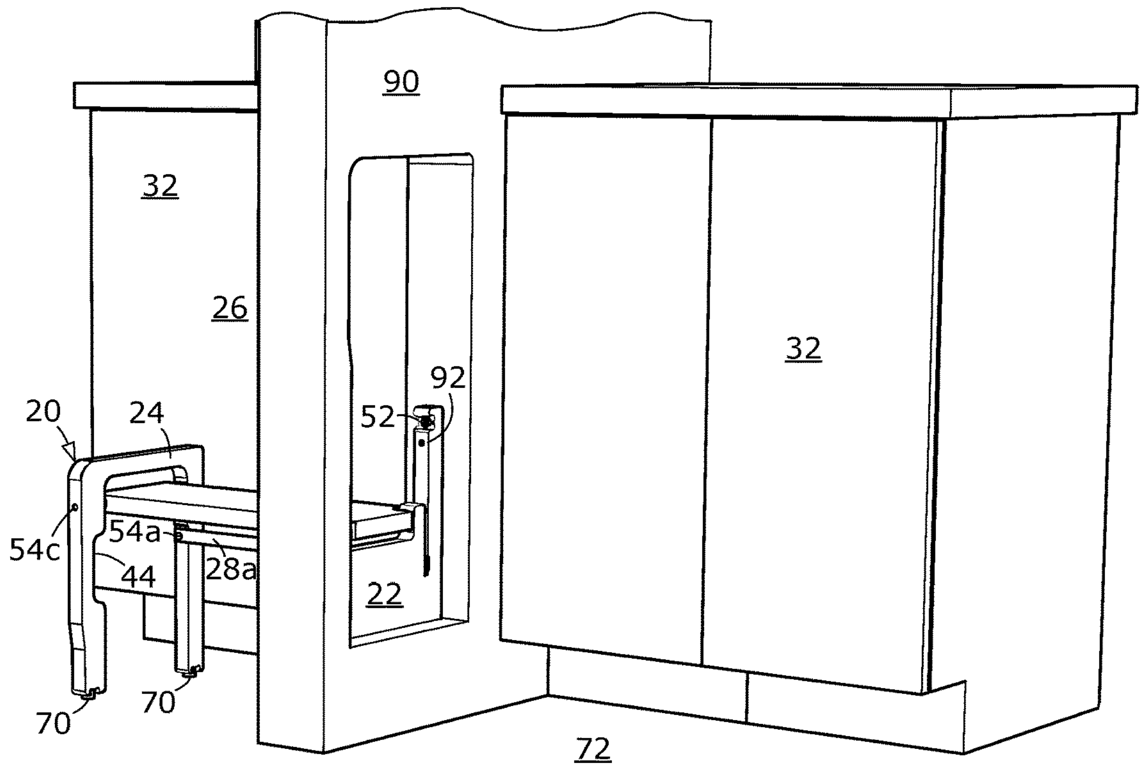
FIG. 33A is a perspective view of the lateral folding step unit, single step, in its deployed left usable position, mounted in the wall.
Figure 33B:
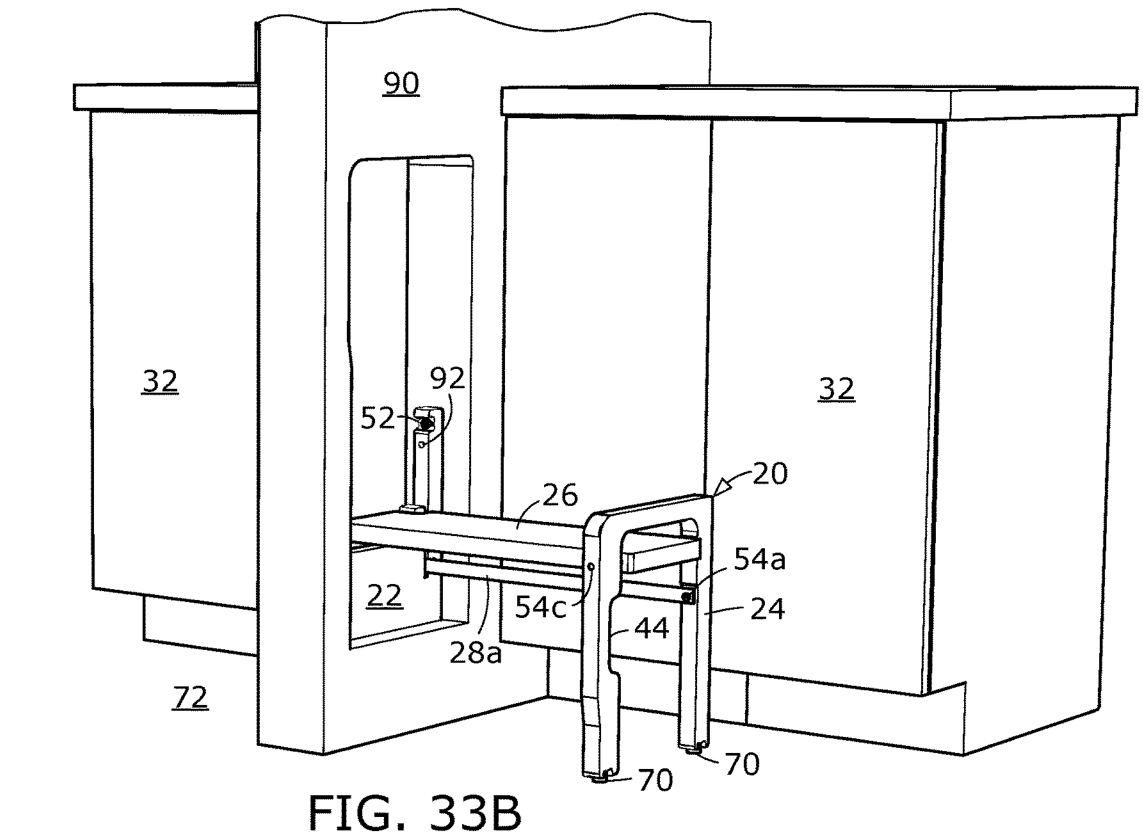
FIG. 33B is a perspective view of the lateral folding step unit, single step, in its deployed right usable position, mounted in the wall.
Figure 36:
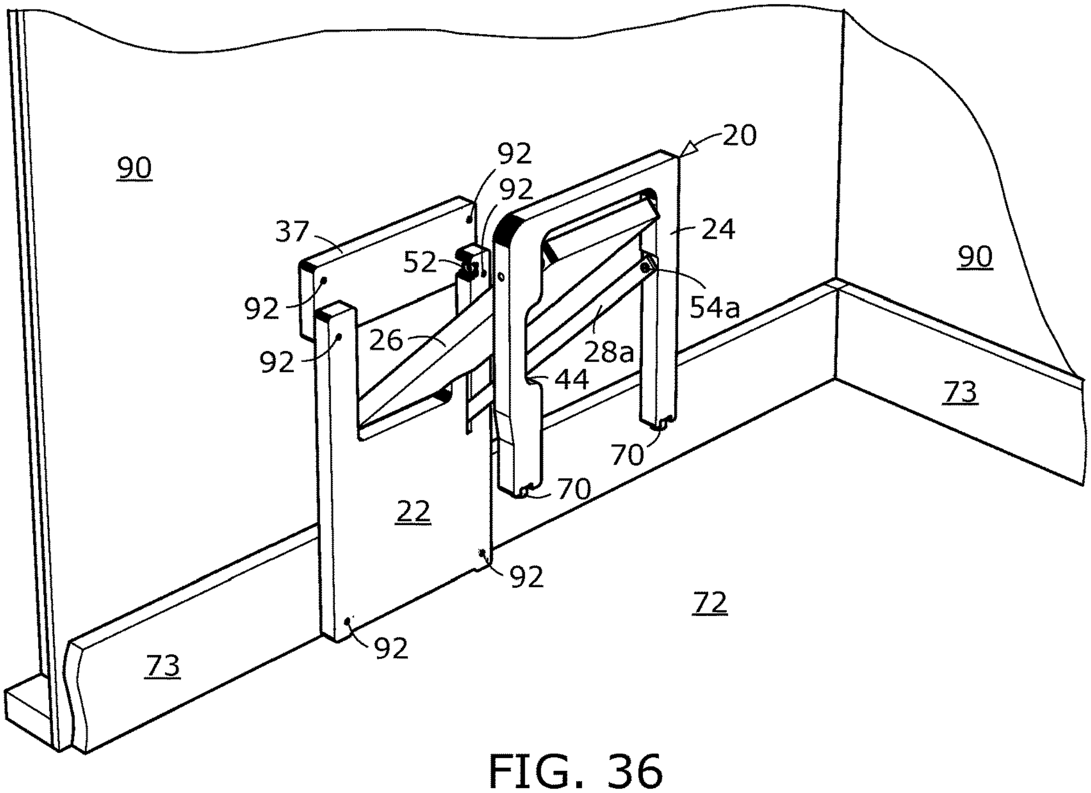
FIG. 36 is a perspective view of the lateral folding step unit, wall mounted, single step, in its deploying 45-degree right position.

In a different construction of the wall mount step stool unit 20, one with only one step, either the upper step linkage 26 or lower step linkage 28 could be substantially shallow to become merely a linkage so as to no longer be used as a step, 30A-37 best shows an example of this configuration. As best shown in FIGS. 32A and 32B or FIG. 36, an upper step linkage 26 and a linkage 28*a* are pivotally attached to the vertical frame 22. Step linkage 26 is substantially deep enough to be used as a step. When step linkage 26, and linkage 28*a* are orientated in the stored position, shown in FIGS. 31 and 35, they are in the same geometric plane as the vertical frame 22. In this construction, the linkage 28*a* is oriented behind the upper step linkage 26. The linkage 28*a* also is mounted lower than the upper step linkage 26. Both step linkage 26 and linkage 28*a* have the same width, best shown in FIGS. 32A and 32B. The leg frame 24, best shown in FIGS. 32B-33B, in this construction is formed of two legs and is pivotally connected to both the upper ends of the step linkages 26 and linkage 28*a*, respectively. The leg frame 24 lays in the same geometric plane as the step linkage 26, linkage 28*a*, and vertical frame 22, when in the stored position. The leg frame 24 frames the top of both the step linkage and linkage 26 and 28*a* with the front leg extending down toward the bottom of the front side of the step linkage 26. The back leg extends midway down the back side of the linkage 28*a*. The bottom of both legs of the leg frame 24 are generally parallel to the floor. Attached to the bottom each leg is an anti-slip foot 70, made preferably out of rubber. A rectangular shaped opening, substantially sized for an intended user's hand, created in the leg frame 24 is used as a operating handle 44. The operating handle 44 is cut out in the space in front the step linkage 26 towards the top of the of the backside of the front leg, in the leg frame 24.

The following explains how the step linkages 26, 28, or alternatively step linkage 26 and linkage 28*a* are pivotally attached to both the vertical frame 22 and leg frame 24 during assembly of this construction. FIGS. 23 and 35 best shows the following: When orientated in the stored position, four holes are drilled, end to end, horizontally through the depth of the upper and lower linkage steps 26 and 28, or alternatively step linkage 26 and linkage 28*a*. These four holes include, one hole at the bottom of each step linkage 26, 28, or alternatively step linkage 26 and linkage 28*a* and one hole for the top of each step linkage 26, 28, or alternatively step linkage 26 and linkage 28*a*. Four holes are then drilled horizontally through the corresponding adjacent position, on either side of the bottom of each step linkage 26, 28, or alternatively step linkage 26 and linkage 28*a*, into the vertical frame 22. Four holes are then drilled horizontally through the corresponding adjacent position, on either side of the top of each step linkage 26, 28, or alternatively step linkage 26 and linkage 28*a* into the leg frame 24.

Connective elements such as shafts or shoulder bolts 54*a*, 54*b*, 54*c*, 54*d*, also shown in FIGS. 23 and 35, are then inserted through holes in the lower and upper ends of both the steps linkages and through the corresponding adjacent position in the vertical frame 22 and leg frame 24 to allow pivotal rotation. Spacers 56 are also installed surrounding the shafts 54*a*, 54*b*, 54*c*, 54*d* between the spaces between the steps linkages 26, 28, the vertical frame 22 and the leg frame 24 to produce a clearance for the steps linkages 26, 28, vertical frame 22, and leg frame 24 to operate without touching. Alternatively, for step units 20, with only one step, spacers 56 are also installed surrounding the shafts 54*c* and 54*d* between the spaces between the step linkage 26, the vertical frame 22 and the leg frame 24 to produce a clearance for the step linkage 26, vertical frame 22, and leg frame 24 to operate without touching, best seen in FIG. 35.

Lastly, a magnetic latch or latches 52' are attached to the linkage 28*a*. A corresponding magnetic latch or latches 52 are attached on the opposite adjacent side to the vertical frame 22, such that magnets in latches 52, 52' only engage each other when the step stool 20 is oriented in the stored position, as shown in FIG. 23. Alternatively, for a one step unit 20, shown in FIG. 35, a magnetic latch 52' is attached to the linkage 28*a*. A corresponding magnetic latch 52 is attached on the opposite adjacent side to the vertical frame 22, such that magnets in latches 52, 52' only engage each other when the step stool 20 is oriented in the stored position. The magnet latches 52, 52' are used to hold the step linkages and leg frame in the stored position. In other constructions, a ball latch, roller latch or any other type of magnetic or mechanical latch could be used as a holding device to encourage step unit 20 to remain in a "vertical" storage position. The magnetic latches 52, 52' can be seen in FIGS. 23 and 35.

Figure 37:
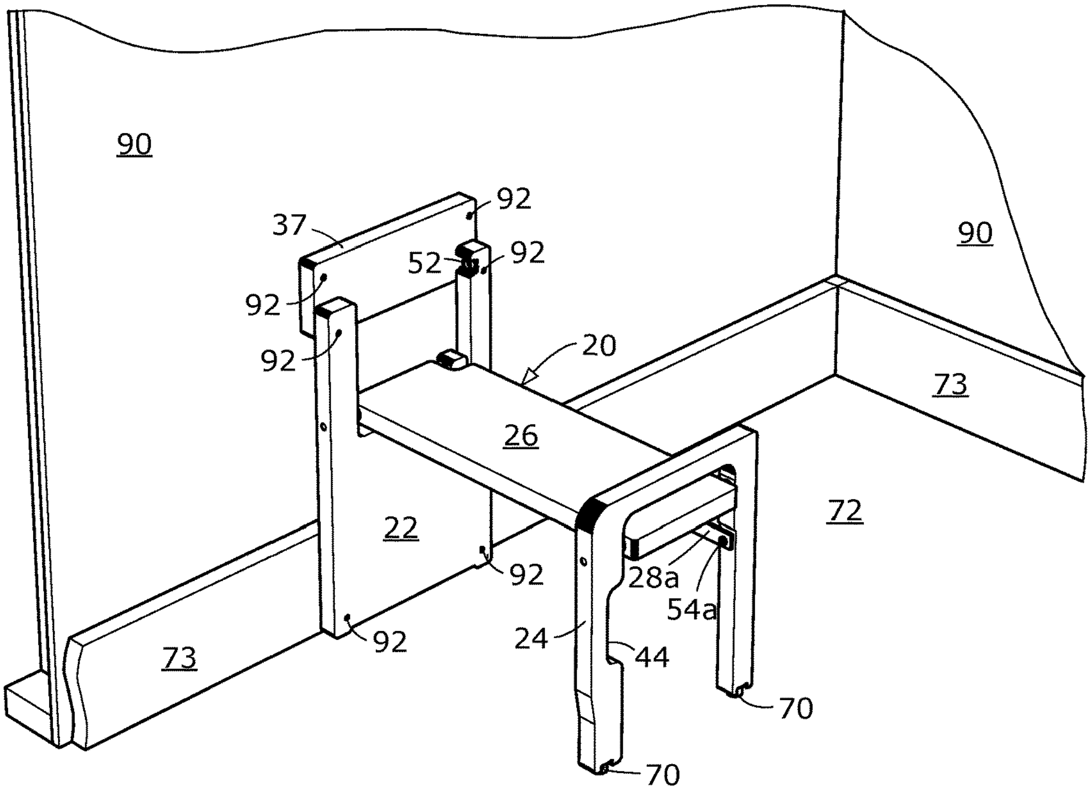
FIG. 37 is a perspective view of the lateral folding step unit, wall mounted, single step, in its deployed right position.
Figure 38:
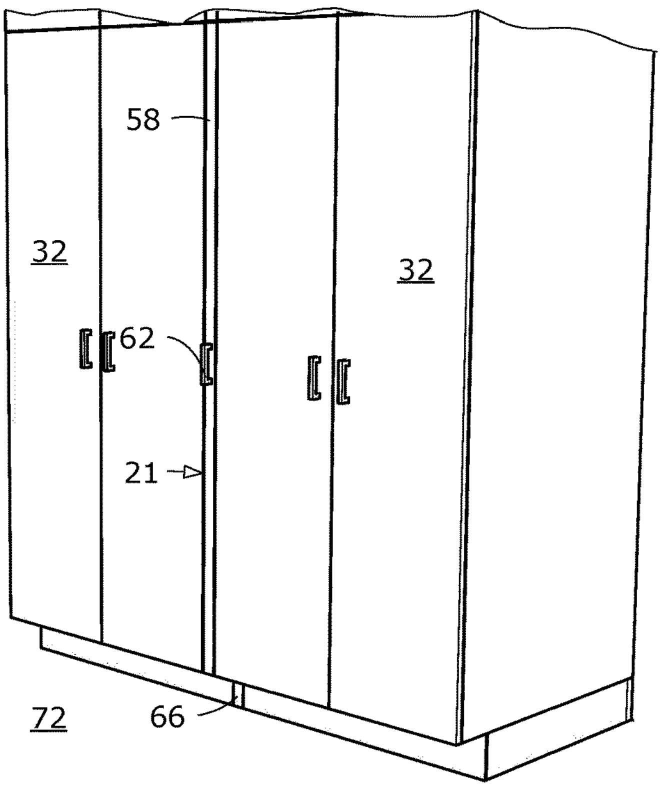
FIG. 38 is a schematic perspective view of a lateral folding desk unit according to the present invention in its collapsed, retracted stored position between two cabinets.

The user then has the choice of deploying the step unit 20 laterally to the left for right side wall mounted step units 20, best shown in FIG. 22B or FIG. 34A or to the right for left side wall mounted step units 20 as best shown in FIGS. 22A, 24, and 25 respectively or FIGS. 34A, 36, and 37 respectively. Alternatively mounting the step unit 20 within the wall 90, the user then has the choice of deploying the step unit 20 laterally to the left or to the right as shown in FIGS. 32A and 32B. This can be done by pulling the operating handle 44 that is integrated into leg frame 24. By pulling laterally in the chosen direction, the leg frame 24 will release from the magnetic latch 52 between the vertical frame 22 and the leg frame 24. In an parallel arced motion, the leg frame 24 will transition away from the vertical frame 22. As the leg frame 24 moves so do the step linkages 26, 28, or alternatively a step linkage 26 and linkage 28*a*, rotating until the leg frame 24 contacts the floor 72. Through this stage, the step linkages 26, 28, or alternatively a step linkage 26 and linkage 28*a*, move parallel in relation to each other from the initial vertical "stored" position to the horizontal "in use" position. In the "in use" position the linkage steps 26, 28, are deployed in a staircase fashion making them safe and easy to use. In this embodiment, the upper step linkage 26 is substantially deeper to provide a stable platform as the user performs their task.

To move back to the stored position shown in FIG. 23 or FIG. 35, the user would step down off the lateral folding step unit 20, grab the operating handle 44, and with one arched motion reposition the leg frame 24, with the pivotally attached step linkages 26, 28, or alternatively a step linkage 26 and linkage 28*a*, back within the vertical frame 22. The magnetic latch or latches 52 and 52' will automatically engage.

The same but larger set of components that make up the lateral folding step unit can also be presented as a lateral folding desk unit 21*a*, such as illustrated in FIG. 39-41B. This type of desk unit 21*a* could be particularly useful inside a pantry cabinet, art and crafts cabinet, or a laundry closet or cabinet area in a tiny house, kids room, or wherever an extra work surface is needed and would take up valuable space when not in use. The bilateral motion of the desk unit 21*a* allows flexible cabinet mounting.

A lateral folding desk unit 21*a* according to the present invention, FIGS. 38-41B, is suitable for integration within a slim vertical space defined between two taller cabinets 32. The desk unit's 21*a* main components include a vertical frame 22, a leg frame 24, a work surface linkage 26' (also referred to as linkage 26*a*) and a linkage 28*a* shown in FIGS. 38-41B. All of these components lay on the same geometric flat plane in this construction when desk unit 21*a* is stored in the vertical position illustrated in FIG. 2. All of the components of desk unit 21*a* can be made out of a sheet of rigid material such as wood; however metal, plastic, or a combination of these and/or other suitably rigid materials would be acceptable.

Figure 39:
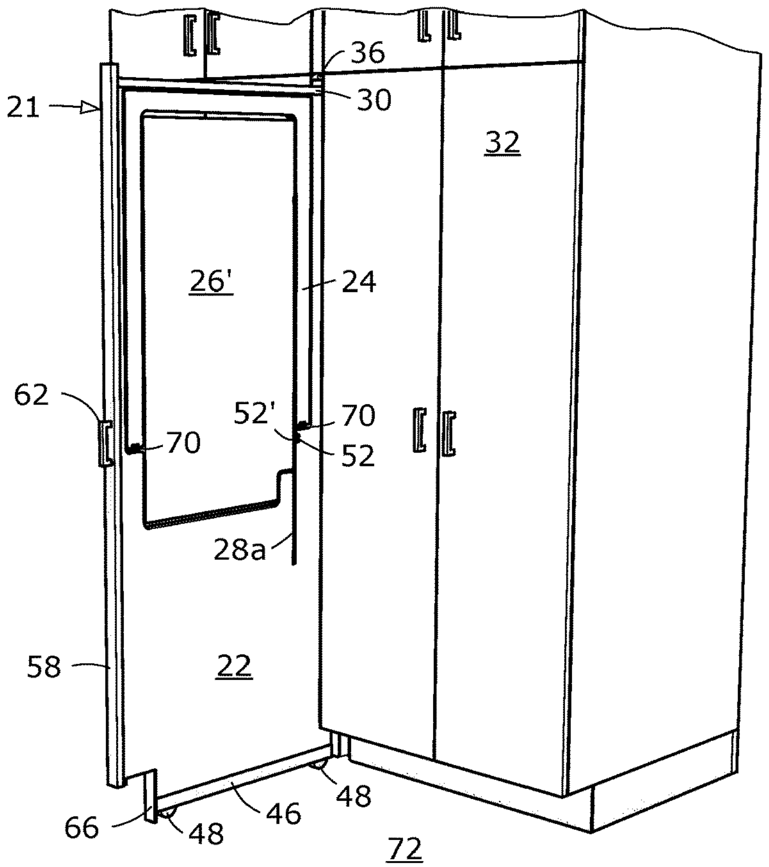
FIG. 39 is a perspective view similar to FIG. 1 with the lateral folding desk unit of FIG. 38 in an extended position while still collapsed or "up"
Figure 40A:
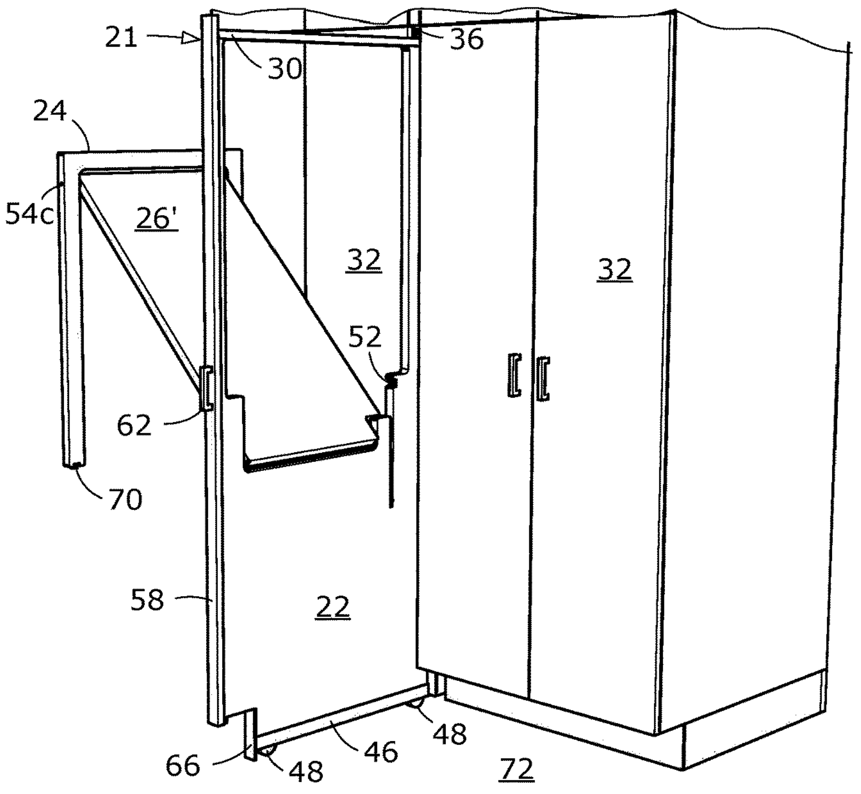
FIG. 40A is a perspective view of the lateral folding desk unit in its extended and deploying 45 degree left position.
Figure 40B:
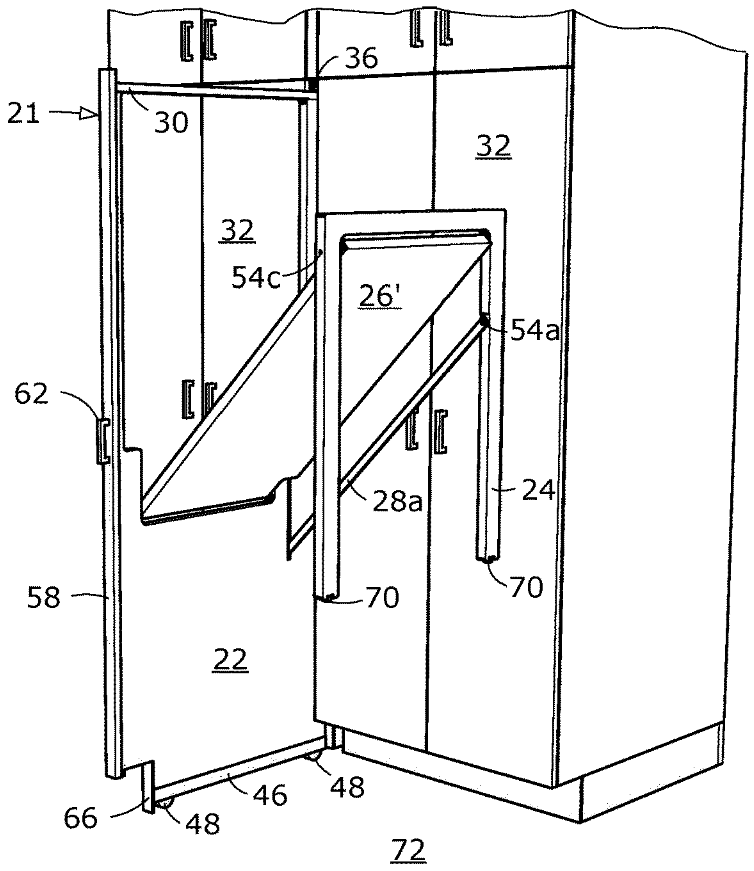
FIG. 40B is a perspective view of the lateral folding desk unit in its extended and deploying 45 degree right position.
Figure 41A:
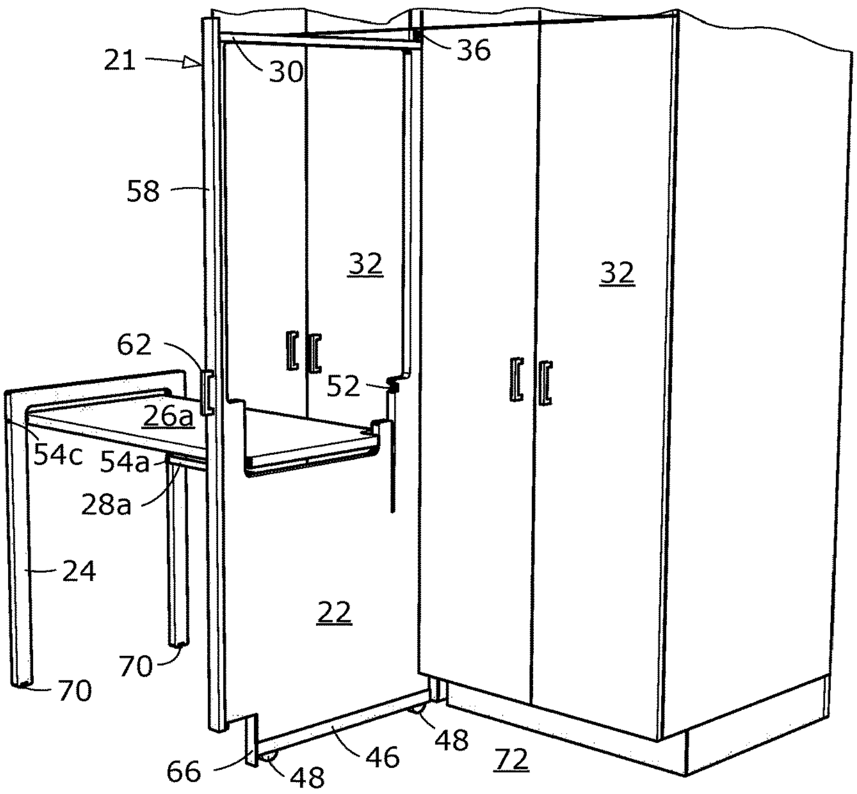
FIG. 41A is a perspective view of the lateral folding desk unit in its extended and deployed left usable position.
Figure 41B:
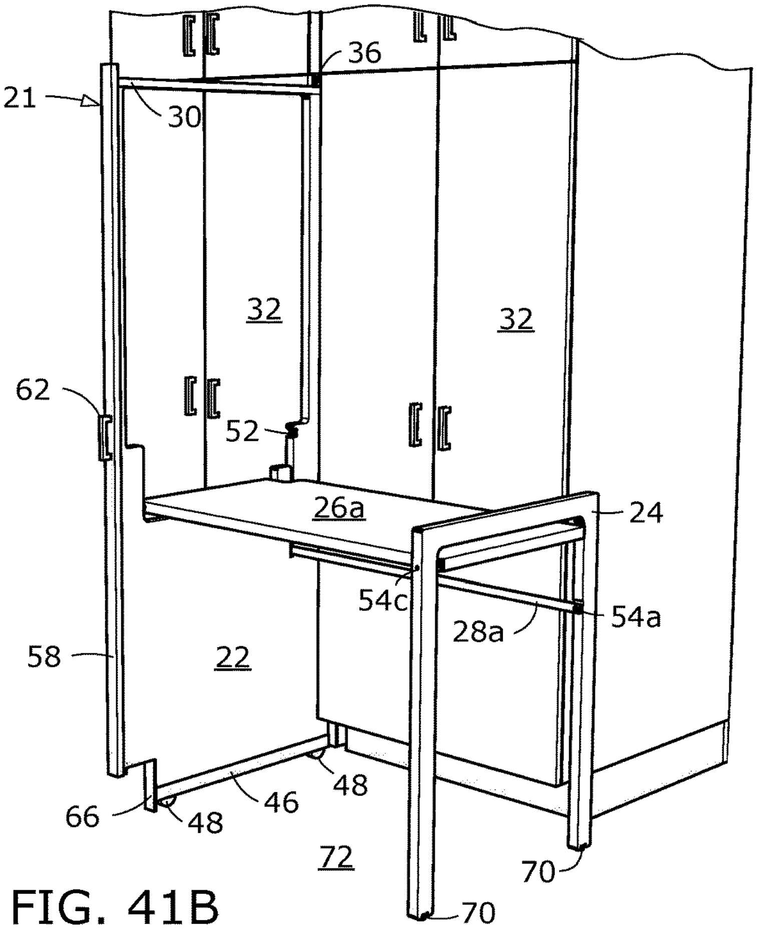
FIG. 41B is a perspective view of the lateral folding desk unit in its extended and deployed right usable position.

The desk unit 21*a* can be extended out from between the cabinets 32, as shown in FIG. 39, and deployed laterally left as shown in FIGS. 40A and 41A, or deployed laterally right as shown in FIGS. 40B and 41B, based on the user's working needs. In other words, certain preferred constructions of step units according to the present invention enable a user to position the desk unit 21*a* in at least two different usable positions after the desk unit 21*a* is extended from its storage location. For ease of illustration, all figure views are shown on the right side, or right perspective side, of the step stool unit and, because of the symmetry of the step stool's design in this construction, the left views would be the same as mirror images thereof.

In this embodiment of FIGS. 38-41B, the desk unit 21*a* is mounted in the vertical space between two parallel spaced cabinets 32 that have been laterally separated to accommodate the desk unit 21*a*. This space could be between any fixed structure, for example, one cabinet and one cabinet end panel, or two fixed cabinet end panels or other vertical structure. As shown in FIGS. 5, 6A, a mounting guide 36 is installed in this space between the width of the two cabinets 32.

The term "width" is utilized herein to represent the horizontal distance between two edges of a component such as work surface linkage 26' or linkage 28*a*, or edges of adjoining components such as cabinets 32, as best appreciated when the component is deployed horizontally, that is, parallel to a floor. The term "depth" or "deep" is utilized herein to represent a horizontal distance perpendicular to the width of a component.

In this construction, mounting guide 36 is installed to be positioned flush to the front upper corner of the cabinets 32 at the top of the Desk unit's height. Mounting holes 40 through the sides of the mounting guide 36 are provided to attach the guide to the cabinets with the appropriate fastener hardware such as screws, bolts, etc. The desk unit 21*a* has a vertical frame 22 which moves in and out of the space between the two cabinets and is guided by the guide channel 36. The guide channel 36 prevents lateral movement of the vertical frame 22. A guide stop 38 prevents the vertical frame 22 from travelling past its maximum extended position.

As best shown in FIGS. 40A and 40B, an work surface linkage 26' and a linkage 28*a* are pivotally attached to the vertical frame 22. The work surface linkage 26' is substantially deep enough to be used as a work surface, countertop or desk. When both linkages 26', 28*a* are orientated in the stored position, shown in FIG. 39, they are in the same geometric plane as the vertical frame 22. The linkage 28*a* is oriented behind the work surface linkage 26'. The linkage 28*a* also is mounted lower than the work surface linkage 26'. Both work surface linkage 26' and linkage 28*a* have the same width, best shown in FIG. 41B.

The leg frame 24, best shown in FIGS. 39-41B, in this construction is formed of two legs and is pivotally connected to both the upper ends of the work surface linkages 26' and linkage 28*a*, respectively. The leg frame 24 lays in the same geometric plane as the work surface linkage 26', linkage 28*a*, and vertical frame 22, when in the stored position. The leg frame 24 frames the top of both the work surface linkage 26' and the linkage 28*a* with the front leg extending down toward the bottom of the front side of the work surface linkage 26'. The back leg extends midway down the back side of the linkage 28*a*. The bottom of both legs of the leg frame 24 are generally parallel to the floor. Attached to the bottom each leg is an anti-slip foot 70, made preferably out of rubber. An optional magnet latches 52' is located on the back edge and middle portion of linkage 28*a*.

Figure 43:
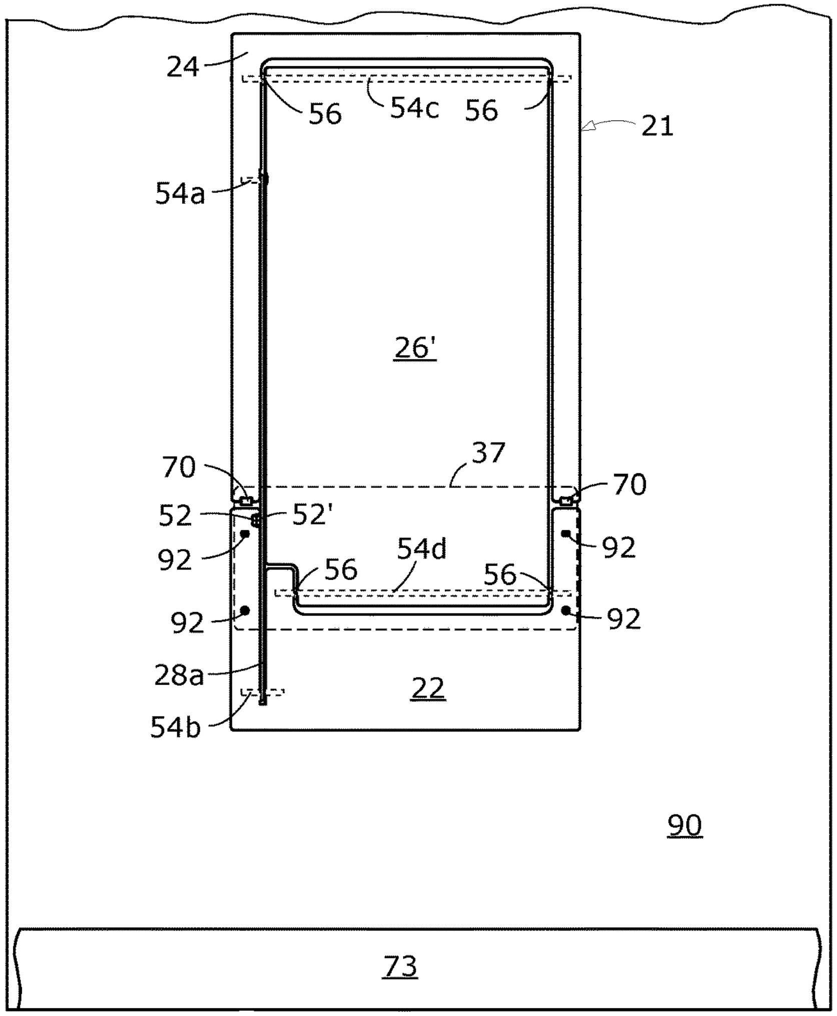
FIG. 43 as a right side view of the lateral folding desk unit, wall mounted, in its retracted stored position.

The following explains how the work surface linkage 26' and linkage 28*a* are pivotally attached to both the vertical frame 22 and leg frame 24 during assembly of this construction. FIG. 43 best shows where the holes of the desk unit 21*a* are located: When orientated in the stored position and looking at the desk unit 21*a* from the side view, four holes are drilled, end to end, horizontally through the depth of the work surface linkage 26' and linkage 28*a*. The distance between the two parallelly drilled holes in the work surface 26' is the same as the distance between the two parallelly drilled holes in the linkage 28*a*. Both the work surface linkage's 26' holes generally are on the same geometric plane and have a vertical offset, up or down, to both the linkage's 28*a* holes. These four holes include, one hole at the bottom of each work surface linkage 26' and linkage 28*a* and one hole for the top of each work surface linkage 26' and linkage 28*a*. Four holes are then drilled horizontally through the corresponding adjacent position, on either side of the bottom of each work surface linkage 26' and linkage 28*a*, into the vertical frame 22. Four holes are then drilled horizontally through the corresponding adjacent position, on either side of the top of each work surface linkage 26' and linkage 28*a* into the leg frame 24.

Connective elements such as shafts or shoulder bolts 54*a*, 54*b*, 54*c*, 54*d*, also shown in FIG. 43, are then inserted through holes in the lower and upper ends of both the desk linkage 26' and linkage 28*a* and through the corresponding adjacent position in the vertical frame 22 and leg frame 24 to allow pivotal rotation. Spacers 56 are also installed surrounding the shafts 54*c* and 54*d* between the spaces between the desk linkage 26' and linkage 28*a*, the vertical frame 22 and the leg frame 24 to produce a clearance for the desk linkage 26' and linkage 28*a*, vertical frame 22, and leg frame 24 to operate without touching.

As shown in FIGS. 39-41, one way to provide the vertical frame 22 with smooth egress from within the cabinet 32 and along the floor 72, is with the use of wheels 48. However, any appropriate mechanism for the step stool to slide would be acceptable, for example, low friction pads, drawer slides, etc. This embodiment uses a wheel mount bracket 46, two wheels 48 and axle connections. The bracket 46 is attached to bottom of the vertical frame 22 and would preferably be made out of metal. Appropriate hardware such as screws or bolts, etc are used to attach the bracket 46 to the vertical frame 22. The preferred material choice for the wheels 48 would be rubber but other materials would work, such as plastic, wood, metal etc. These wheels 48 are attached with axle connections through each hole on either side of the wheel mounting bracket 46.

The top rail or handrail 30 is incorporated at the top of the desk unit 21*a* and the back end connects the upper back portion of the vertical frame 22. The top rail 30 can be made out of metal, wood, plastic, etc. The desk unit's cabinet face 58 attaches to the front of the desk unit 21*a* with the appropriate hardware. On the front face of the kick plate cutout a kick plate 66 is installed to match the adjacent kick plates of the base cabinets 32 as seen in FIGS. 38-41B. A cabinet face pull handle 62 is attached to the front middle portion of the desk unit's cabinet face 58 as shown, in FIGS. 38-41B to match the appearance of the cabinets 32 as desired.

As shown in FIG. 15, the bumper guide 68' could be two spacers/washers that are mounted in the front, lower area space between the two cabinet 32. Attaching the guides 68' to the outside side of each cabinet so the guides 68' are facing one another with the appropriate fastener or glue. Each guide 68' enables the vertical frame 22 to glide from the cabinets 32 without rubbing them.

Lastly, a magnetic latch 52' is attached to the linkage 28*a*. A corresponding magnetic latch 52 is attached on the opposite adjacent side to the vertical frame 22, such that magnets in latches 52, 52' only engage each other when the desk unit 21*a* is oriented in the stored position, as best shown in FIG. 43. The magnet latches 52, 52' are used to hold the work surface linkage 26', linkage 28*a* and leg frame 24 in the stored position. In other constructions, a ball latch, roller latch or any other type of magnetic or mechanical latch could be used as a holding device to encourage desk unit 21*a* to remain in a "vertical" storage position.

In this construction, one technique for deploying the lateral folding desk unit 21*a* is as follows. A user typically begins by using the face panel pull handle 62 to pull the vertical frame 22, containing a work surface linkage 26', linkage 28*a*, and a leg frame 24, out from the stored location between two cabinets 32, as shown in FIG. 39. A guide channel 36 and a bumper guide 68 guide the desk unit 21*a* out of the opening as the desk unit 21*a* is pulled out. When pulled out to the maximum extended position, the bumper stop 42 on the desk unit 21*a*, comes into contact with the guide stop 38 as seen in FIG. 6A.

The user then has the choice of deploying the desk unit 21*a* laterally to the left or to the right as shown in FIGS. 40A, 41A and FIG. 40B, 41B respectively. This can be done by pulling leg frame 24. To pull the leg frame 24, the user can push the bottom section of the leg frame 24 from the opposite side to pivot the leg frame laterally direction of deployment allowing enough space to grab the leg frame 24. By deploying laterally in the chosen direction, the leg frame 24 will release from the magnetic latches 52, 52' between the vertical frame 22 and the leg frame 24. In an parallel arced motion, the leg frame 24 will transition away from the vertical frame 22. As the leg frame 24 moves so do the work surface linkage 26' and linkage 28*a*, rotating until the leg frame 24 contacts the floor 72. The user can also support the underside of the translating work surface linkage 26' as it rotates to the ground 72. Through this stage, the work surface linkage 26' and linkage 28*a*, move parallel in relation to each other from the initial vertical "stored" position to the horizontal "in use" position. In the "in use" position the work surface 26' substantially deep enough to provide a usable work platform.

To move back to the extended stored position shown in FIG. 39, the user can pickup the underside of the work surface linkage 26', between the two legs of the leg frame 24 and with one arched motion reposition the leg frame 24, with the pivotally attached work surface linkage 26' and linkage 28*a*, back within the vertical frame 22. The magnetic latch or latches 52, 52' will automatically engage, as seen in FIG. 39. Then the user has the choice to return the lateral folding desk unit 21*a* back in its stored position, between the cabinets 32. The leg frame 22 and work surface linkage 26' and linkage 28*a* can also be deployed to the adjacent lateral side, see FIGS. 40A, 41A.

The desk unit 21*a* can be remove if needed by pulling the desk unit 21*a* out into the extended position, from between the base cabinets 32, and pivoting the whole unit so that the front wheel comes of the floor 72. This allows the bumper stop 42 at the back of the unit to clear the guide stop 38. Once the desk unit 21*a* has cleared the guide stop 38, it can be pivoted back down and pulled all the way out. The reverse procedure goes for the initial or re-installation of the desk unit 21*a*.

Another alternative situation for use of the desk unit according to the present invention is a wall mounted desk units 21*a*, illustrated in FIG. 42A-45. This type of desk unit 21*a* could be particularly useful in tight living areas, such as an apartment, a tiny house, on a large boat, kids room, or wherever a typical desk can take up valuable space. The bilateral motion of the desk units 21*a*, allows flexible mounting, easily attaching to the left side or right side of a wall. Alternatively, if there are two rooms with a dividing wall 90 between the two areas and each area needed access a desk, the wall mounted desk unit 21*a*, could be mounted within the wall between two spaces. An individual desk unit 21*a* could then be utilized for both spaces depending on the way it was deployed.

Figure 44:
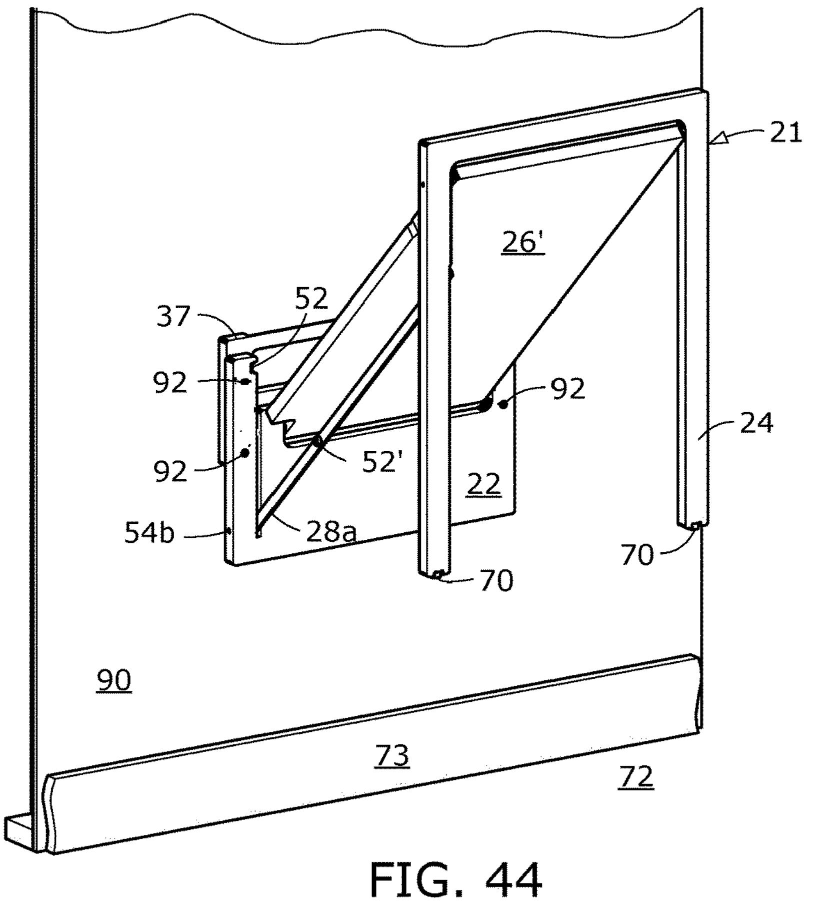
FIG. 44 is a perspective view of the lateral folding desk unit, wall mounted, in its deploying 45 degree right position.
Figure 45:
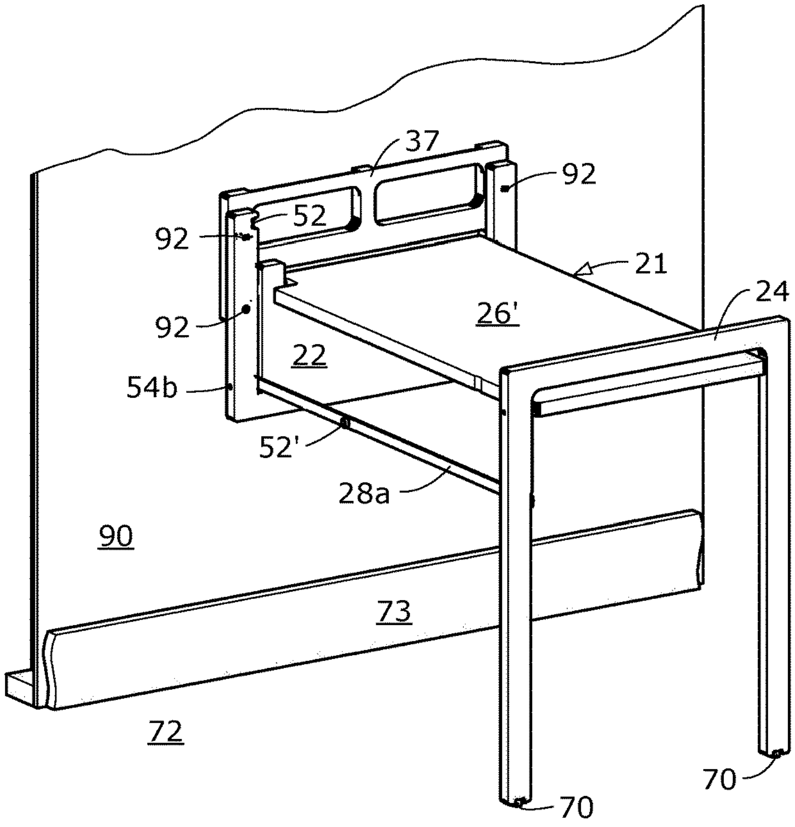
FIG. 45 is a perspective view of the lateral folding desk unit, wall mounted, in its deployed right position.
Figure 46A:
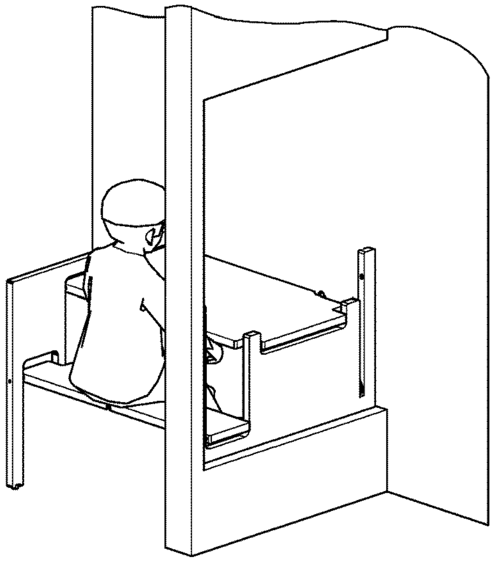
FIG. 46A is a perspective "in use" view, of a lateral folding desk with bench unit, in its deployed left position, mounted in the wall.
Figure 46B:
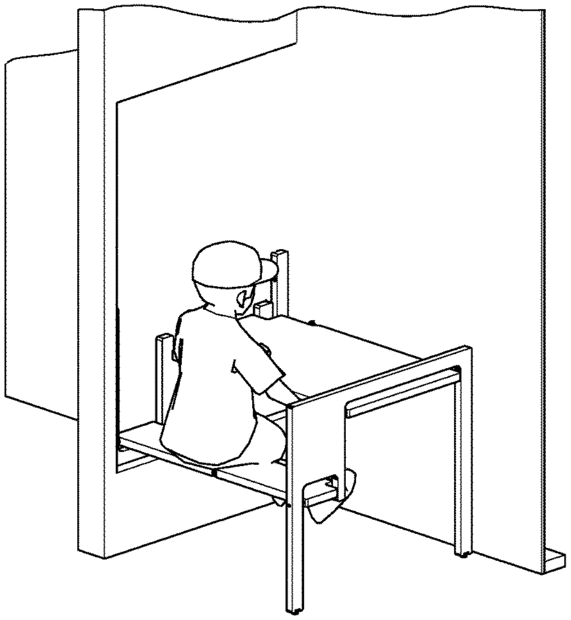
FIG. 46B is a perspective "in use" view, of the lateral folding desk of FIG. 46A with bench unit, in its deployed left position, mounted in the wall.

Some additional parameters should be taken into account for the desk unit 21*a* wall mounted embodiment: the vertical frame 22 would be attached to a mounting plate 37 with appropriate hardware 92 and the mounting plate 37 would be attached the wall 90, at a specific height above the floor 90 or baseboard trim 73, with appropriate hardware 92, shown in FIGS. 44 and 45. If mounting within a dividing wall 90, the vertical frame 22 will be attached directly within the opening of the wall 90, with appropriate hardware 92.

The following drawing FIGS. 43-45, illustrate the desk unit 21*a*, main components, which include a vertical frame 22, a leg frame 24, a work surface linkage 26' and linkage 28*a*. All of these components lay on the same geometric flat plane when stored in the vertical position, All of these component can be made out of a sheet of rigid, material such as wood but metal, plastic, or a combination of these and or other rigid materials would be acceptable. The desk unit 21*a* can be deploy laterally right shown in (FIG. 42A) when mounted to a wall 90 on the left of a room or laterally left shown in (FIG. 42B) when mounted to a wall 90 on the right of a room. Additionally, the desk unit 21*a* can be deploy laterally right or left when mounted within a wall 90 between two rooms.

As best shown in FIG. 44, a work surface linkage 26' and a linkage 28*a* are pivotally attached to the vertical frame 22. The work surface linkage 26' is substantially deep enough to be used as a work surface, countertop or desk. When both linkages 26', 28*a* are orientated in the stored position, shown in FIG. 43, they are in the same geometric plane as the vertical frame 22. The linkage 28*a* is oriented behind the work surface linkage 26'. The linkage 28*a* also is mounted lower than the work surface linkage 26'. Both work surface linkage 26' and linkage 28*a* have the same width, best shown in FIG. 45.

The leg frame 24, best, shown in FIGS. 43-45, in this construction is formed of two legs and is pivotally connected to both the upper ends of the work surface linkages 26' and linkage 28*a*, respectively. The leg frame 24 lays in the same geometric plane as the work surface linkage 26', linkage 28*a*, and vertical frame 22, when in the stored position. The leg frame 24 frames the top of both the work surface linkage 26' and the linkage 28*a* with the front leg extending down toward the bottom of the front side of the work surface linkage 26'. The back leg extends midway down the back side of the linkage 28*a*. The bottom of both legs of the leg frame 24 are generally parallel to the floor. Attached to the bottom each leg is an anti-slip foot 70, made preferably out of rubber. An optional magnet latches 52' is located on the rear side edge of the top portion of linkage 28*a*.

The following explains how the work surface linkage 26' and linkage 28*a* are pivotally attached to both the vertical frame 22 and leg frame 24 during assembly of this construction. FIG. 43 best shows where the holes of the desk unit 21*a* are located: When orientated in the stored position and looking at the desk unit 21*a* from the side view, four holes are drilled, end to end, horizontally through the depth of the work surface linkage 26' and linkage 28*a*. The distance between the two parallelly drilled holes in the work surface 26' is the same as the distance between the two parallelly drilled holes in the linkage 28*a*. Both the work surface linkage's 26' holes generally are on the same geometric plane and have a vertical offset, up or down, to both the linkage's 28*a* holes. These four holes include, one hole at the bottom of each work surface linkage 26' and linkage 28*a* and one hole for the top of each work surface linkage 26' and linkage 28*a*. Four holes are then drilled horizontally through the corresponding adjacent position, on either side of the bottom of each work surface linkage 26' and linkage 28*a*, into the vertical frame 22. Four holes are then drilled horizontally through the corresponding adjacent position, on either side of the top of each work surface linkage 26' and linkage 28*a* into the leg frame 24.

Connective elements such as shafts or shoulder bolts 54*a*, 54*b*, 54*c*, 54*d*, also shown in FIG. 43, are then inserted through holes in the lower and upper ends of both the desk linkage 26' and linkage 28*a* and through the corresponding adjacent position in the vertical frame 22 and leg frame 24 to allow pivotal rotation. Spacers 56 are also installed surrounding the shafts 54*c* and 54*d* between the spaces between the desk linkage 26' and linkage 28*a*, the vertical frame 22 and the leg frame 24 to produce a clearance for the desk linkage 26' and linkage 28*a*, vertical frame 22, and leg frame 24 to operate without touching.

Lastly, a magnetic latch 52' is attached to the linkage 28*a*. A corresponding magnetic latch 52 is attached on the opposite adjacent side to the vertical frame 22, such that magnets in latches 52, 52' only engage each other when the desk unit 21*a* is oriented in the stored position, as best shown in FIG. 43. The magnet latches 52, 52' are used to hold the work surface linkage 26', linkage 28*a* and leg frame 24 in the stored position. In other constructions, a ball latch, roller latch or any other type of magnetic or mechanical latch could be used as a holding device to encourage desk unit 21*a* to remain in a "vertical" storage position.

Figure 42A:
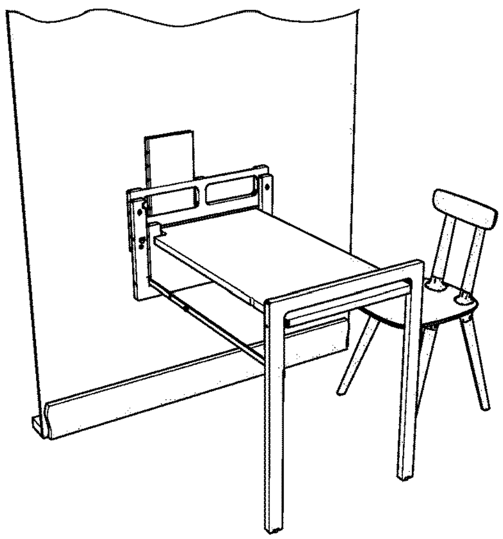
FIG. 42A is a perspective "in use" view of a lateral folding desk unit, left side wall mounted, in its deployed right position.
Figure 42B:
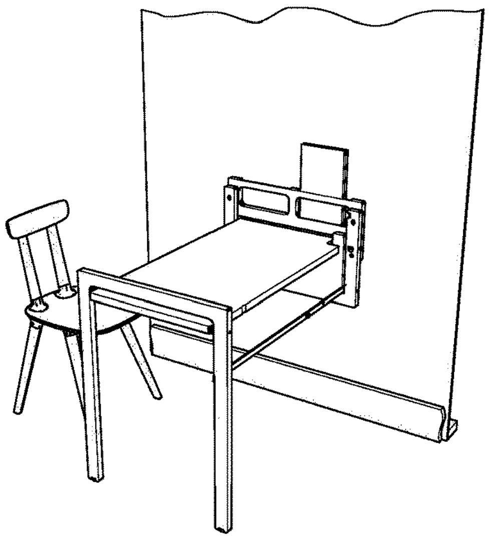
FIG. 42B is a perspective "in use" view of the lateral folding desk unit of FIG. 42A, left side wall mounted, in its deployed left position.

The user then has the choice of deploying the desk unit 21*a* laterally to the left for right side wall mounted desk unit 21*a* installation, best shown in FIGS. 42B, 44 and 45 respectively or to the right for left side wall mounted desk unit 21*a* installation, as best shown in FIG. 42A. Alternatively mounting the desk unit 21*a* within the wall 90, the user then has the choice of deploying the desk unit 21*a* laterally to the left or to the right. This can be done by pulling the operating handle 44 that is integrated into leg frame 24. By pulling laterally in the chosen direction, the leg frame 24 will release from the magnetic latch 52 between the vertical frame 22 and the leg frame 24. In an parallel arced motion, the leg frame 24 will transition away from the vertical frame 22. As the leg frame 24 moves so do the desk linkage 26' and linkage 28*a*, rotating until the leg frame 24 contacts the floor 72. Through this stage, desk linkage 26' and linkage 28*a*, move parallel in relation to each other from the initial vertical "stored" position to the horizontal "in use" position. In this embodiment, the desk linkage 26' is substantially deep to provide a usable platform for the user to performs their task.

To move the lateral folding desk unit 21*a* back to the stored position, shown in FIG. 43, grab the operating handle 44. With one arched motion reposition the leg frame 24, with the pivotally attached desk linkage 26' and linkage 28*a*, back within the vertical frame 22. The magnetic latch or latches 52 will automatically engage.

Another alternative situation for use of the desk unit according to the present invention is a wall mounted desk with bench unit 21*b*, such as illustrated in FIG. 46A-53. This type of desk unit with bench desk unit 21*b* could be particularly useful in tight living areas, kids or bedroom, or wherever a typical desk and seat can take up valuable space. The bilateral motion of the desk units 21*b* allows flexible mounting, easily attaching to the left side or right side of a wall. Alternatively, if there are two rooms with a dividing wall 90 between the two areas and each area needed access a desk, the wall mounted desk with bench units 21*b*, could be mounted within the wall between two spaces. An individual desk unit with bench unit 21*b* could then be utilized for both spaces depending on the way it was deployed, as shown FIG. 46A-49B.

Some additional parameters should be taken into account for the desk unit 21*b* wall mounted embodiment: the vertical frame 22 would be attached to a mounting plate 37 with appropriate hardware 92. The mounting plate 37 would be attached to the wall 90 at a specific height above the floor 90 or baseboard trim 73 with appropriate hardware 92, shown in FIGS. 51 and 53. Two spacers 56', the same depth as the mounting plate are placed around the lower attachment hardware 92 at the bottom corners of the vertical frame 22 to keep the vertical frame 22 vertically parallel to the wall 90. If mounting within a dividing wall 90, the vertical frame 22 will be attached directly within the opening of the wall 90, with appropriate hardware 92. best shown in FIGS. 49A and 49B.

The following drawing FIGS. 47-49B and 51-53, illustrate the desk with bench unit 21*b*, main components, which include a vertical frame 22, a leg frame 24, a work surface linkage 26' and linkage 28*a*. All of these components lay on the same geometric flat plane when stored in the vertical position, All of these component can be made out of a sheet of rigid material such as wood but metal, plastic, or a combination of these and or other rigid materials would be acceptable. The desk with bench unit 21*b* can be deploy laterally right shown in (FIG. 50B) when mounted to a wall 90 on the left of a room or laterally left shown in (FIG. 50A) when mounted to a wall 90 on the right of a room. Additionally, the desk with bench unit 21*b* can be deploy laterally right or left when mounted within a wall 90 between two rooms, shown in FIGS. 46A, 46B and 48A-49B.

Figure 47:
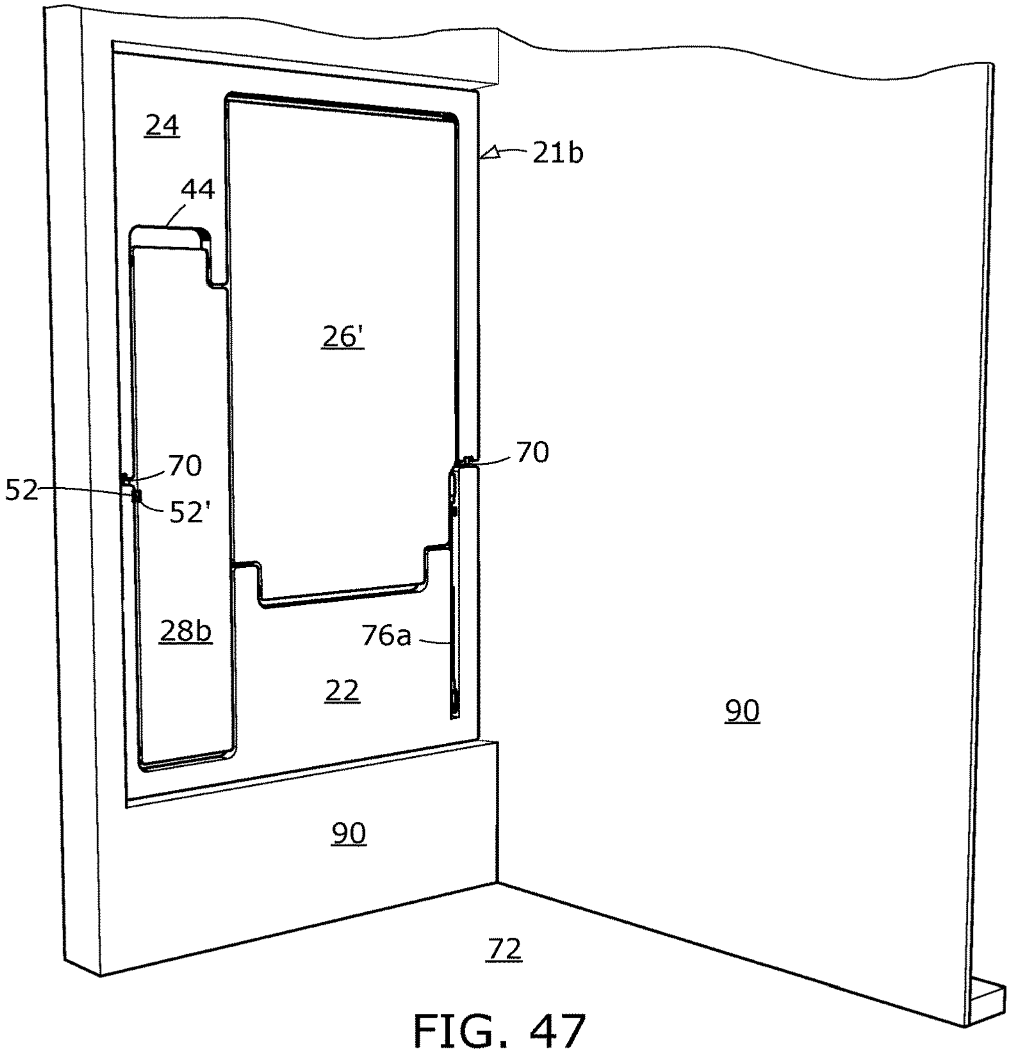
FIG. 47 is a perspective view, of the lateral folding desk with bench unit, in its collapsed or "up" position, mounted in the wall.
Figure 48A:
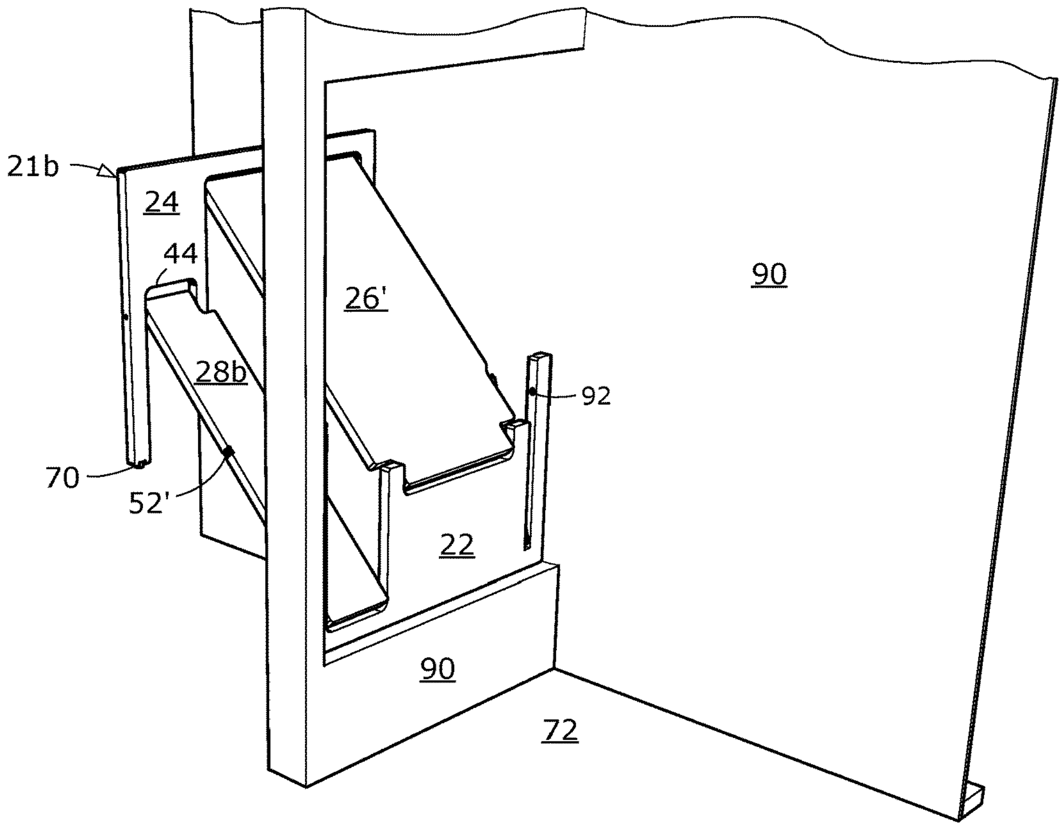
FIG. 48A is a perspective view of the lateral folding desk with bench unit, in its deploying 45 degree left position, mounted in the wall.
Figure 48B:
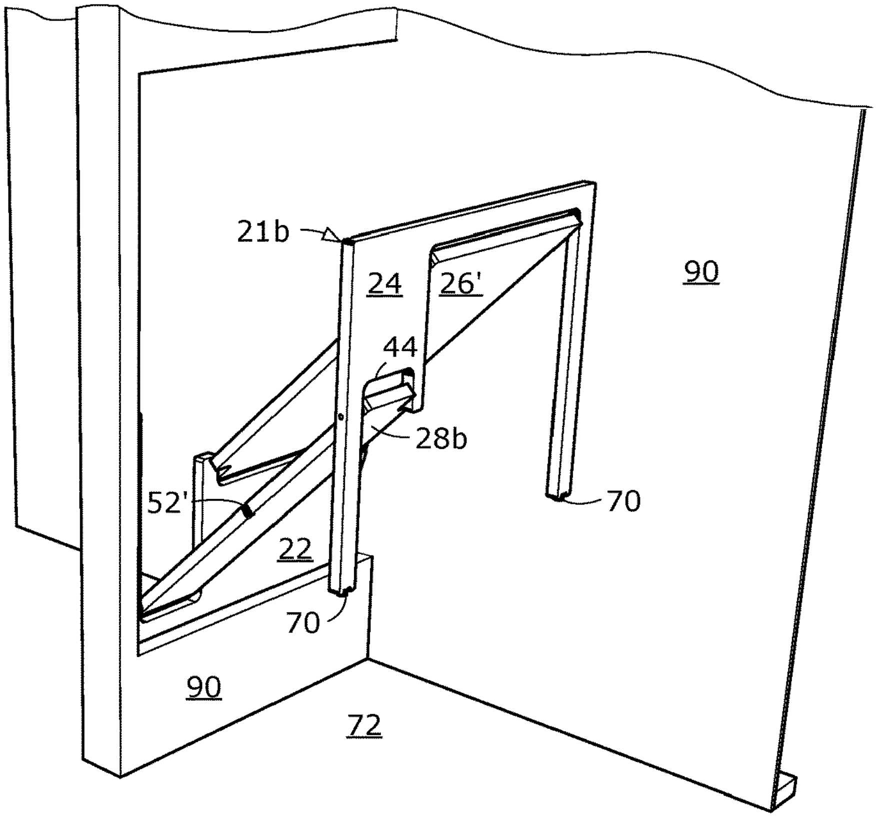
FIG. 48B is a perspective view of the lateral folding desk with bench unit, in its deploying 45 degree right position, mounted in the wall.
Figure 49A:
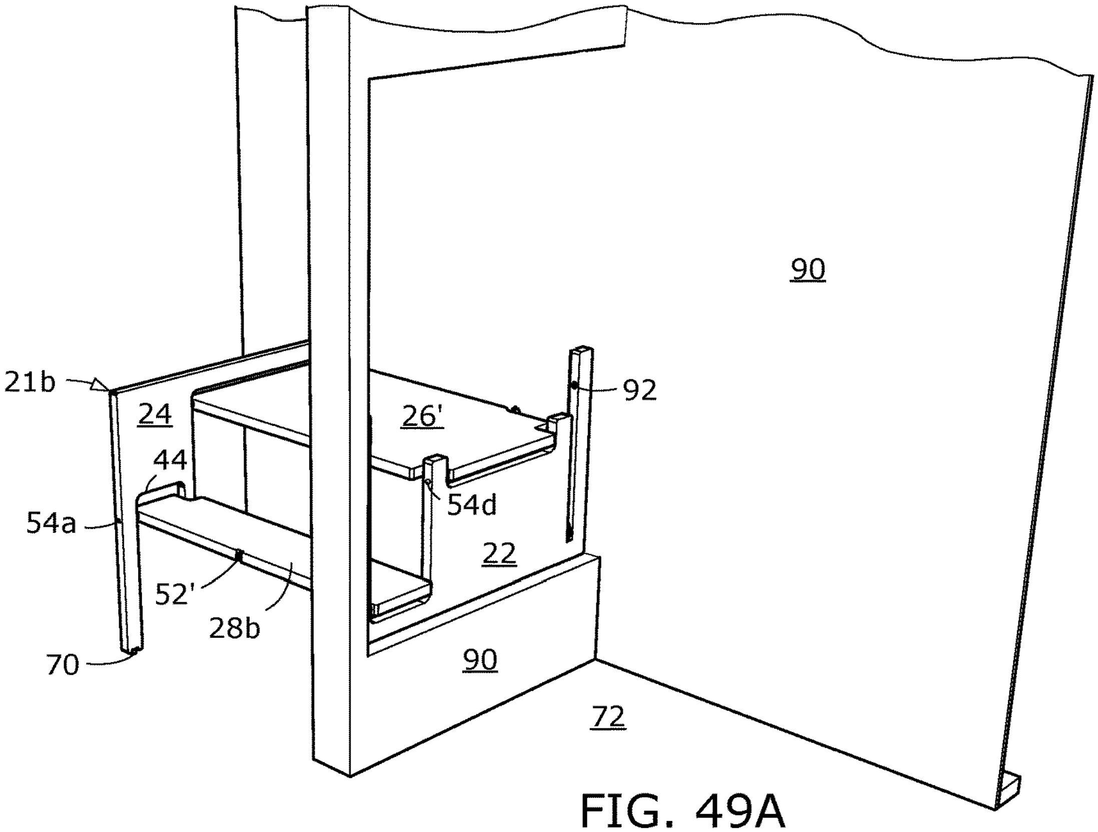
FIG. 49A is a perspective view of the lateral folding desk with bench unit, in its deployed left usable position, mounted in the wall.
Figure 49B:
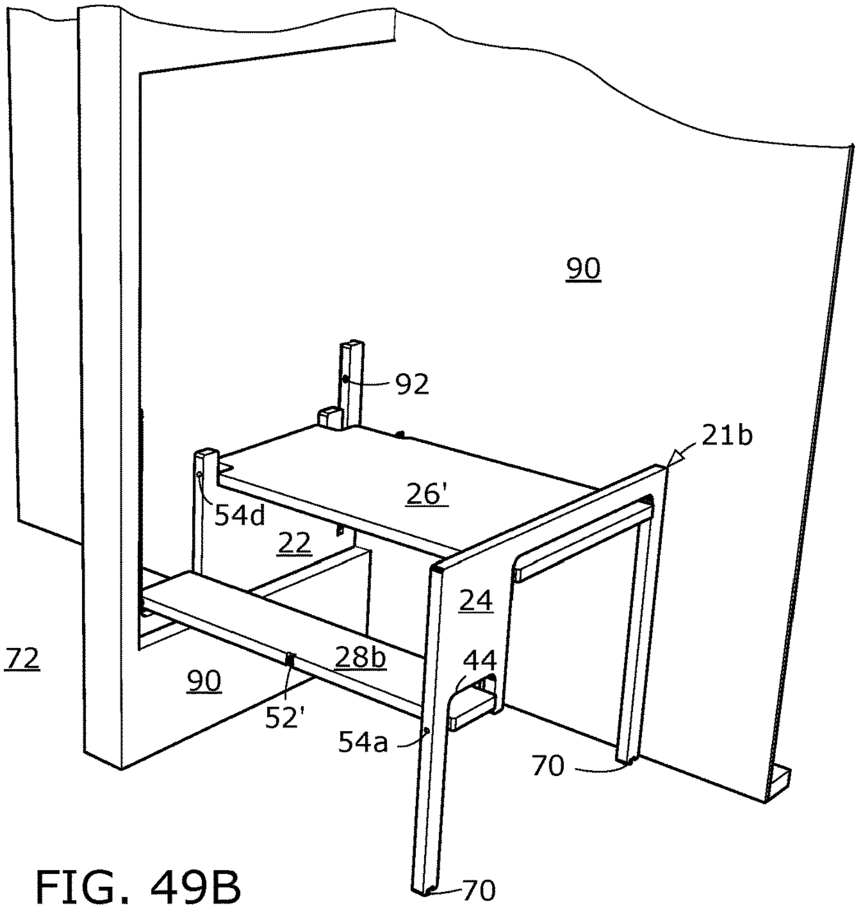
FIG. 49B is a perspective view of the lateral folding desk with bench unit, in its deployed right usable position, mounted in the wall.
Figure 51:
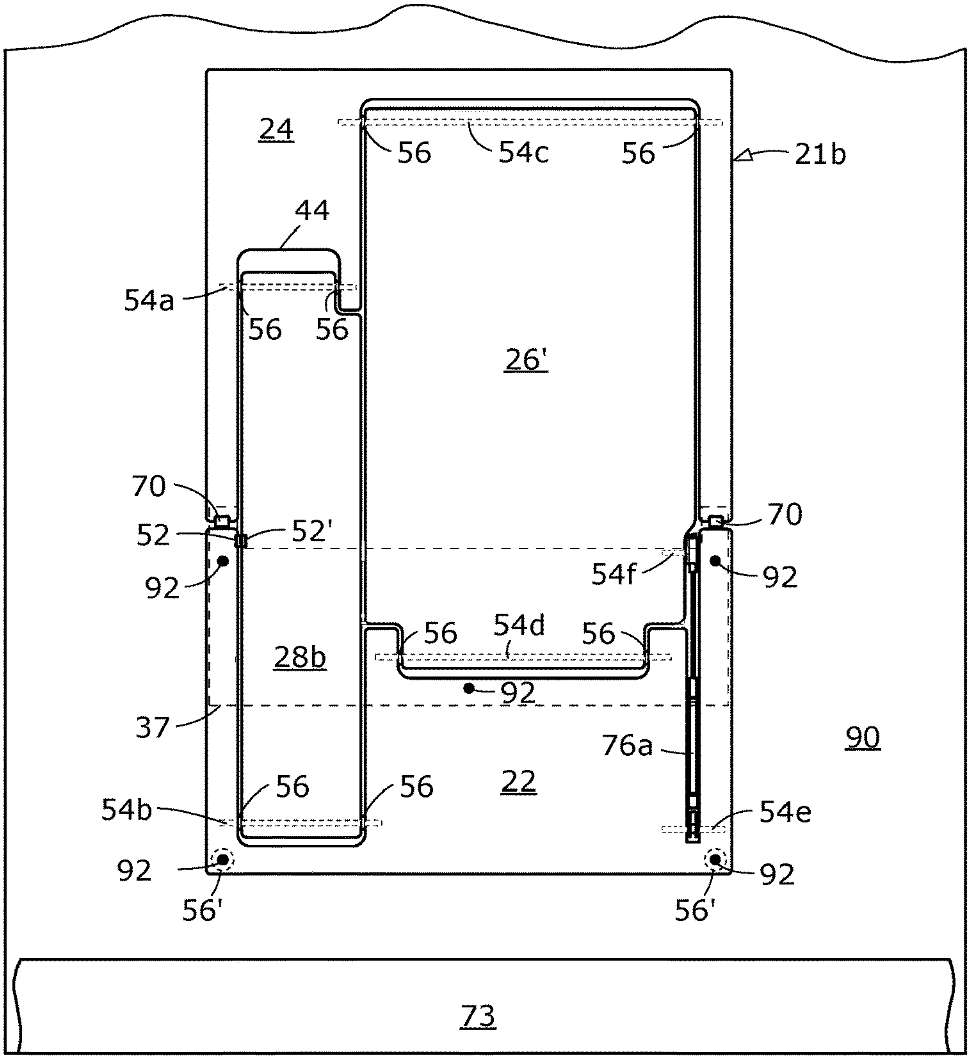
FIG. 51 as a right side view of the lateral folding with bench desk unit, wall mounted, in its retracted stored position.
Figure 52:
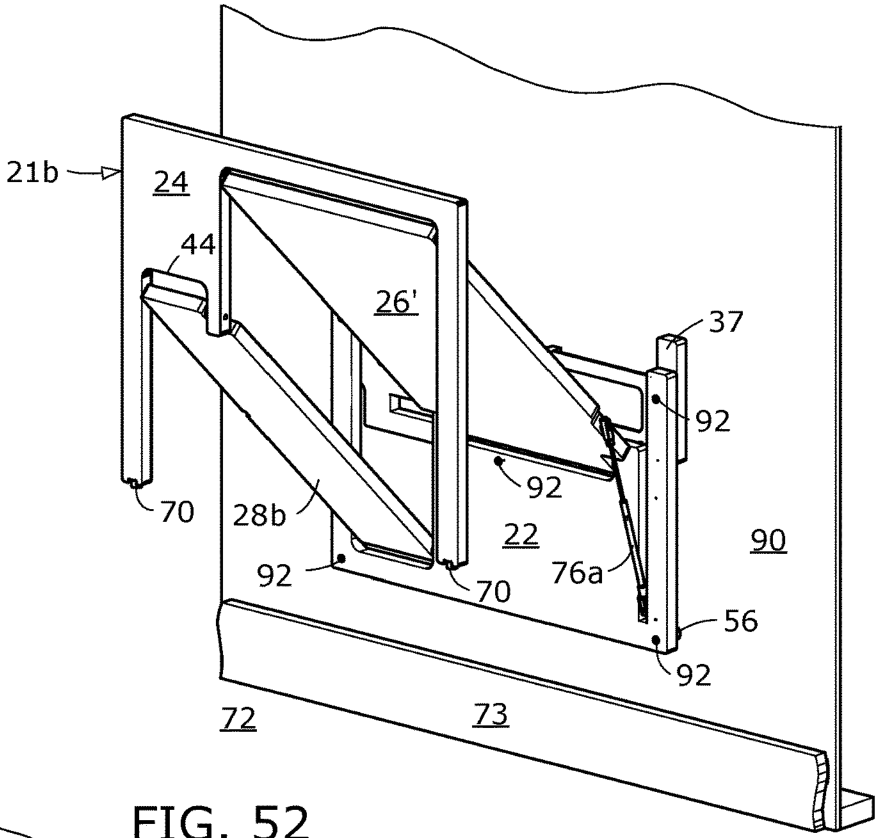
FIG. 52 is a perspective view of the lateral folding desk with bench unit, wall mounted, in its deploying 45-degree right position.

As best shown in FIGS. 48A, 48B, and 52, a work surface linkage 26' and a bench linkage 28*b* are pivotally attached to the vertical frame 22. The work surface linkage 26' is substantially deep enough to be used as a work surface or desk. The bench surface linkage 28*b* is substantially deep enough to be used as a seating surface. When both linkages 26', 28*b* are orientated in the stored position, shown in FIG. 47 or 51, they are in the same geometric plane as the vertical frame 22. The bench surface linkage 28*b* is oriented in front of the work surface linkage 26'. The bench surface linkage 28*b* also is mounted lower than the work surface linkage 26'. Both work surface linkage 26' and bench surface linkage 28*b* have the same width, best shown in FIGS. 49A, 49B and 53.

The leg frame 24, best shown in FIGS. 47 and 51, in this construction, is formed of two legs and is pivotally connected to both the upper ends of the work surface linkages 26' and bench linkage 28*b*, respectively. The leg frame 24 lays in the same geometric plane as the work surface linkage 26', bench linkage 28*b*, and vertical frame 22, when in the stored position. The leg frame 24 frames the top of both the work surface linkage 26' and the bench linkage 28*b* with the back leg extending down toward the bottom of the back side of the work surface linkage 26'. The front leg extends almost midway down the front side of the bench linkage 28*b*. The bottom of both legs of the leg frame 24 are generally parallel to the floor. Attached to the bottom each leg is an anti-slip foot 70, made preferably out of rubber. An optional magnet latches 52' is located on the front edge, in middle portion of the bench linkage 28*b*.

The following explains how the work surface linkage 26' bench linkage 28*b* are pivotally attached to both the vertical frame 22 and leg frame 24 during assembly of this construction. FIG. 51 best shows where the holes of the desk with bench unit 21*b* are located: When orientated in the stored position and looking at the desk with bench unit 21*b* from the side view, four holes are drilled, end to end, horizontally through the depth of the work surface linkage 26' and bench linkage 28*b*. The distance between the two parallelly drilled holes in the work surface 26' is the same as the distance between the two parallelly drilled holes in the bench linkage 28*b*. Both the work surface linkage's 26' holes generally are on the same geometric plane and have a vertical offset, upwards to both the bench linkage's 28*b* holes. These four holes include, one hole at the bottom of each work surface linkage 26' and bench linkage 28*b* and one hole for the top of each work surface linkage 26' and bench linkage 28*b*. Four holes are then drilled horizontally through the corresponding adjacent position, on either side of the bottom of each work surface linkage 26' and bench linkage 28*b*, into the vertical frame 22. Four holes are then drilled horizontally through the corresponding adjacent position, on either side of the top of each work surface linkage 26' and bench linkage 28*b* into the leg frame 24.

Connective elements such as shafts or shoulder bolts 54*a*, 54*b*, 54*c*, 54*d*, also shown in FIG. 51, are then inserted through holes in the lower and upper ends of both the work surface linkage 26' and bench surface linkage 28*b* and through the corresponding adjacent position in the vertical frame 22 and leg frame 24 to allow pivotal rotation. Spacers 56 are also installed surrounding the shafts 54*c* and 54*d* between the spaces between the work surface 26' and bench surface linkage 28*b*, the vertical frame 22 and the leg frame 24 to produce a clearance for the work surface linkage 26' and bench surface linkage 28 28*b*, vertical frame 22, and leg frame 24 to operate without touching.

A magnetic latch 52' is attached to the front edge, in middle portion bench linkage 28*b*. A corresponding magnetic latch 52 is attached on the opposite adjacent side to the vertical frame 22, such that magnets in latches 52, 52' only engage each other when the desk with bench unit 21*b* is oriented in the stored position, as best shown in FIG. 51. The magnet latches 52, 52' are used to hold the work surface linkage 26', bench surface linkage 28*b* and leg frame 24 in the stored position. In other constructions, a ball latch, roller latch or any other type of magnetic or mechanical latch could be used as a holding device to encourage desk with bench unit 21*b* to remain in a "vertical" storage position.

Figure 53:
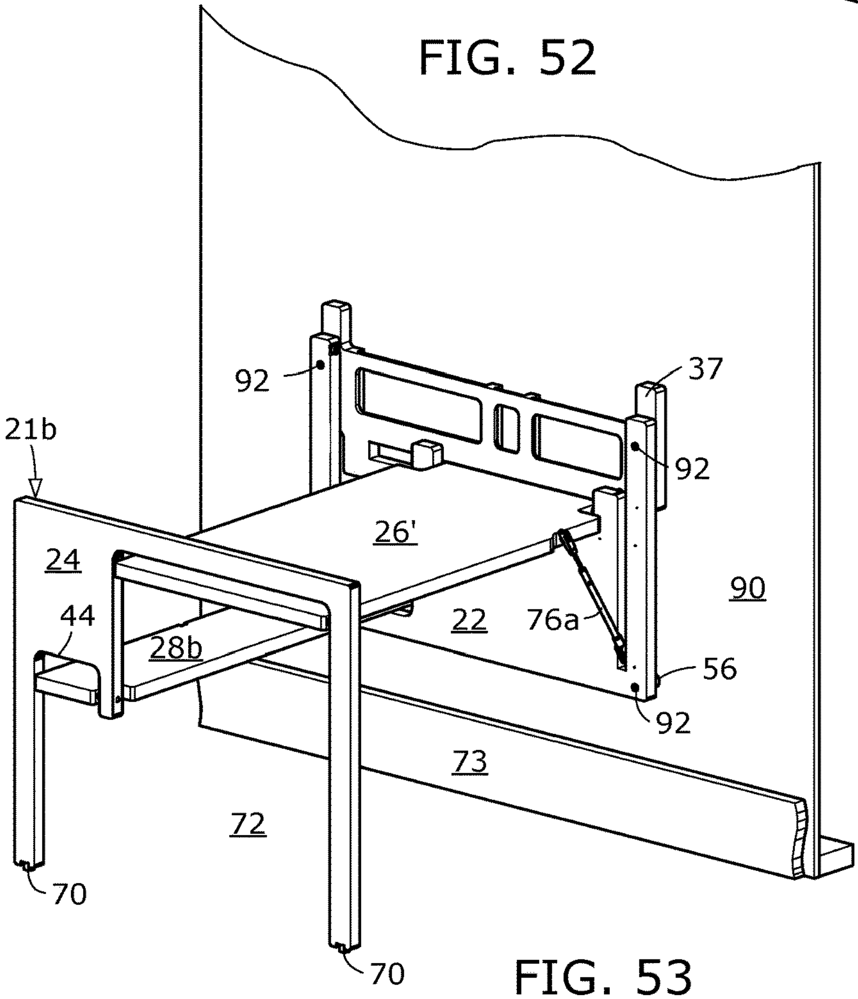
FIG. 53 is a perspective view of the lateral folding desk with bench unit, wall mounted, in its deployed right position.

Lastly, when the user is deploying the desk with bench unit 21*b*, an optional spring assist or a gas strut 76*a*, can be added to help counteract the weight of the desk linkage 26' and bench linkage 28*b*, and leg frame 24. FIGS. 51-53 show the gas strut attachment location points. The upper connection 54*f* is attached to the lower back edge of the work surface linkage 26'. The lower connection 54*e* is attached a lower portion within a cutout of the vertical frame 22. The two connections, 54*f* and 54*e* are vertically aligned and allow the gas strut 76*a* to rotate, along with the work surface linkage 26', laterally in either direction.

Figure 50A:
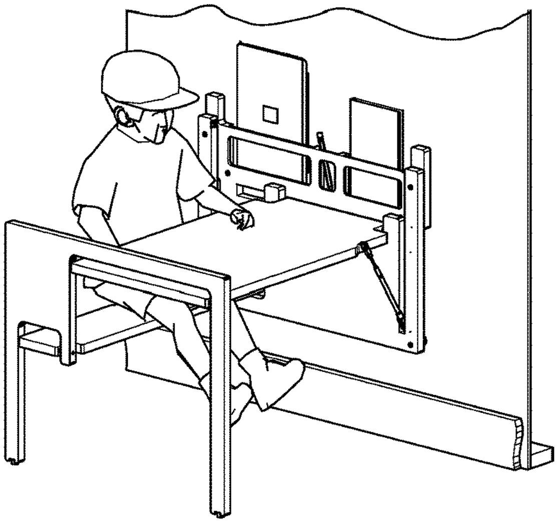
FIG. 50A is a perspective "in use" view of a lateral folding desk with bench unit, left side wall mounted, in its deployed right position.
Figure 50B:
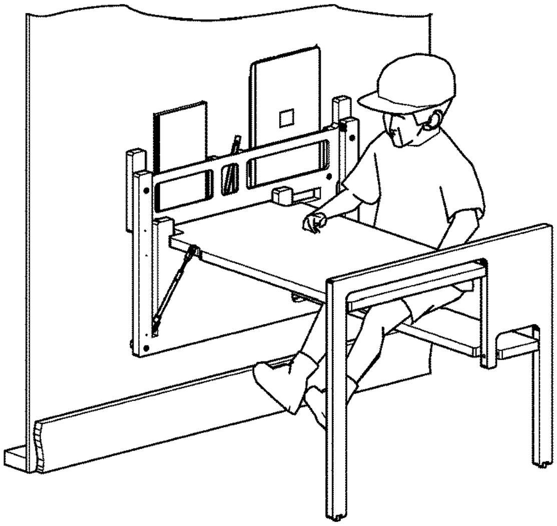
FIG. 50B is a perspective "in use" view of the lateral folding desk of FIG. 50A with bench unit, left side wall mounted, in its deployed left position.

The user then has the choice of deploying the desk with bench unit 21*b* laterally to the left for right side wall mounted desk with bench unit 21*b* installation, best shown in FIGS. 50A, 52 and 53 respectively or to the right deployment for left side wall mounted desk with bench unit 21*b* installation, as best shown in FIG. 50B. Alternatively mounting the desk with bench unit 21*b* within the wall 90, the user then has the choice of deploying the desk with bench unit 21*b* laterally to the left or to the right, shown in FIGS. 48A and 48B. This can be done by pulling the operating handle 44 that is integrated into leg frame 24. By pulling laterally in the chosen direction, the leg frame 24 will release from the magnetic latch 52 between the vertical frame 22 and the leg frame 24. In an parallel arced motion, the leg frame 24 will transition away from the vertical frame 22. As the leg frame 24 moves so do the work surface linkage 26' and bench surface linkage 28*b*, and the spring assist 76*a*, rotating until the leg frame 24 contacts the floor 72. Through this stage, work surface linkage 26' and bench surface linkage 28*b*, move parallel in relation to each other from the initial vertical "stored" position to the horizontal "in use" position. Also through this stage, the spring assist 76*a* compresses to counteract the weight of the components 24, 26' and 28*b*, best shown in FIGS. 52 and 53. In this embodiment, the work surface linkage 26' is substantially deep to provide a usable platform for the user to performs their task. The bench surface linkage 28*b* is also substantially deep enough to be used as a comfortable seating surface.

To move the lateral folding desk with bench unit 21*b* back to the stored position, shown in FIG. 43, grab the operating handle 44. With one arched motion reposition the leg frame 24, with the pivotally attached work surface linkages 26' and bench surface linkage 28*b*, back within the vertical frame 22. The compressed spring assist 76*a* also releases at this time, to relieve the weight of the components 24, 26' and 28*b*, until the magnetic latch or latches 52 and 52' will automatically engage.

Another alternative situation for use of the desk unit according to the present invention is a wall mounted desk with shelf unit 21*c*, illustrated in FIG. 54A-57. This type of desk with shelf unit 21*c* could be particularly useful in tight living areas, such as an apartment, a tiny house, on a large boat, bedroom, or wherever a typical desk can take up valuable space. The bilateral motion of the desk with shelf unit 21*c*, allows flexible mounting, easily attaching to the left side or right side of a wall. Alternatively, if there are two rooms with a dividing wall 90 between the two areas and each area needed access a desk, the wall mounted desk with shelf unit 21*c*, could be mounted within the wall between two spaces. An individual desk with shelf unit 21*c* could then be utilized for both spaces depending on the way it was deployed.

Figure 56:
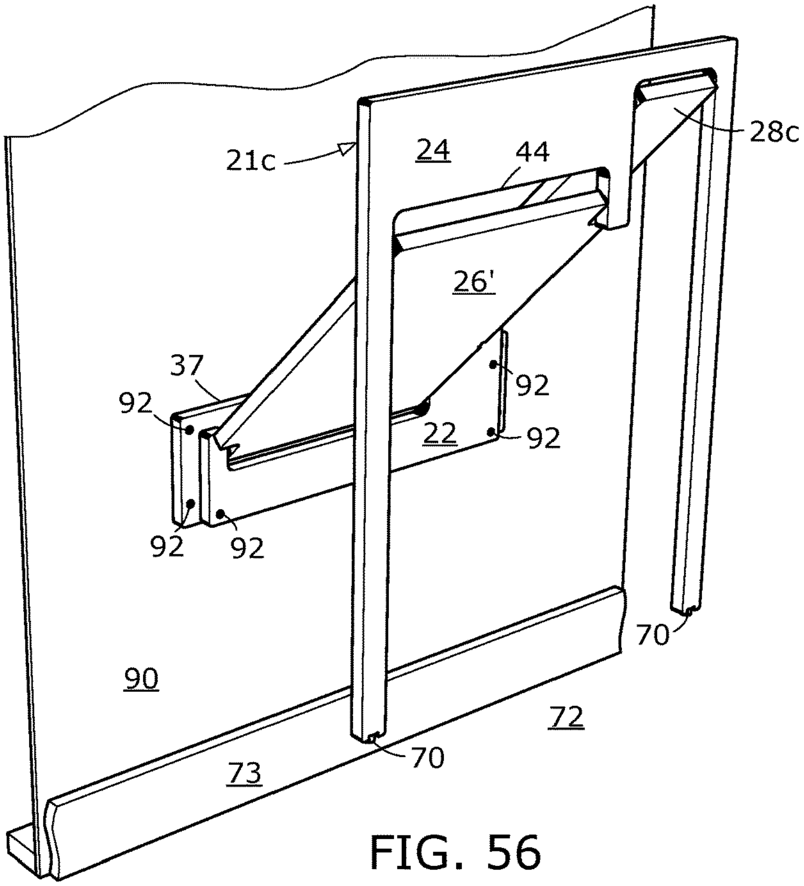
FIG. 56 is a perspective view of the lateral folding desk with shelf unit, wall mounted, in its deploying 45-degree right position.
Figure 57:
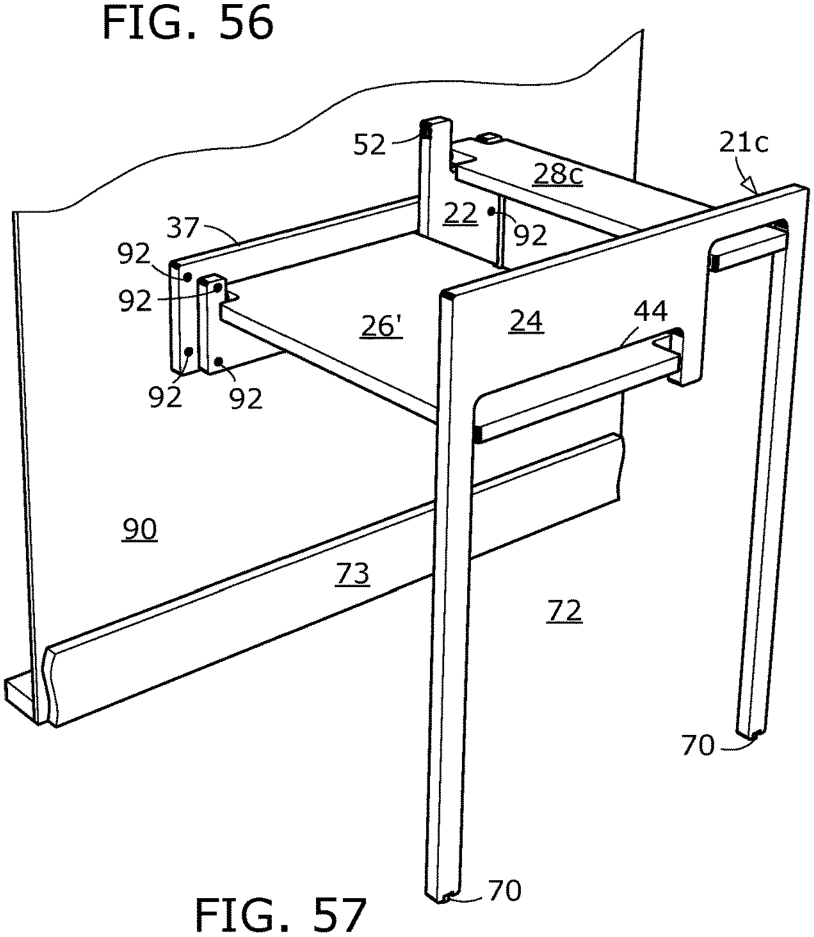
FIG. 57 is a perspective view of the lateral folding desk with shelf unit, wall mounted, in its deployed right position.

Some additional parameters should be taken into account for the wall mounted desk with shelf units 21*c* wall mounted embodiment: the vertical frame 22 would be attached to a mounting plate 37 with appropriate hardware 92 and the mounting plate 37 would be attached to the wall 90, at a specific height above the floor 90 or baseboard trim 73, with appropriate hardware 92, shown in FIGS. 56 and 57. If mounting within a dividing wall 90, the vertical frame 22 will be attached directly within the opening of the wall 90, with appropriate hardware 92.

Figure 54A:
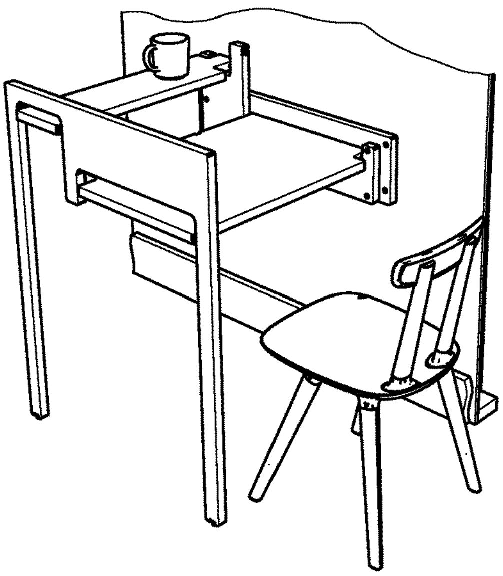
FIG. 54A is a perspective "in use" view of a lateral folding desk with shelf unit, right side wall mounted, in its deployed left position.
Figure 54B:
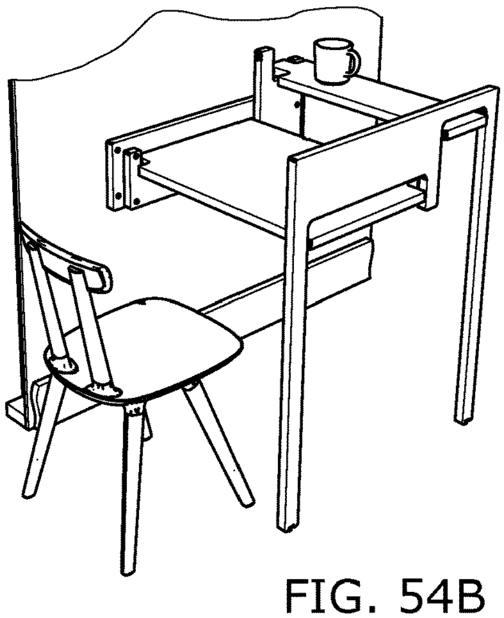
FIG. 54B is a perspective "in use" view of the lateral folding desk of FIG. 54A with shelf unit, left side wall mounted, in its deployed right position.
Figure 55:
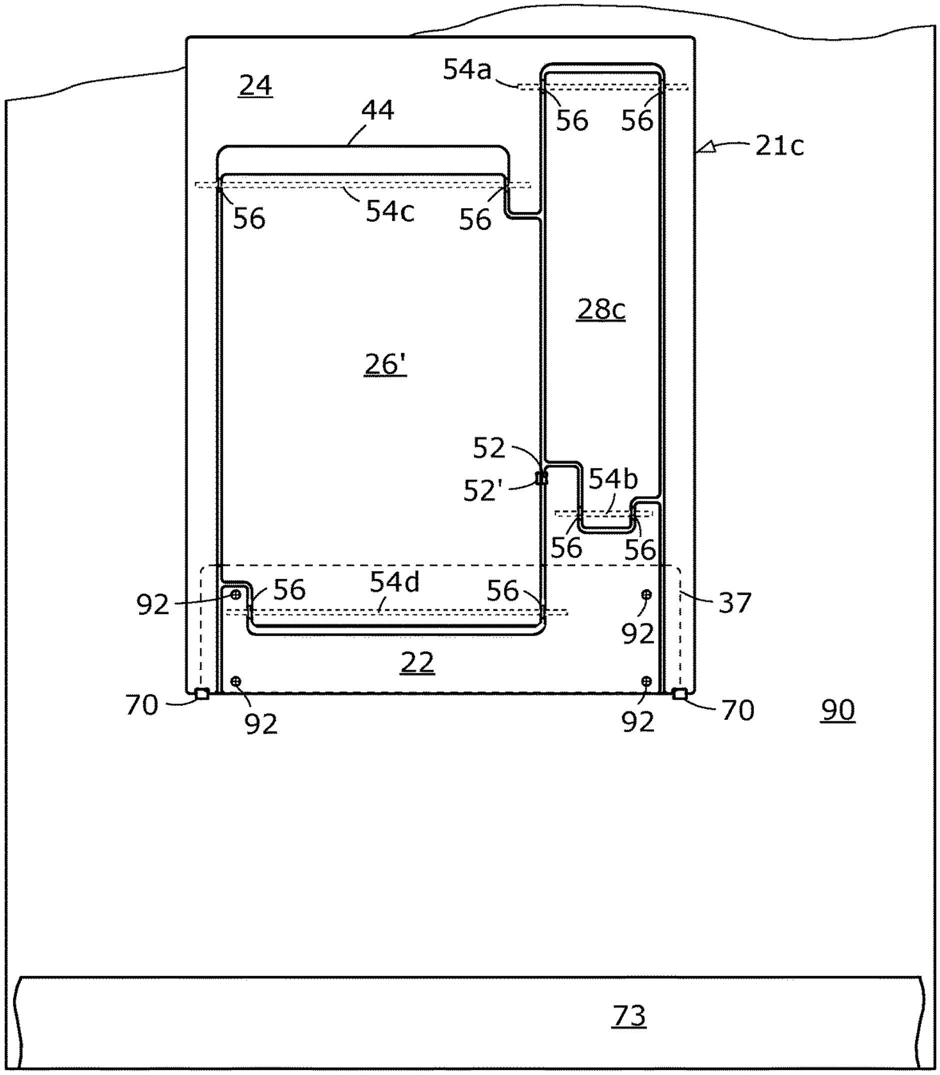
FIG. 55 as a right side view of the lateral folding desk with shelf unit, wall mounted, in its retracted stored position.

The following drawing FIGS. 55-57, illustrate the desk with shelf unit 21*c*, main components, which include a vertical frame 22, a leg frame 24, a work surface linkage 26' and shelf linkage 28*c* (shown holding mug M in FIGS. 54A-54B). All of these components lay on the same geometric flat plane when stored in the vertical position, All of these component can be made out of a sheet of rigid material such as wood but metal, plastic, or a combination of these and or other rigid materials would be acceptable. The desk with shelf unit 21*c* can be deploy laterally right shown in (FIG. 54B) when mounted to a wall 90 on the left of a room or laterally left shown in (FIG. 54A) when mounted to a wall 90 on the right of a room. Additionally, the desk with shelf unit 21*c* can be deploy laterally right or left when mounted within a wall 90 between two rooms.

As best shown in FIG. 56, a work surface linkage 26' and a shelf linkage **28*c* are pivotally attached to the vertical frame 22. The work surface linkage 26' is substantially deep enough to be used as a work surface, countertop or desk. The shelf linkage 28*c* is substantially deep enough to be used as a shelf. When both linkages 26', 28*c* are orientated in the stored position, shown in FIG. 55, they are in the same geometric plane as the vertical frame 22. The shelf linkage 28*c* is oriented behind the work surface linkage 26'. The shelf linkage 28*c* allo is mounted higher than the work surface linkage 26'. Both work surface linkage 26' and shelf linkage 28*c* have the same width, best shown in FIG. 57**.

The leg frame 24, best shown in FIGS. 55-57, in this construction is formed of two legs and is pivotally connected to both the upper ends of the work surface linkages 26' and shelf linkage **28*c*, respectively. The leg frame 24 lays in the same geometric plane as the work surface linkage 26', shelf linkage 28*c*, and vertical frame 22, when in the stored position. The leg frame 24 frames the top of both the work surface linkage 26' and the shelf linkage 28*c* with the front leg extending down past the bottom of the front side of the work surface linkage 26'. The back leg extends past the bottom of the back side of the shelf linkage 28*c*. The bottom of both legs of the leg frame 24 are generally parallel to the floor. Attached to the bottom of each leg is an anti-slip foot 70, made preferably out of rubber. An optional magnet latches 52' is located on the rear side edge of the lower portion of work surface linkage 26'**.

The following explains how the work surface linkage 26' and shelf linkage **28*c* are pivotally attached to both the vertical frame 22 and leg frame 24 during assembly of this construction. FIG. 55 best shows where the holes of the desk with shelf unit 21*c* are located: When orientated in the stored position and looking at the desk with shelf unit 21*c* from the side view, four holes are drilled, end to end, horizontally through the depth of the work surface linkage 26' and shelf linkage 28*c*. The distance between the two parallelly drilled holes in the work surface 26' is the same as the distance between the two parallelly drilled holes in the shelf linkage 28*c*. Both the work surface linkage's 26' holes generally are on the same geometric plane and have a vertical offset lower than both the shelf linkage 28*c* holes. These four holes include, one hole at the bottom of each work surface linkage 26' and shelf linkage 28*c* and one hole for the top of each work surface linkage 26' and shelf linkage 28*c*. Four holes are then drilled horizontally through the corresponding adjacent position, on either side of the bottom of each work surface linkage 26' and shelf linkage 28*c*, into the vertical frame 22. Four holes are then drilled horizontally through the corresponding adjacent position, on either side of the top of each work surface linkage 26' and shelf linkage 28*c* into the leg frame 24**.

Connective elements such as shafts or shoulder bolts **54*a*, 54*b*, 54*c*, 54*d*, also shown in FIG. 55, are then inserted through holes in the lower and upper ends of both the desk linkage 26' and shelf linkage 28*c* and through the corresponding adjacent position in the vertical frame 22 and leg frame 24 to allow pivotal rotation. Spacers 56 are also installed surrounding the shafts 54*a*, 54*b*, 54*c* and 54*d* between the spaces between the desk linkage 26' and shelf linkage 28*c*, the vertical frame 22 and the leg frame 24 to produce a clearance for the desk linkage 26' and shelf linkage 28*c*, vertical frame 22, and leg frame 24** to operate without touching.

Lastly, a magnetic latch 52' is attached to the back edge of the work surface linkage 26'. A corresponding magnetic latch 52 is attached on the opposite adjacent side to the vertical frame 22, such that magnets in latches 52, 52' only engage each other when the desk with shelf unit **21*c* is oriented in the stored position, as best shown in FIG. 55. The magnet latches 52, 52' are used to hold the work surface linkage 26', shelf linkage 28*c* and leg frame 24 in the stored position. In other constructions, a ball latch, roller latch or any other type of magnetic or mechanical latch could be used as a holding device to encourage desk unit 21*a*** to remain in a "vertical" storage position.

The user then has the choice of deploying the desk with shelf unit **21*c* laterally to the left for right side wall mounted desk with shelf unit 21*c* installation, best shown in FIG. 54A or to the right for left side wall mounted desk with shelf unit 21*c* installation, as best shown in FIGS. 54B-57. Alternatively mounting the desk with shelf unit 21*c* within the wall 90, the user then has the choice of deploying the desk with shelf unit 21*c* laterally to the left or to the right. This can be done by pulling the operating handle 44 that is integrated into leg frame 24. By pulling laterally in the chosen direction, the leg frame 24 will release from the magnetic latch 52 between the vertical frame 22 and the leg frame 24. In an parallel arced motion, the leg frame 24 will transition away from the vertical frame 22. As the leg frame 24 moves so do the work surface linkage 26' and shelf linkage 28*c*, rotating until the leg frame 24 contacts the floor 72. Through this stage, work surface linkage 26' and shelf linkage 28*c*, move parallel in relation to each other from the initial vertical "stored" position to the horizontal "in use" position. In this embodiment, the work surface linkage 26' is substantially deep to provide a usable platform for the user to performs their task. The shelf linkage 28*c*** is also substantially deep enough to be used as a shelf surface.

To move the lateral folding desk with shelf unit **21*c* back to the stored position, shown in FIG. 57, grab the operating handle 44. With one arched motion reposition the leg frame 24, with the pivotally attached work surface linkage 26' and shelf linkage 28*c*, back within the vertical frame 22. The magnetic latch or latches 52, 52'** will automatically engage.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements such as steps and/or desk surfaces, and linkages and other supports therefor, that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A lateral folding unit comprising:

a. a vertical frame having at least a lower portion;

b. a plurality of linkages pivotally attached at different heights to the vertical frame by one end of each of the linkages, to provide bilateral rotation to the linkages relative to the vertical frame; and c. a leg frame, with at least one leg, pivotally attached to the opposite end of each of the linkages whereby laterally translating the leg frame simultaneously pivots the linkages from a first, vertical position to at least one second, horizontal position;

wherein at least one linkage is substantially deep to be used as receiving surface by a user, the at least one linkage has a first receiving surface and a second receiving surface opposite to the first receiving surface, and the leg frame is capable of being translated from the first, vertical position (1) in a first lateral direction to the second, horizontal position to expose the first receiving surface to the user and (2) in a second lateral direction, that is opposite to the first lateral direction, to a third, horizontal position to expose the second receiving surface to the user.

2. The unit of claim 1 wherein the vertical frame, the leg frame and the linkages of the unit are capable of being positioned on the same geometric plane in the first, vertical position with the linkages and the leg frame positioned above the lower portion of the vertical frame.

3. The unit of claim 1 wherein the vertical frame is capable of being moved into and out of a structure when the unit is in the first, vertical position.

4. The unit of claim 3 wherein the vertical frame is movable on at least one wheel attached to the lower portion of the vertical frame.

5. The unit of claim 3 wherein the unit is capable of being positioned in a space between two base cabinets.

6. The unit of claim 1 wherein a hand rail is integrated into a top of the vertical frame and is positioned above the leg frame when the unit is in the first, vertical position.

7. The unit of claim 1 wherein an integral cut-out in the leg frame forms an operating handle.

8. The unit of claim 1 wherein a latch secures the leg frame in the first, vertical position.

9. The unit of claim 1 further including a mounting guide attachable to a structure to guide the vertical frame in and out of an opening defined by the structure, the vertical frame capable of achieving an extended position when pulled out of the opening.

10. The unit of claim 9 wherein a guide stop is integrated into the mounting guide.

11. The unit of claim 1 wherein a bumper stop is integrated into a top rear corner of the vertical frame.

12. The unit of claim 10 wherein a bumper stop is integrated into a top rear corner of the vertical frame and the bumper stop comes into contact with the guide stop when the vertical frame is in the extended position.

13. The unit of claim 1 wherein the unit is capable of being utilized as a staircase.

14. The unit of claim 1 wherein at least two linkages are substantially deep to be used as a step by a user, each of the at least two linkages has a first step surface as the first receiving surface and a second step surface as the second receiving surface opposite to the first step surface, and the leg frame is capable of being translated to (1) the second, horizontal position to expose the first step surfaces to the user and (2) a third, horizontal position to expose the second step surfaces to the user.

15. The unit of claim 9 wherein lateral movement of the vertical frame is restricted by the mounting guide.

16. A step unit and/or desk unit comprising:

a. a vertical frame having at least a lower portion;

b. a plurality of linkages pivotally attached at different heights to the vertical frame by one end of each of the linkages, to provide bilateral rotation to the linkages relative to the vertical frame;

c. a leg frame, with at least one leg, pivotally attached to the opposite end of each of the linkages whereby laterally translating the leg frame simultaneously pivots the linkages from a first, vertical position to at least one second, horizontal position; and d. a mounting guide attachable to a structure to guide the vertical frame in and out of an opening defined by the structure, the vertical frame capable of achieving an extended position when pulled out of the opening;

wherein the vertical frame, the leg frame and the linkages of the step unit and/or desk unit are capable of being positioned on the same geometric plane in the first, vertical position: and wherein at least one of the linkages is substantially deep to be used as a step or desk by a user, the at least one linkage having a first step or desk surface and a second step or desk surface opposite to the first step or desk surface, and the leg frame is capable of being translated from the first, vertical position (1) in a first lateral direction to the second, horizontal position to expose the first step or desk surfaces to the user and (2) in a second lateral direction, that is opposite to the first lateral direction, to a third, horizontal position to expose the second step or desk surfaces to the user.

17. The unit of claim 16 wherein the leg frame is also capable of being translated to a third, horizontal position to expose the second step or desk surface to the user.

18. The unit of claim 17 wherein the vertical frame is connected to the structure and is movable in a first direction into the structure and a second direction out from within the structure.

19. The unit of claim 18 wherein a guide stop is integrated into the mounting guide, a bumper stop is integrated into a top rear corner of the vertical frame and the bumper stop comes into contact with the guide stop when the vertical frame is moved in the second direction to the extended position.

20. The unit of claim 16 wherein at least two linkages are substantially deep to be used as a desk surface and a bench surface respectively, each of the at least two linkages has a first desk surface and a first bench surface respectively, and a second desk surface and a second bench surface opposite to the first desk surface and bench surface respectively, and the leg frame is capable of being translated to (1) the second, horizontal position to expose the first desk surface and the first bench surface to the user and (2) a third, horizontal position to expose the second desk surface and the second bench surface to the user.

21. The unit of claim 16 wherein at least two linkages are substantially deep to be used as a desk surface and a shelf surface respectively, each of the at least two linkages has a first desk surface and a first shelf surface respectively, and a second desk surface and a second shelf surface opposite to the first desk surface and the first shelf surface respectively, and the leg frame is capable of being translated to (1) the second, horizontal position to expose the first desk surface and the first shelf surface to the user and (2) a third, horizontal position to expose the second desk surface and the second shelf surface to the user.

* * * * *